(12) United States Patent
Behling

(10) Patent No.: US 10,046,912 B2
(45) Date of Patent: Aug. 14, 2018

(54) VEHICLE AND METHOD FOR CARRYING OUT STORAGE ACTIONS WITH STORAGE UNITS

(71) Applicant: Fraunhofer-Gesellschaft Zur Forderung drer Angewandten Forschung E.V., Munich (DE)

(72) Inventor: Jan Behling, Dortmund (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/038,279

(22) PCT Filed: Nov. 20, 2014

(86) PCT No.: PCT/EP2014/003101
§ 371 (c)(1),
(2) Date: Jan. 5, 2017

(87) PCT Pub. No.: WO2015/074755
PCT Pub. Date: May 28, 2015

(65) Prior Publication Data
US 2017/0121109 A1    May 4, 2017

(30) Foreign Application Priority Data

Nov. 20, 2013 (DE) .................... 10 2013 019 419

(51) Int. Cl.
*B65G 1/04* (2006.01)
*B65G 60/00* (2006.01)
(Continued)

(52) U.S. Cl.
CPC .......... *B65G 1/0435* (2013.01); *B65G 60/00* (2013.01); *B66F 9/07513* (2013.01); *B66F 9/141* (2013.01)

(58) Field of Classification Search
CPC ......... B65G 1/0435; B65G 60/00; B66F 9/06; B66F 9/122; B66F 9/063; B66F 9/07513;
(Continued)

(56) References Cited

U.S. PATENT DOCUMENTS 3,187,917 A   *   6/1965   Miller ...................... B66F 9/06
                                                                                                                       414/592
3,447,697 A      6/1969   Morey et al.
(Continued)

FOREIGN PATENT DOCUMENTS

AT           500229 A1    11/2005
DE          1001645 B     1/1957
(Continued)

OTHER PUBLICATIONS

ISR/Written Opinion for PCT/EP2014/003101, dated Jun. 23, 2015, 20 pages (English translation).

*Primary Examiner* — Kaitlin S Joerger
(74) *Attorney, Agent, or Firm* — The Juhasz Law Firm

(57) ABSTRACT

A stack operating vehicle for storage and retrieval storage units. One embodiment of the stack operating vehicle comprises a first bearing device with a first bearing base and a first holding device for handling at least one storage unit; a second bearing device with a second bearing base and a second holding device for handling at least one storage unit. The second holding device is movably supported by a guiding device along a horizontal direction; a vertical guide arrangement at which the first bearing base and the second bearing base are respectively guided on an adjustment path along the vertical direction which are formed such that the first bearing base and the second bearing base overlap one another over their entire adjustment paths in the vertical
(Continued)

direction. The disclosure also relates to a method for execution of storage orders with storage units with such a stack operating vehicle.

14 Claims, 43 Drawing Sheets

(51) Int. Cl.
*B66F 9/14* (2006.01)
*B66F 9/075* (2006.01)

(58) Field of Classification Search
CPC ..... B66F 9/141; B66F 9/07; B25J 5/02; B25J 5/042; B25J 5/044
USPC ....... 414/277, 280, 540, 619, 660, 661, 664, 414/668, 667
See application file for complete search history.

(56) References Cited

U.S. PATENT DOCUMENTS

| | | | | |
|---|---|---|---|---|
| 3,747,790 | A * | 7/1973 | Smith, Jr. | B66F 9/141 414/663 |
| 9,227,797 | B2 * | 1/2016 | Yang | B66F 9/07 |
| 2003/0221914 | A1 * | 12/2003 | Smith | B66F 9/122 187/244 |
| 2006/0182551 | A1 | 8/2006 | Suess | |
| 2007/0140817 | A1 * | 6/2007 | Hansl | B66F 9/063 414/277 |
| 2012/0321423 | A1 * | 12/2012 | MacKnight | H01L 21/67736 414/664 |
| 2014/0056672 | A1 * | 2/2014 | Mathys | B65G 1/0407 414/277 |
| 2017/0121109 | A1 * | 5/2017 | Behling | B65G 1/0435 |

FOREIGN PATENT DOCUMENTS

| | | |
|---|---|---|
| DE | 2222883 A1 | 11/1973 |
| DE | 3247960 A1 | 8/1984 |
| DE | 29921514 U1 | 2/2000 |
| DE | 102011012424 A1 | 8/2012 |
| EP | 0302205 A2 | 2/1989 |
| JP | H01147393 | 10/1989 |
| WO | 9402390 A1 | 2/1994 |

* cited by examiner

VEHICLE AND METHOD FOR CARRYING OUT STORAGE ACTIONS WITH STORAGE UNITS

CROSS REFERENCE TO RELATED APPLICATIONS

This application claims priority to PCT/EP2014/003101 (WO 2015/074755), entitled Vehicle and Method for Carrying Out Storage Actions with Storage Units, filed Nov. 20, 2014, in the European Patent Office, which is hereby incorporated by reference in its entirety; PCT/2014/003101 claims priority to German Appl. 10 2013 019 419.9, of the same title, filed Nov. 20, 2013. Both of these applications are incorporated by reference in their entirety.

TECHNICAL FIELD

The disclosure concerns a vehicle and a method for executing storage orders for storage units.

BACKGROUND

From the general state of the art, such a vehicle and such a method for execution of storage orders with storage units is known. The object of the disclosure is to provide a vehicle and a method for execution of storage orders with storage units by which respectively such storage orders can be executed efficiently with regard to time and space.

SUMMARY

This object is solved by the features of the independent claims. Further embodiments are of described in the dependent claims which refer to one of the independent claims.

According to a first aspect of the disclosure, a stack operating vehicle for storage and retrieval storage units is provided. The stack operating vehicle includes a vehicle frame further including wheels, wherein rotation axes of the wheels are in a transverse direction to the stack operating vehicle when the wheels are in a neutral position for driving the stack operating vehicle straight ahead. In this embodiment, wherein the stack operating vehicle includes a first bearing device with a first bearing base and a first holding device which is disposed for handling at least one storage unit. The vehicle also includes: a second bearing device with a second bearing base and a second holding device for handling a second at least one storage unit, wherein the second holding device is movably supported at the second bearing base along a horizontal direction by means of a guiding device; a vertical guide arrangement at which the first bearing base and the second bearing base are respectively guided on an adjustment path along a vertical direction which adjustment paths are formed such that the first bearing base and the second bearing base overlap over their entire adjustment paths in the vertical direction; a first height adjustment device to which the first bearing base is coupled and with which the first bearing base is moveable along the vertical direction; and a second height adjustment device to which the second bearing base is coupled and with which the second bearing base is moveable along the vertical direction, so that at the same support structure at least one storage unit can be taken up by the first bearing device and a second at least one storage unit can be taken up by the second bearing device and the storage units are moveable in the vertical direction relative to one another.

With this solution, the stack operating vehicle can take at least one storage unit from a stack of storage units, wherein the taken at least one storage unit is disposed below at least one storage unit of the stack. This achieves: spatial flexibility of a storage of storage units on a ground (size, position) with guaranteeing of the single access to storage units; cost savings for a rack; and an increase in the storage density in stacks of storage units in comparison with placement on a shelf, insofar in the same the storage units are not positioned one above the other.

According to an embodiment of the stack operating vehicle, the first bearing base (60B) is disposed in vertical direction (ZF) at the vertical guide arrangement (50) with regard to the vertical direction (ZF) above the second bearing base (80B), wherein the guiding device (V10), by which the first holding device (69) is movably guided at the first bearing base (60B), comprises a guide track (V11) which is formed at the first bearing base (60B) and a guidance part (V12) which is movably guided at the guide track (V11) and which is connected to the first bearing base (60B), wherein the guidance part (V12) is formed such that, in case that the first bearing base (60B) is disposed in a minimum possible distance to the second bearing base (80B), a contact surface (67a, 68a) of the first holding device (69) which is oriented in the vertical direction (ZA) is disposed according to one of both of the following alternatives when viewed in the vertical direction (ZA): (a) in the same height or below a contact surface (87a, 88a) of the second holding device (89) of the second bearing device (80) which is oriented in the vertical direction (ZA), and (b) below the second bearing base (80B).

According to an embodiment, the stack operating vehicle includes a support structure which is arranged at the vertical guide arrangement and a movement device for movement of the stack operating vehicle on a runway, wherein the movement device is arranged at the support structure, wherein the support structure extends in the vertical direction when starting from the movement device.

According to one embodiment, the first height adjustment device and the second height adjustment device respectively can be arranged at or integrated into the support structure.

According to an embodiment of the stack operating vehicle, the support structure comprises a first support part and a second support part, and the guide arrangement comprises at least a first guide track which is formed in the first support part, wherein in the first guide track a guidance part which is mounted to the first bearing base and a second guidance part which is mounted to the second bearing base.

According to an embodiment of the stack operating vehicle, the guide arrangement (50) additionally comprises a second guide track (54) which in a width direction (XA) of the guide arrangement (50) is positioned in a distance from the first guide track (53) and the first bearing base (60B) is formed from a first base body (63) which is guided in the first guide track (53) and a second base body (64) which is guided in the second guide track (54), wherein the first holding device (69) is formed from: an elongated first support device (67) which extends transversely to the width direction (XA) of the guide arrangement (50) and which is movably guided at the first base body (63) transversely to the width direction (XA) of the guide arrangement (50), and an elongated second support device (68) which extends transversely to the width direction (XA) of the guide arrangement (50), wherein the second elongated support device (68) is movably guided at the second base body (64) transversely to the width direction (XA) of the guide arrangement (50), wherein the second bearing base (80B) is formed from a first base body (83) which is guided in the first guide track (53) and a second base body (84) which is guided in the second guide track (54), and wherein the second holding device (89) is formed from: an elongated first support device (87) which extends transversely to the width direction (XA) of the guide arrangement (50), wherein the first support device (87) is movably guided at the first base body (83) transversely to the width direction (XA) of the guide arrangement (50), and an elongated second support device (88) which extends transversely to the width direction (XA) of the guide arrangement (50), wherein the second support device (88) is movably guided at the second base body (84) transversely to the width direction (XA) of the guide arrangement (50).

In an embodiment of the stack operating vehicle, the guide arrangement (50) additionally comprises a second guide track (53) which is positioned to the first guide track (53) in a distance in a width direction (XA) of the guide arrangement (50), wherein the first bearing base (60B) of the first bearing device (60) comprises a first telescopic holder (161) which is guided in the first guide track (53) and a second telescopic holder (162) which is guided in the second guide track (54), wherein at the telescopic holders (161, 162) respectively a telescopic endpiece (167) with a gripping device (G67, G68) is movably supported for capturing a storage unit (LE) along the transverse direction (YF), and wherein the second bearing base (80B) of the second bearing device (80) comprises a first telescopic holder (181) which is guided in the first guide track (53) and a second telescopic holder (182) in the second guide track (54) respectively, wherein at the telescopic holders (181, 182) respectively a telescopic endpiece (187) with a gripping device (G87, G88) is movably supported along the transverse direction (YF).

In this embodiment, the gripping device (G67) which is disposed at the telescopic endpieces (167, 168) of the first bearing device (60) extends from the respective telescopic endpiece (167, 168) opposite to a height direction (ZA) of the vertical guide arrangement (50) such that, when the first bearing base (60B) is disposed in a minimum possible distance to the second bearing base (80B), contact surfaces of the gripping device (G67) of the first bearing device (60) which are oriented in the vertical direction (ZA) are situated in one or both of the following areas when viewed in the vertical direction (ZA): (a) in the same height or below contact surfaces of the gripping device (G67) of the first bearing device (60) which are oriented in the vertical direction (ZA); and (b) in the area of or below the telescopic holder (181, 182) of the second bearing device (80).

According to an embodiment of the stack operating vehicle, the first holding device is movably coupled and can be formed from a first support device and a second support device (FIG. 1), wherein the first support device 67 is disposed at the first base body and moveable relative to the first base body along the transverse-direction between a retracted and an extended state and the second support device is disposed at the second base body and moveable relative to the second base body along the transverse-direction between a retracted and an extended state.

According to an embodiment of the stack operating vehicle, the support structure is arranged on a base plate of the stack operating vehicle, wherein the base plate is rotatably mounted on the vehicle frame of the stack operating vehicle, and wherein the stack operating vehicle comprises a drive device by which the base plate with the support structure can be rotated relative to vehicle frame.

According to an embodiment of the stack operating vehicle, the vertical guide arrangement (50) is disposed at a support structure (40), and wherein the wheels (11, 12, 13, 14) are respectively disposed by means of a pivot joint with a rotation axis (11*d* and 12*d* and 13*d* and 14*d*, respectively) which runs along the transverse-direction for straight line driving in a neutral position, wherein the wheels (11, 12, 13, 14) are disposed by means of a suspension device directly or by means of a storage device at the support structure (40).

According to an embodiment of the stack operating vehicle, the support structure (40) comprises four support bars (141*d* and 142*d* and 143*d* and 144*d*) and the wheels (11, 12, 13, 14) are disposed using a suspension device directly or with a mounting device to a respective one of the four support bars.

In a further aspect of a stack operating vehicle (F) for storage and retrieval of storage units (LE), the stack operating vehicle (F) comprises: a first bearing device (60) with a first bearing base (60B) with a gripping device (G67); a second bearing device (80) with a second bearing base (80B) and a second holding device (89) for capturing at least a storage unit (LE), wherein the second holding device (89) is movably supported at the second bearing base (80B) by means of a guiding device along a longitudinal direction (XF); a vertical guide arrangement (50) at which the first bearing base (60B) and the second bearing base (80B) are respectively guided with providing an adjustment path along a vertical direction (ZA), wherein the first bearing base (60B) and the second bearing base (80B) are disposed situated one upon the other and at least one another overlapping over their entire adjustment paths when viewed in the vertical direction (ZA); a first height adjustment device (70) to which the first bearing base (60B) is coupled and by which the first bearing base (60B) is moveable along the vertical direction (ZA); and a second height adjustment device (90) to which the second bearing base (80B) is coupled and by which the second bearing base (80B) is moveable along the vertical direction (ZA), wherein at least one storage unit (LE) can be taken up at the same vertical guide arrangement (50) by a respective movement of the first bearing device (60) and a respective movement of the second bearing device (80), wherein the storage units (LE) are moveable to one another in the vertical direction (ZA).

Another aspect is of the disclosure is a portal vehicle (500). The portal vehicle includes: a first side part (P1); a second side part (P2) which is positioned in a distance from the first side part (P1) in a longitudinal direction (XFP) of the portal vehicle (500) for providing a storage unit stack clearance (505) between the first and second side parts; a bearing device (501) which connects the first and second side parts and which delimits the storage unit stack clearance (505) in a height direction (ZF); a stack operating vehicle (400) which is moveable by means of a guiding device (502), wherein the guiding device is formed such that the stack operating vehicle (400) is moveable in the longitudinal direction (XFP) of the portal vehicle (500) between a first position in which the stack operating vehicle (400) is retracted in the first side part (P1) and a second position in which the stack operating vehicle (400) is retracted in the second side part (P2), wherein the stack operating vehicle (400) includes: a first bearing device (60) with a gripping device for capturing a storage container; a second bearing device (80) with a second bearing base (80B) and a second holding device (89) for applying at least one storage unit (LE), wherein the second holding device (89) is movably supported on the second bearing base (80B) with a guiding device along a longitudinal direction XF which runs along the longitudinal direction (XFP) of the portal vehicle (500); a vertical guide arrangement (50) on which the first bearing device (60) and the second bearing device (80) are guided respectively along an adjustment path which runs along a vertical direction (ZA), wherein the first and second bearing devices are formed such that the first bearing base (60B) and the second bearing base (80B) are situated one upon the other and at least one another overlapping over their entire adjustment paths in the vertical direction (ZA); a first height adjustment device (70) to which the first bearing device (60) is coupled and by which the first bearing device (60) is moveable along the vertical direction (ZA); a second height adjustment device (90) to which the second bearing base (80B) is coupled and by which the second bearing base (80B) is moveable along the vertical direction (ZA).

Another aspect of the disclosure is a method for execution of storage orders with storage units from a stack of such storage units by means of a stack operating vehicle, the method including steps of: positioning the stack operating vehicle in front of a stack of storage units such that the first holding device and the second holding device are facing the stack; capturing at least a storage unit of the stack of storage units with a first holding device which is coupled to a first bearing base of a first bearing device; capturing at least a storage unit from the remaining stack by a second holding device which is coupled to a second bearing base of a second bearing device, wherein the first bearing base and the second bearing base are guided respectively by a vertical guide device on an adjustment path along a vertical direction, wherein the first bearing base and the second bearing base are situated at least one another overlapping over their entire adjustment paths in the vertical direction and one upon the other; by retracting the second holding device complete removing of the at least one storage unit grabbed by the same from the ground plot of the stack so far that with a lowering the first bearing device the at least one storage unit which is situated on the first holding device can be passed by the at least one storage unit which is situated on the second holding device downward in a direction opposite the vertical ZF-direction; and by lowering the first bearing device setting down the at least one storage unit which is grabbed by the same onto the remaining stack of storage units.

In this case provision can be made that subsequently the execution of a further storage order is realized with the at least one storage unit grabbed by the second holding device.

BRIEF DESCRIPTION OF THE FIGURES

In the following, embodiments of the disclosure are described with reference to the enclosed Figures, which show:

FIG. 10 is a schematic perspective presentation of a further embodiment of the stack operating vehicle according to the disclosure, wherein FIG. 10 shows with regard to FIG. 5 that the first and the second bearing device comprises telescopic extendable holding devices with gripping devices which are mounted at the same, wherein this embodiment of the stack operating vehicle is shown in a first operational state;

FIG. 13 is a presentation of a further embodiment of a storage unit for execution of a storage order according to the disclosure with an embodiment of the stack operating vehicle, wherein FIG. 13 shows a perspective presentation of the storage unit at an angle from above;

DETAILED DESCRIPTION

Figure 1:
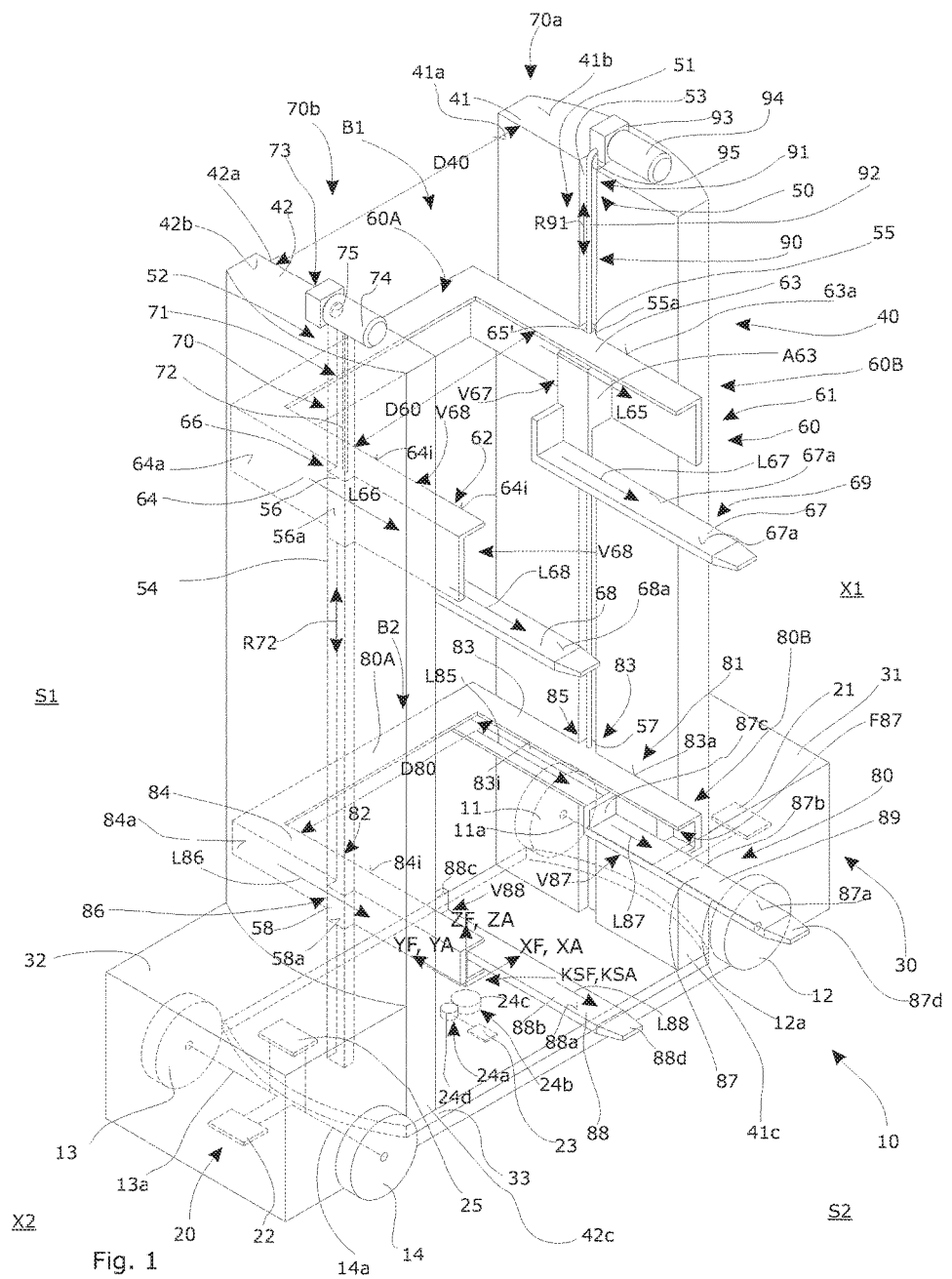
FIG. 1 is a schematic perspective presentation of a first embodiment of the stack operating vehicle according to the disclosure with a vehicle frame and with a base plate which is rotatably mounted on the vehicle frame, wherein a vehicle coordinate system is assigned to the stack operating vehicle and a base coordinate system is assigned to the base plate, each with a lateral axis, a longitudinal axis and a vertical axis, wherein the stack operating vehicle comprises a movement device, a support structure which is disposed on the same, a first or upper and a second or lower bearing device both of which are guided at the support structure and which are respectively formed from a bearing base and a holding device.

A stack operating vehicle F according to the disclosure is schematically shown in FIG. 1. For the further description a vehicle-fixed coordinate system KS-F with the coordinate axes XF, YF, ZF is assigned to the stack operating vehicle F which is shown in FIG. 1 as an example. With regard to the XF-axis or vertical axis defining the vertical direction also a first longitudinal side S1 of the stack operating vehicle F and a second longitudinal side S2 of the stack operating vehicle F is defined which lies opposite to the first longitudinal side S1 with regard to the XF-axis.

A stack operating vehicle F according to the disclosure, as schematically shown in FIG. 1, generally comprises: a movement device 10 for moving the stack operating vehicle F on a runway as part of a base R which particularly is the warehouse floor of a storage section in which the storage units LE are disposed which container or a carton or a rack, a drive device 20 for driving the movement device 10, a support structure 40 particularly in form of a portal rack, a vertical guide arrangement 50 which is formed form the support structure 40 or mounted to the support structure 40, a first bearing device 60 which is coupled to the vertical guide arrangement 50 and which is moveable in the vertical direction ZF at the support structure 40 and the portal rack, respectively, and which is adjustable in the vertical direction ZF by means of a first height adjustment device 70, and a second bearing device 80 which is coupled to the vertical guide arrangement 50 and which is moveable at the portal rack in vertical direction or ZF-direction and which is adjustable in the vertical direction or the ZF-direction by means of a second height adjustment device 90. The stack operating vehicle F can comprise a vehicle frame 30 in which the movement device 10 is received or integrated. In this case the components of the movement device 10 can be mounted to the vehicle frame 30. As an alternative, the movement device 10 can mounted at the support structure 40.

The stack operating vehicle F with the vehicle frame 30 can comprise a frame part 31 and a base part 33 particularly in form of a base plate 33 which is disposed on the frame part 31 and on which the support structure 40 can be arranged. The base 33 or the base plate can be disposed on the vehicle frame 30 or non-rotatably be mounted on the vehicle frame 30 or, alternatively, can be rotatably mounted on the vehicle frame 30 as base plate 33. A coordinate system KA is assigned to the embodiment of the stack operating vehicle F with a base 33 which is mounted rotatably on the vehicle frame 30 or the frame part 31, wherein the coordinate system KA is assigned to the base 33 fixedly and particularly non-rotatably, wherein the original of the coordinate system KA lies in the original of the coordinate system KS-F and wherein the coordinate system KA comprises a XA-axis, a YA-axis and a ZA-axis. The ZA-axis is directed along a height direction of the support structures 40, the YA-axis extends runs between the side parts of the support structures 40 and the XA-axis runs through the side part.

In FIG. 1, a stack operating vehicle F is shown which comprises a base plate 33 which is mounted rotatably on the vehicle frame 30 rotatable. The base plate 33 is mounted rotatably on the vehicle frame 30 by means of a pivot bearing 24b which provides a ZF-axis. Between the base plate 33 and the vehicle frame 30 a drive device 24a is acting, for example in form of a drive motor with a drive pinion 24d which is driven by the same and which functionally connected with an adjustment device 23. The drive device 24a is designed such that the drive device 24a upon actuation effects movement of the base plate 33. In the mentioned example for this purpose the drive pinion 24d engages a gear wheel 24c which surrounds a pivot bearing 24b and which is disposed non-rotatably to the base plate 33. The adjustment device 23 generates adjustment commands by which the drive device 24a is actuated on order to rotate the base plate 33 with the support structure 40 relative to the vehicle frame 30 corresponding to respective adjustment commands. The pivot bearing of the base plate 33 can be realized with a central rotation axis. Alternatively, the base plate 33 can also be mounted rotatably at its circumferential outer edge. In this regard provision can also be made that the drive pinion 24d of the drive device 24a abuts a circumferential contact surface in order to effect rotation of the circumferential contact surface and subsequently the base plate 33 upon actuation of the drive pinion 24d.

The first bearing device 60 and the second bearing device 80 are realized such and is disposed at the support structure 40 such that the respective one can lift at least one transport unit or storage unit LE from one and the same stack of transport units and storage units LE, respectively, and, independent from one another, from the remaining stack of storage units LE and remove from the same and move into the support structure 40.

The first bearing device 60 comprises a first bearing base 60B which particularly can comprise a first capturing device 61 particularly with a first base body 63 and a support device 67 coupled to the first capturing device 61 in YA-direction and a second capturing device 62 particularly with a second base body 64 and a support device 68 coupled to the second capturing device 62 in YA-direction which together are formed for capturing and bearing a storage unit LE or of a stack of storage units for moving a storage unit LE or a stack of storage units LE relative to the support structure 40 along the YF-axis, particularly also between a first support part 41 and a second support part 42. In the embodiment of the first bearing base 60B with a first capturing device 61 and a second capturing device 62, the first and the second base body 63, 64 respectively can be parts of a one-piece capturing part and, according to the embodiment of FIG. 1 can be formed, together as a base part B1 with a connection part 60A which connects the base bodies 63, 64, or, alternatively thereto, the first bearing base 60B can be formed by two parts, by a first base body 63 and a second base body 64, without a connection part 60A.

Figures 8, 9:
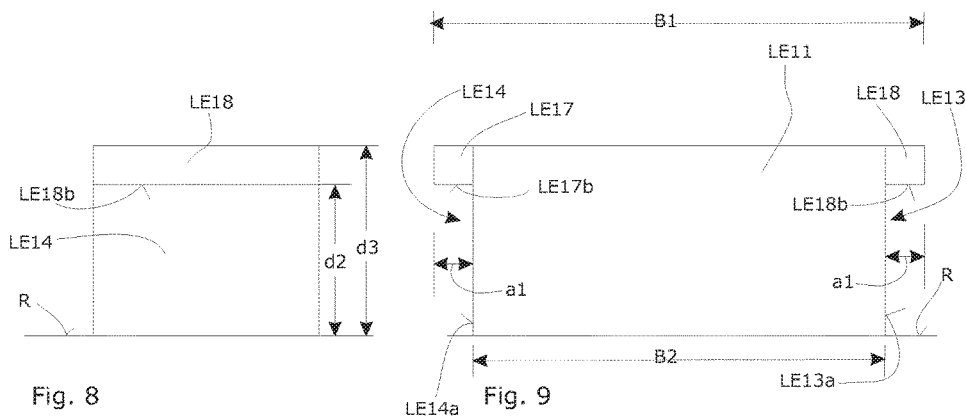
FIG. 8 is a presentation of the storage unit according to FIG. 7 as a first side view.
FIG. 9 is a presentation of the storage unit according to FIG. 7 as a second side view.

Generally provision can be made that the inner edge lines or edge surfaces 63i, 64i of the first base body 63 and the second base body 64, respectively, which are facing each other, are positioned in a distance D60 from one another which is larger than the largest width B1 of the storage unit (FIG. 9) or at least the largest width of the container part of the storage unit (FIG. 9).

In an analogous manner the second bearing device 80 can comprise a second bearing base 80B which particularly can comprise a first capturing device 81, particularly with a first base body 83 and in a YA-direction, support device 87, and a second capturing device 82 particularly with a second base body 84 and a support device 88 which is coupled thereto in YA-direction which together are formed for capturing and bearing a storage unit LE or a stack of storage units LE and for moving a storage unit LE or a stack of storage units LE relative to support structure 40 along the YF-axis, consequently particularly between the first support part 41 and the second support part 42. In the embodiment of the first bearing base 80B with a first capturing device 81 and a second capturing device 82, the first and the second base body 83, 84 respectively can be parts of a one-piece capturing part and, according to the embodiment of FIG. 1 can be formed, together as a base part B2 with a connection part 80A which connects the base bodies 83, 84, or, alternatively thereto, the first bearing base 80B can be formed by two parts, by a first base body 83 and a second base body 84, without a connection part 80A.

Generally provision can be made that the inner edge lines or edge surfaces 83i, 84i of the first base body 83 and the second base body 84, respectively, which are facing each other, are positioned in a distance D80 from one another which is larger than the largest width B1 of the storage unit (FIG. 9) or at least the largest width of the container part of the storage unit (FIG. 9).

Generally the base bodies 63, 64, 83, 84 can be formed as a bar or as a bearing profile, wherein the base bodies 63, 64, 83, 84 respectively extend in YA-direction, i.e. that their longitudinal directions extend in or along the YA-direction.

Figure 7:
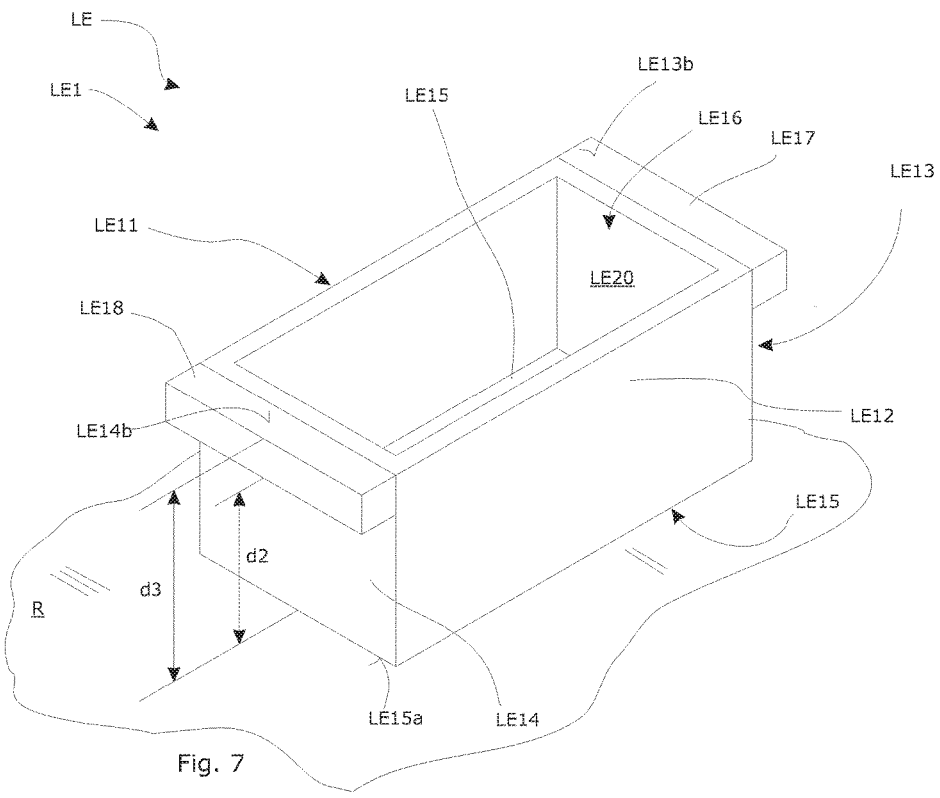
FIG. 7 depicts an embodiment of a storage unit for executing storage orders with an embodiment of the stack operating vehicle, depicting a perspective presentation of the storage unit at an angle from above.

Generally the support devices 67, 68 and 87, 88, respectively, can respectively be formed bar-shaped or as bearing profiles and particularly, as shown in FIG. 1, as fork lift teeth for capturing pallets or for capturing storage container or storage units LE according to FIGS. 7 to 9.

The support structure 40, as schematically shown in FIG. 1, particularly can be formed from a first side part 41 and a second side part 42 which extend in the ZA-direction. In this regard the first side part 41 and the second side part 42 are situated on sides which are lying opposite to each other with relation to the YA-axis. The support structure 40, as schematically shown in FIG. 1, particularly can be mounted on the base 33 which is mounted on the movement device 10 or structurally integrated in the same. Also, the stack operating vehicle F can be realized such that the support structure 40, as schematically shown in FIG. 1, extends from the movement device 10. In this regard the movement device 10 can be arranged at a lower end of the support structure 40 with regard to the vertical direction or ZF- or ZA-axis so that the support structure 40 extends from the movement device 10 in a vertical or the ZF-direction.

The stack operating vehicle F generally comprises the vertical guide arrangement 50 which extends in the vertical direction ZA which particularly can be arranged on the base 33 which is arranged on the movement device 10 or which is structurally integrated in the same. Also, the stack operating vehicle F can be realized such that the vertical guide arrangement 50 extends from the movement device 10. In this case, the movement device 10 can be arranged at a lower end of the stack operating vehicle F with regard to the vertical direction or ZF- or ZA-axis.

The vertical guide arrangement 50 is constructed such and is coupled to the first bearing device 60 and the second bearing device 80 such that the same are guided in their movements along the support structure 40 in the vertical direction ZA. The vertical guide arrangement 50 can be constructed in different manners. According to the disclosure provision can be made that the vertical guide arrangement 50 is disposed within the support structures 40 when viewed contrary to the ZA-axis. At the embodiments of the disclosure generally provision can be made that the vertical guide arrangement 50 is formed such that at the same the first bearing base 60B and the second bearing base 80B are respectively guided by providing an adjustment path along the vertical or ZF-direction, wherein the first bearing base 60B and the second bearing base 80B are formed such that the first bearing base 60B and the second bearing base 80B are disposed in the vertical or ZF-direction one above the other and simultaneously at least sectionally one another overlapping over their respective entire adjustment paths. In this regard the term "overlapping" means that the first bearing base 60B and the second bearing base 80B, which means their respective outer contours which result in a view in the vertical or ZF-direction, are sectionally situated one upon the other when viewing in the vertical or ZF-direction, consequently in a projection which result from this direction. The term "sectionally one above the other" particularly can mean that at least 50% of the inner surfaces of the outer contours of the first bearing base 60B and the second bearing base 80B which result when viewed in the vertical or ZF-direction are situated one upon the other. In this way, the first bearing base 60B and the second bearing base 80B require only little a space in the top view onto the stack operating vehicle F; in this case the first bearing base 60B and the second bearing base 80B can still execute the basic functions of the stack operating vehicle F for storage and retrieval storage units LE, according to this disclosure. In particular, the stack operating vehicle F is moveable in relative narrow aisles between stacks of storage units LE; the stack operating vehicle F—while standing or maneuvering within this aisle—can execute the method for storage and retrieval storage units LE according to this disclosure. In this way, the method described herein can be executed with little demand for space; the method can also be executed efficiently with regard to time.

According to the embodiment of FIG. 1 the vertical guide arrangement 50 can particularly comprise a first guiding device 51 at which the respective first base body 63 and 83, respectively, is moveable and guided in vertical direction, this means along the ZF- and the ZA-axis, and a second guiding device 52, at which the respective second base body 64 and 84, respectively, is moveable and guided in vertical direction this means along the ZF- and the ZA-axis.

The first guiding device 51 or the second guiding device 52 can also be omitted when the respective other guiding device takes over the function of a guiding of the respective capturing device.

Generally the first guiding device 51 comprises guide track 53 which extends in the ZF- or the ZA-axis and at least a guided part or guidance part which generally is formed at the first bearing base 60B and particularly at the first capturing device 61 and the first capturing device 81 or at the first capturing device 61 or the first capturing device 81, wherein the guide track and the respective guidance part coact for realizing the guidance of the first capturing device 61 and the second capturing device 81, respectively.

In this regard the second guiding device 52 generally comprises a guide track 54 which extends in the ZF- or the ZA-axis and at least a guided part or guidance part which generally is formed at the second bearing base 80B and particularly at the second capturing device 62 and the second capturing device 82 or at the second capturing device 62 or the second capturing device 82, wherein the guide track and the respective guidance part coact for realizing the guidance of the first capturing device 61 and the second capturing device 81, respectively. Consequently, the stack operating vehicle F comprises a guiding device for guiding the first capturing device 61 and the second capturing device 81 at the support structure 40 in the vertical direction.

With the embodiment of FIG. 1 the first guiding device 51 includes a first guidance part 55 which is formed at the first bearing base 60B and particularly at the first capturing device 61, wherein the first guidance part 55 is formed at the outer surface 63a of the first base body 63 which faces the inner surface or inner side 41a of the first support part 41 and which, extending from the first base body 63, engages the guide track 53 of the first support part 41 so that the outer contour 55a of the guidance part 55 is guided at the guide track 53, and a first guidance part 57 which is formed at the second bearing base 80B and particularly at the first capturing device 81, wherein the first guidance part 57 is formed at the outer surface 83a of the first base body 83 which faces the inner surface or inner side 41a of the first support part 41 and which, extending from the second base body 83, engages the guide track 53 of the first support part 41 so that the outer contour 57a of the guidance part 57 is guided at the guide track 53.

Analogously, with the embodiment of FIG. 1 the second guiding device 52 includes: a second guidance part 56 which is formed at the first bearing base 60B and particularly at the second capturing device 62, wherein the second guidance part 56 is formed at the outer surface 64a of the second base body 64 which faces the inner surface or inner side 42a of the first support part 42 and which, extending from the second base body 64, engages the guide track 54 of the second support part 42 so that the outer contour 56a of the guidance part 56 is guided at the guide track 54; and a second guidance part 58 which is formed at the second bearing base 80B and particularly at the second capturing device 82, wherein the second guidance part 58 is formed at the outer surface 84a of the second base body 84 which faces the inner surface or inner side 42a of the first support part 42 and which, extending from the second base body 84, engages the guide track 54 of the second support part 42 so that the outer contour 58a of the guidance part 58 is guided at the guide track 54.

The respective guidance is realized such that the respective first base body 63 and 83, respectively, or the respective second base body 64 and 84, respectively, or, as in the embodiment according to FIG. 1, the first and the second base body of each capturing device 61 and 62, respectively, is guided by the at least one guiding device at least along the YF-axis and the YA-axis, respectively.

The vertical guide arrangement 50 can be part of the support structure 40 or can be mounted thereto. The vertical guide arrangement 50 can also be realized as own device in relation to the support structure 40. The vertical guide arrangement 50 comprises at least a guidance profile with which at least one connection part of the first bearing device 60 and at least one connection part of the second bearing device 80 coact so that the same is held or fixed relative to respective guidance profile within the area of movement of the same in directions transversely to the vertical direction ZF and ZA, respectively.

As shown in FIG. 1, the vertical guide arrangement or the guide arrangement 50 can be realized schematically as a separate guiding profile component with at least a guidance profile and in this case particularly as a guidance rod with at least a guidance profile. The guiding profile component, e.g., as a separate component, can be mounted to the vehicle frame 30 or beneath the support structure 40. In this case provision can be made that a connection part of the first bearing device 60 and a connection part of the second bearing device 80 encompasses a surface of the guidance profile. In this case the vertical guide arrangement or the guide arrangement 50 can be realized as guidance rod, for example, with a with a multi-edge profile so that the connection part of the first bearing device 60 and the connection part of the second bearing device 80 is non-rotatably coupled to the guidance rod in the plane which is spanned by the XA-axis and the YA-axis, however displaceable along the ZA-axis at the guidance rod.

The vertical guide arrangement or the guide arrangement 50 can also be realized by two separate guidance profiles which particularly can be interacted in a respective support part 41 and 42, respectively, or can also be realized by two separate guiding profile components. In this case, a first guiding profile component comprises a first guidance profile to which a first connecting device 65 of the first base body 63 and a first connecting device 85 of the first base body 84 is coupled, and a second guiding profile component comprises a second guidance profile to which a second connecting device 66 of the second base bodies 64 and a second connecting device 86 of the second base bodies 84 is coupled so that the base body 63, 64 and the base body 83, 84, respectively, are guided by the respective guidance profile in the ZF- and the ZA-direction upward or downward.

As schematically shown in FIG. 1, the vertical guide arrangement or the guide arrangement 50 can particularly formed from two guiding devices 51, 52 which are particularly realized such that a respective guiding device 51, 52 is formed at a respective one of two support parts 41 and 42 which respectively extend along the ZF- and the ZA-direction. Further, each guiding device 51, 52 includes a guidance part which co-acts with a respective guide track of the respective guiding device 51, 52 such that the same is held by the respective guide track of the guiding device 51 and 52, at least in the YF- or YA-direction and that the same is moveable in the same in the ZF- or ZA-direction and consequently is a part which is guided by the respective guide track of the guiding device 51, 52.

With the embodiment of FIG. 1 the guiding devices 51, 52 are formed as respective guide tracks 53 and 54, which respectively extend along the ZF- and the ZA-direction, in form of a respective recess of the inner surfaces 41a and 42a, respectively, of the two support parts 41, 42 which face each other. The guide tracks 53, 54 particularly be realized such that the first bearing base 60B and the second bearing base 80B are guided over their entire respective adjustment path along the vertical or ZF-direction, wherein the guide tracks 53, 54 are formed such that the first bearing base 60B and the second bearing base 80B over their respective entire adjustment paths in the vertical or ZF-direction are disposed one above the other and also at least sectionally, overlapping one another.

As an alternative thereto, the guiding devices 51, 52 can be respectively realized also as guidance rod and the guidance parts as holding part which respectively partially or entirely encompasses the guidance rod.

Generally the guide arrangement 50 can be formed also by only a single guide track which is formed at the first or the second support part. In this case the first bearing base 60B or the second bearing base 80B or both respectively can be realized in one piece with the first base body 63 and 83, respectively, the second base body 64 and 84, respectively, and the connection part 60A and 80A, respectively, which connects the same so that one-piece base parts B1 and B2, respectively, are formed. In this context, as an alternative to the embodiment shown in FIG. 1, the support structure 40 can be formed by only one support part which has the form to the support parts 41, 42 which are shown in FIG. 1 or have essentially their form and which is disposed at the first side S1 of the vehicle frame 30 so that the support part is disposed at the base parts B1, B2. Analogously, this arrangement can also be realized at the second side.

At the first bearing base 60B a first holding device 69 is coupled to the base part B1 particularly for forming the first capturing device 61 and the second capturing device 62, wherein the first holding device 69 is coupled to the first bearing base 60B and particularly to the first capturing device 61 and the second capturing device 62 and to the base part B1 fixedly or moveably along the YA-direction moveable to the first bearing base 60B. In case of a moveable coupling of the first holding device 69 at the first bearing base 60B for forming a first capturing device 61 and a second capturing device 62, the first holding device 69 can be formed from a first support device 67 and a second support device 68 which is formed as separate part with regard to the first support device 67 (FIG. 1), wherein the first support device 67 is moveable at the first base body 61 and relative to the same along the YF-direction between a retracted and an extended state and the second support device 68 is moveable at the second base body 62 and relative to the same along the YF-direction between a retracted and an extended state. The first support device 67 and the second support device 68 are according to the embodiment shown in FIG. 1 realized respectively as an elongated part and as contacting part which extends with its longitudinal direction L67 and L68 along the YF-direction and respectively comprises a contact surface 67a and 68a, respectively. With the embodiment shown in FIG. 1 is shown, between a first holding device 69 and the first support device 67, respectively, and the first base body 63, as well as between the second support device 68 and the second base body 64, respectively, an adjustment device V67 and V68, respectively, is provided which respectively is formed such that the first support device 67 is moveable in its longitudinal direction L67 relative to the first base body 63 and the second support device 68 is moveable in its longitudinal direction L68 relative to the second base body 64, respectively. The first support device 67 and a second support device 68, with the embodiment of the stack operating vehicle F according to FIG. 1, are respectively formed as support devices with surfaces 67a and 68a which are oriented in ZF- and ZA-direction, respectively, by which at least one storage unit LE, particularly a stack of storage units LE, can be taken up. Preferably, the surfaces 67a and 68a are positioned, when viewed in ZA-direction, at least sectionally within the inner edge lines or edge surfaces 63i, 64i of the first and second base body 63 and 64, respectively. The first holding device 69 can also be formed from a holding piece which is formed as one-piece and which is movably coupled both to the first base body 63 and to a second base body 64 in the mentioned manner and hence extends between the first base body 63 and the second base body 64.

Figure 4:
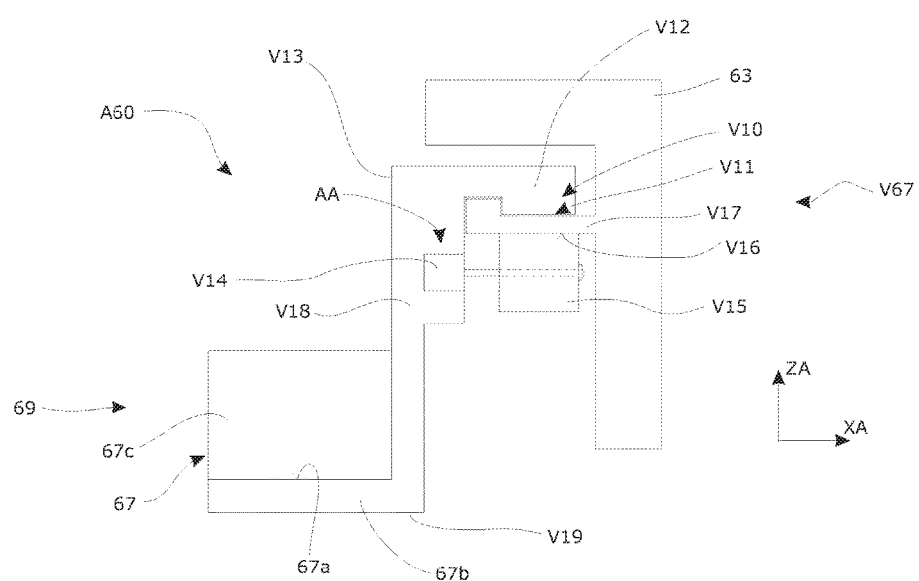
FIG. 4 is a cross section of the longitudinal cut of FIG. 3 along the section line Q3-Q3 as shown in FIG. 3.
Figure 5:
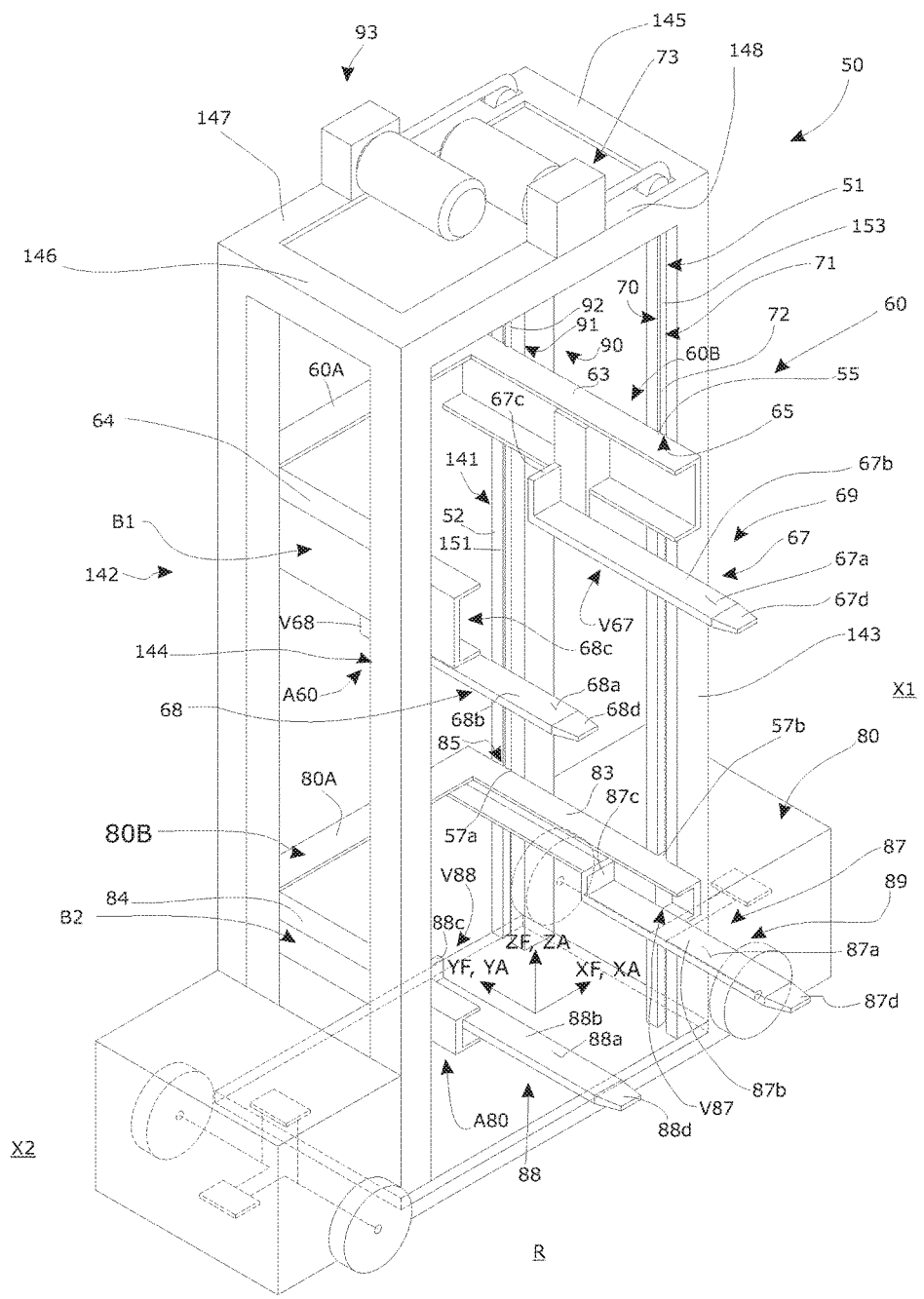
FIG. 5 is a schematic perspective of a further embodiment of the stack operating vehicle with a vehicle frame and with a base plate which is non-rotatably mounted on the vehicle frame, shown in a first operational state.

The support device 67, 68 is formed from a support section 67*b* and 68*b*, respectively, in form of a flat bar or an elongated bearing plate on which a storage unit LE can be positioned, and optionally is formed from an end piece 67*d* and 68*d*, respectively, which forms the end of the bearing base 60B which lies distant to the support device 67 and 68, respectively, and which tapers in a direction contrary to the YF- and YA-direction, and optionally is formed from an end piece 67*c* and 68*c*, respectively, which, where the case may be, forms the end of the support device 67, 68 which lies close to the bearing base 60B (FIG. 5). As shown in FIGS. 4 and 5, the end piece 67*c* and 68*c*, respectively, can be formed as contact piece and can extend from the support section 67*b* and 68*b*, respectively, in the ZF- and ZA-direction, respectively, in order to form a rest in the YF- and YA-direction against the movement of a storage unit LE which is positioned on the support section 67*b* and 68*b*, respectively. In opposite thereto, the end piece 67*c* and 68*c*, respectively, can also form an end of the support device 67, 68 which prolongs the planar extension of the support device 67, 68.

An embodiment of the adjustment devices V67, V68 are described with reference to the adjustment device V67 shown in the FIGS. 3 and 4. The adjustment device V67 can be realized by a guiding device V10 and a capturing partial drive device AA. The adjustment device V68 which is realized similar with the adjustment device V67 and analogously with regard to the YF- or YA-axis particularly also comprises a capturing partial drive device which together with the capturing partial drive device AA of the adjustment device V67 forms a gripping drive arrangement A60. In a corresponding manner the adjustment device V87 and the adjustment device V88 respectively comprises a capturing partial drive device which together form a capturing partial drive device A80 with the same functionality as the gripping drive arrangement A60.

Figure 3:
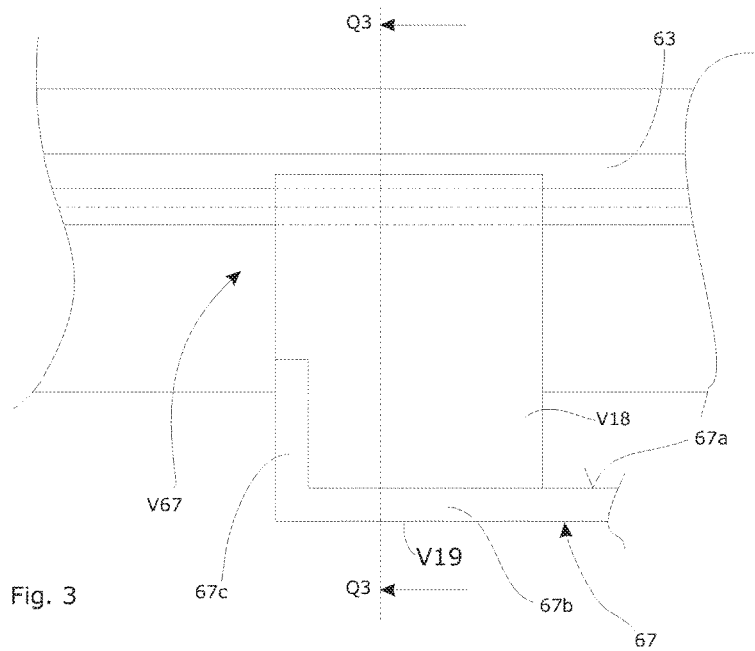
FIG. 3 is a longitudinal cross-section along a lateral axis of the stack operating vehicle across an adjustment device which for adjustment a first holding device opposite to a bearing base of the first bearing device.

As an example, in FIGS. 3 and 4 an embodiment of an adjustment device with the guiding device V10 with reference to the adjustment device V67 is shown: In this regard the guiding device V10 is formed from a guide track V11 and a guided part or a guidance part V12 of a connection body V13 which generally is formed at the first holding device 69 and, with the shown embodiment, at the first support device 67. The guidance part V12, by its form in relation to its cross-section in the longitudinal direction L65 of the base body 63, is received by the guide track V11 so that the guidance part V12 can be moved in the longitudinal direction L65 along the guide track V11 and hence is guided transversely to this direction by the guide track V11. With the embodiment of the adjustment device V67 of FIGS. 3 and 4 the capturing partial drive device AA comprises a drive motor V14 and a drive wheel V15 which is coupled to the same and driven by the same, wherein the drive wheel V15 is formed at an underside V16 of a retaining web V17 of the first base body 63 which extends in the longitudinal direction L65. As an alternative thereto, the capturing partial drive device AA with the drive motor V14 and the drive wheel V15 can generally be disposed at the first base body 63. The first base body 63 together with the capturing partial drive device AA and the support device 69 and 67, respectively, forms the first capturing device 61. In the following the reference numeral "AA" is also used for the capturing partial drive device of the adjustment device V68 and where appropriate for the adjustment devices V87, V88.

The connection body V13 comprises further a connection part V18 which is connected to the guidance part V12 and which comprises a lower end VG19 in the vertical or ZF- and ZA-direction, respectively, and the support device 67 particularly in form of an elongated gripping piece which again joins the lower end VG19. The support device 67 and the gripping piece comprises the surface 67*a* which is oriented in the ZF- and ZA-direction, respectively, and on which a storage unit LE can be positioned.

The adjustment device V68 is realized analogously too the adjustment device V67 with a guiding device V10 and a capturing partial drive device AA (FIG. 28), however mirrored at the YF- and YA-axis, respectively, wherein reference has to be made to the longitudinal direction L66 of the base bodies 64.

With an embodiment of the adjustment devices V67, V68 of FIG. 1 and the FIG. 4, 5 the connection parts V18 of the same have a respective minimum length in the ZF- and ZA-direction, respectively, as described with reference to FIG. 6.

Generally the guiding device V10, by which the holding device 69 or 89 is realized moveably guided at the first bearing base 60B and second bearing base 80B, respectively, comprises a guide track V11 which is formed at the first bearing base 60B and second bearing base 80B or the respective base body 63, 64 and 83, 84, respectively, and a guidance part V12 which is movably guided at the same and connected with the first holding device 69 or 89. In this case the guidance part V12 is formed at the first bearing base 60B such that, when the first bearing base 60B or the respective base body 63, 64 is positioned in a minimum possible distance to the second bearing base 80B or the respective base body 83, 84, a contact surface 67*a*, 68*a* of the first holding device 69 which is oriented in the vertical direction ZA is disposed when viewed in the vertical direction or ZA-direction according to one or both of the following alternatives: (a) in the same height or below a contact surface (87*a*, 88*a*) of the second holding device (89) of the second bearing device (80) which is oriented in the vertical direction (ZA); and (b) below the second bearing base (80B).

Figure 6:
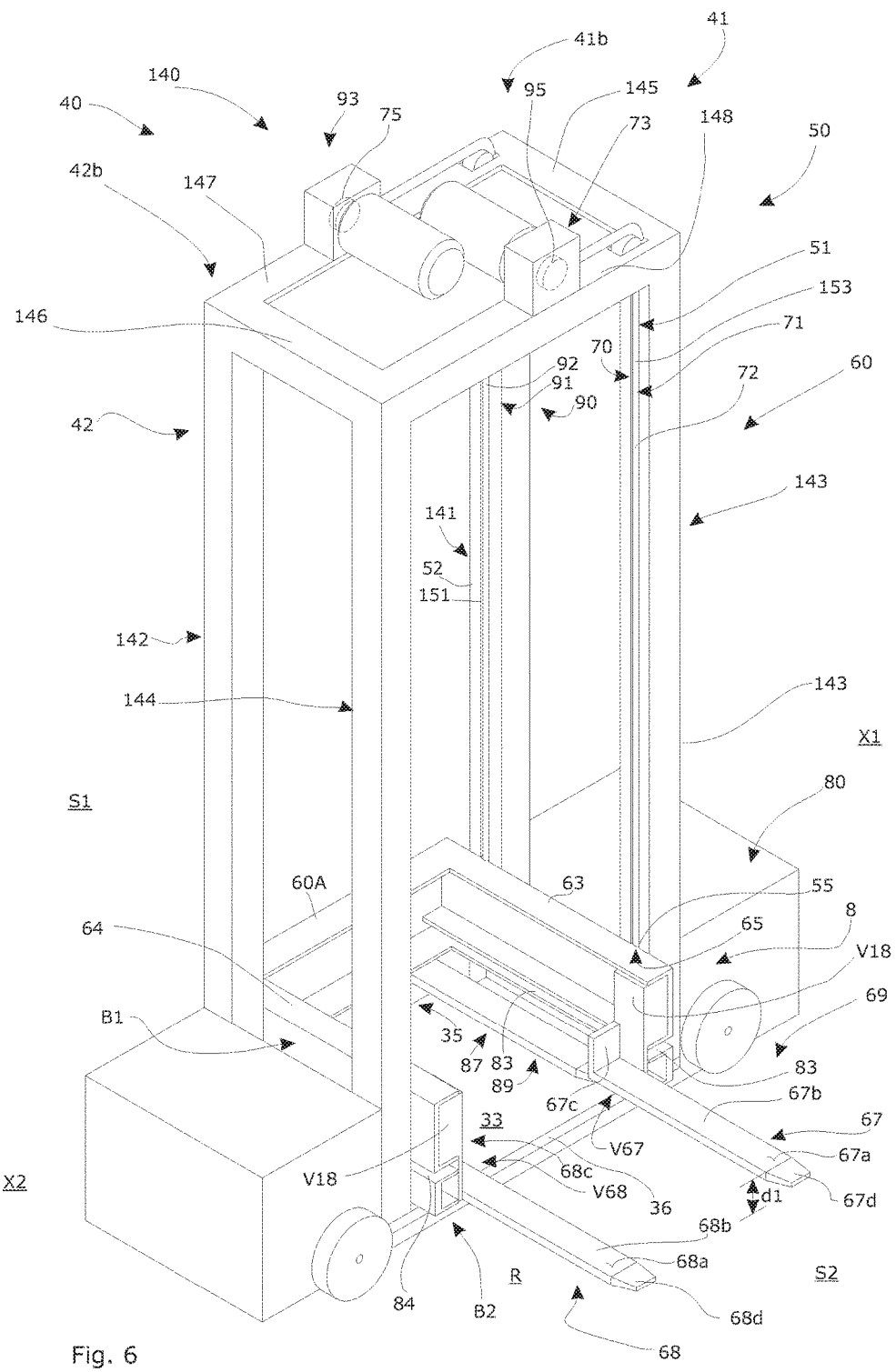
FIG. 6 depicts a further embodiment of the stack operating vehicle according to FIG. 5 shown in a second operational state.

Depending on the embodiment of the stack operating vehicle F and the actual positions of the first holding device 69 and the second holding device 89 relative to one another viewed in the ZA-direction, the minimum possible distance between a first bearing base 60B or the respective base body 63, 64 and the second bearing base 80B or the respective base body 83, 84 the second bearing device 80 is achievable, when the second bearing device 80 is in an at least partially retracted or entirely retracted state (FIG. 6).

Thereby it is possible that the second holding device 89 bears a storage unit LE and, with a retracted state of the second bearing device 80 with a storage unit LE, the first bearing device 60 in an extended state can be moved downward in order to pick up a lower storage unit LE.

The adjustment device V63 can also be realized in another manner. The adjustment device V68 which acts between the second base body 64 and the first holding device 69 and the second support device 68, respectively, can be realized in the same manner as one of the embodiments of the first adjustment device V63 described herein. In this regard also provision can be made that at the first holding device 69 in total only one drive device is provided.

The adjustment devices V67, V68 are only optional and are not used when the first holding device 69 is not moveable relative to the bearing base 60B.

The adjustment devices V87, V88 can be realized in the same manner with a guiding device V10 and a gripping drive arrangement A80 (FIG. 28) as described herein above with reference to the adjustment devices V67, V68, with reference to the longitudinal directions L86, L87 of the base bodies 83, 84.

A capturing adjustment device F60 and F80 (FIG. 28), respectively, with a capturing adjustment command function and a capturing drive device AA which is functionally commanded by the same is assigned to the capturing devices 61, 62, 81, 82 or the holding device 69, 89 of the first bearing device 60 and the second bearing device 80, respectively. The capturing drive device AA respectively is realized such that due to command signals which are generated with the same by a respective capturing adjustment command function the capturing devices 61, 62 and 81, 82, respectively, of a respective bearing device 60 and bearing device 80, respectively, can be moved from an initial state in a desired extension state, respectively within the retracted and the entire extended state of the capturing devices 61, 62 and 81, 82, respectively, or the telescopic holder 161, 162 and 181, 182, respectively. The capturing drive devices AA of a holding device 69, 89 respectively realized such that, due to command signals which are generated by the respective capturing adjustment command function, the respective telescopic holder 161, 162 and 181, 182, respectively, of a holding device 69 and 89, respectively, both can be moved within given limits of uncertainty.

Hence the first bearing device 60 and the second bearing device 80 can generally be realized as telescopic device. With the first support device 60 with the first support device 67 and the second support device 68, the first support device 67 is moveable in its longitudinal direction L67 relative to the first base body 63 and the second support device 68 is moveable in its longitudinal direction L68 relative to the second base body 64 so that the support devices 67, 68 are retractable and extendable and hence telescopic. In the same manner, with the second bearing device 80 with the first bearing device 87 and the second support device 88, the first bearing device 87 in its longitudinal direction L87 is moveable relative to the first base body 83 and the second support device 88 is moveable in its longitudinal direction L88 relative to the second base body 84 so that the bearing devices 87, 88 are retractable and extendable and hence telescopic. However, this property to be telescopic is provided at the first bearing device 60 only optionally. Generally further telescopic components can be disposed between a respective bearing device 65, 66 or 85, 86 and the corresponding base body 63 and 64 or 83 and 84, respectively, respectively as telescopic components, and can be disposed such that the telescopic components of a respective capturing device 61, 62 and 81, 82, respectively, can be moved relative to one another, respectively commanded by a telescope mechanism, with a retraction movement or extension movement of the respective support device 67 and 68, respectively. In this case each telescopic capturing device 61, 62 and 81, 82, respectively, is constructed such that during its retraction movement and its extension movement increasing adjustment paths from one telescopic component to the next telescopic component, viewed from the respective base body 63 and 64, respectively, or 83 and 84, respectively, in direction or along the along the YF- and the YA-axis, this means in direction to the corresponding support device 67 and 68, respectively, or 87 and 88, respectively.

Analogously, the second bearing device 80 which is moveably disposed at the second bearing base B2, can comprise a bearing base 80B and particularly a first capturing device 81 and a second capturing device 82 with a second holding device 89 which is adjustable with relation to the respective capturing device which together are constructed for picking-up and bearing a storage unit LE or a stack of storage units LE and also for moving a storage unit LE or a stack of storage units LE relative to the support structure 40 along the YF-axis. The first capturing device 81 and the second capturing device 82 can comprise a first base body 83 and a second base body 84, respectively.

According to the embodiment of FIG. 1 a second holding device 89 is moveably along the YA-direction coupled to the base part B2 for forming the first capturing device 81 and the second capturing device 82, wherein the second holding device 89 can be formed from a first support device 87 and a second support device 88 and in this case formed as one piece of as two pieces (FIG. 1), wherein the first support device 87 is moveable at the first base body 81 and in relation thereto along the YF-direction between a retracted and an extended state and the second support device 88 is moveable at the second base body 82 and in relation thereto along the YF-direction between a retracted and an extended state. With the embodiment shown in FIG. 1, the first support device 87 and the second support device 88 are respectively formed from an elongated support part which with its longitudinal direction L87 and L88, respectively, extends along the YF-direction. At the same time between a first support device 87 and the first base body 83 as well as between a second support device 88 and the second base body 84 respectively an adjustment device V87 and V88, respectively, is provided which respectively is formed such that the first support device 87 is moveable in its longitudinal direction L87 in relation to the first base body 83 and the second support device 88, respectively, and in its longitudinal direction L88 in relation to the second base body 84. With the embodiment of the stack operating vehicle F according to FIG. 1 the first bearing device 87 and the second support device 88 are formed from surfaces 87a and 88a, respectively, as bearing devices which are oriented in ZF- and ZA-direction, respectively, and by which at least a storage unit LE, also particularly a stack of storage units LE, can be taken up. Preferably, the surfaces 87a and 88a are positioned when viewed in ZA-direction at least sectionally within the inner edge lines or edge surfaces 83i, 84i of the first and second base body 83 and 84, respectively. The first holding device 89 can also be formed from a one-piece holding piece which is moveably coupled to the first base body 83 and a second base body 84 in a described manner and hence extends between the first base body 83 and the second base body 84.

The bearing device 87, 88 is formed from a support section 87b and 88b, respectively, in form of a flat bar or an elongated bearing plate on which a storage unit LE can be positioned, and optionally is formed from an end piece 87d and 88d, respectively, which forms the end of the bearing base 80B which lies distant to the support device 87 and 88, respectively, and which tapers in a direction contrary to the YF- and YA-direction, and optionally is formed from an end piece 87c and 88c, respectively, which, where the case may be, forms the end of the support device 87, 88 which lies close to the bearing base 80B (FIG. 5). As shown in FIGS. 4 and 5, the end piece 87c and 88c, respectively, can be formed as contact piece and can extend from the support section 87b and 88b, respectively, in the ZF- and ZA-direction, respectively, in order to form a rest in the YF- and YA-direction against the movement of a storage unit LE which is positioned on the support section 87b and 88b, respectively. In opposite thereto the end piece 87c and 88c, respectively, can also form an end of the support device 87, 88 which prolongs the planar extension of the support device 87, 88.

Hence the first capturing device 81 and the second capturing device 82 generally can be realized respectively as telescopic device with a first support device 87 and a second support device 88, wherein the first support device 87 is moveable in its longitudinal direction L87 in relation to the first base body 83 and the second support device 88 in its longitudinal direction L88 in relation to the second base body 84, respectively, hence retractable and extendable and hence telescopic. Generally further telescopic components can be disposed between a respective support device 87 and 88, respectively, and the corresponding base body 83 and 84, respectively, respectively as telescopic components, and with the same kinematically coupled, further telescopic components can be disposed such that the telescopic components of a respective capturing device 81, 82, respectively, can be moved relative to one another, respectively commanded by a telescope mechanism, with a retraction movement or extension movement of the respective support device 87 and 88, respectively. In this case each telescopic capturing device 81, 82 is constructed such that during its retraction movement and its extension movement increasing adjustment paths from one telescopic component to the next telescopic component, viewed from the respective base body 83 and 84, respectively, in direction or along the along the YF- and the YA-axis, this means in direction to the corresponding support device 87 and 88, respectively.

The first height adjustment device 70 for adjustment the first bearing device 60 in the vertical direction ZF comprises a first actuation device 71 and a drive device 73 with a motor 74 for actuation the same. In the same manner, the second height adjustment device 90 for adjustment the second bearing device 80 in the vertical direction ZF comprises a second actuation device 91 and a drive device 93 with a motor 94 for actuation the same. The height adjustment device 70 and the height adjustment device 90 together are particularly realized such that the first bearing base 60B and the second bearing base 80B respectively are guided on an adjustment path along the vertical or ZF-direction which are formed such that the first bearing base 60B and the second bearing base 80B over their respective overall adjustment paths are disposed in the vertical or ZF-direction one above the other and in addition at least sectionally overlapping one another.

Figure 28:
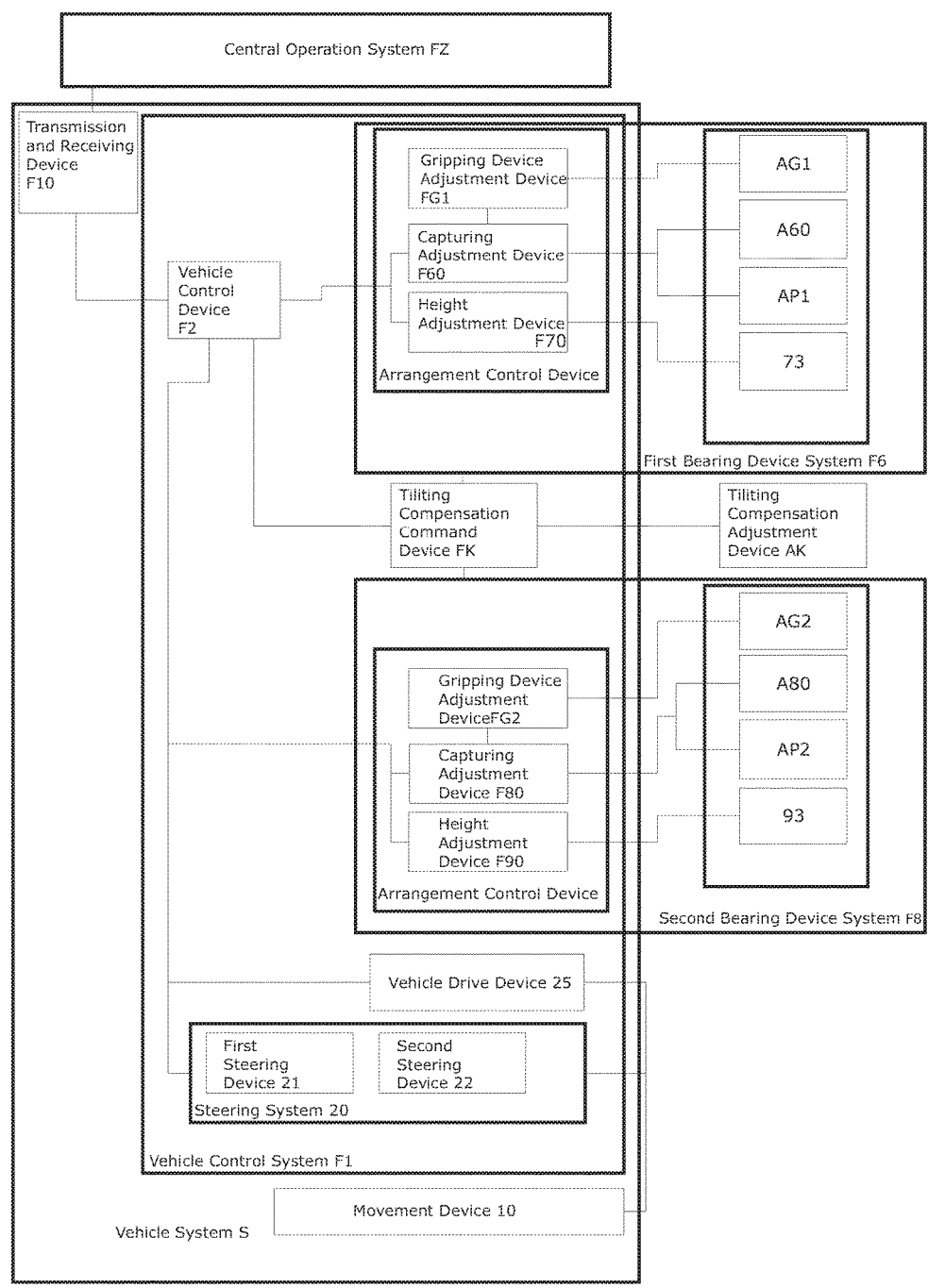
FIG. 28 depicts a functional presentation of a stack operating vehicle system which can coact with the stack operating vehicle for adjustment of different operational states of the second embodiment of the stack operating vehicle, particularly of the embodiment of the stack operating vehicle of FIG. 10.

Height adjustment devices F70 and F90 respectively, with a height adjustment command function and a height adjustment drive device 73 and 93, respectively, which are functionally commanded by a respective height adjustment command function, are assigned to the first height adjustment device 70 and the second height adjustment device 90 (FIG. 28). The height adjustment drive devices 73, 93 are designed respectively such that with these, due to command signals which are generated by a respective height adjustment command function the bearing base 60B and 80B, respectively, hence the both base bodies 63, 64 and 83, 84, respectively, of the same can be moved in the same manner from an initial adjustment state to a desired adjustment state respectively within the lower and the uppermost adjustment state of the bearing base 60B and 80B, respectively.

With the embodiment of the stack operating vehicle F according to FIG. 1, the first actuation device 71 and the second actuation device 91 respectively comprises a flexible conveyor part particularly such as a towing rope 72 and 92, respectively, and the drive motors 73 and 93, respectively, are respectively disposed at an upper end of the support part 42 and 41, respectively. The drive devices 73 and 9, respectively, comprise a device for rolling-up the respective towing ropes 72 and 92, respectively. Further at the first base body 83 the second bearing device 80 a first connecting device 85 is formed to which the towing rope 92 of the second actuation device 91 is mounted to couple the first base body 83 to the first actuation device 71. The first connecting device 85 is realized as mounting device by which the towing rope 91 is mounted to the first base body 83. With the embodiment shown the towing rope 91 runs in the guide track 53 so that in the first guidance part 55 a through bore 65' is formed through which the towing rope 91 passes. Further, at the second base body 64 of the first bearing device 60 a second connecting device 66 is formed at which the flexible conveyor part or the towing rope 72 of the first actuation device 71 is mounted in order to couple the second base body 64 to the first actuation device 71. The second connecting device 66 is realized as mounting device by which the towing rope 92 is mounted to the second base body 64.

With the embodiment of FIG. 1—as described—the first base body 63 and the second base body 64 are connected by a connection part 60A and the first base body 83 and the second base body 84 are connected by a connection part 80A and respectively form the one-piece base part B1 and B2, respectively. As further the base part B1 and B2, respectively, are guided by the vertical guide arrangement 50 in the ZF-direction or the vertical direction with the support parts 41, 42, by corresponding actuation of the first height adjustment device 70 and of the respective drive 73 of the same, or by corresponding actuation of the second height adjustment device 90 and of the respective drive 93 of the same, the respective base part B1 or B2 can be moved in the vertical direction upward or downward. As the drives can be actuated independently from one another, the vertical movement of the base parts B1, B2 can also be realized simultaneously.

The guidance part and the connecting device of a base part can be realized as parts which are separate from one another so that the respective connecting device does not need to be guided in a guide track.

With an alternative embodiment provision can be made that the guidance parts of the first base bodies 63 and 83, respectively, can be constructed respectively as first connecting devices of the first base bodies 63 and 83, respectively, and the guidance parts of the second base bodies 64 and 84, respectively, can be constructed respectively as second connecting devices of the second base bodies 64 and 84. In this regard for the guidance parts of the first base body 63 and 83, respectively, a respective own guide track of the first guiding device 51 can be formed at the first support part 41. Analogously, for the guidance parts of the second base bodies 64 and 84, respectively, a respective own guide track of the second guiding device 52 can be formed at the first support part 42.

With the embodiment according to FIG. 1 the first bearing device 60 and the second bearing device 80 are respectively are fixedly coupled with both actuation devices 71, 91 by a connecting device 66 and 85, respectively, in the actuation directions R71 and R72, respectively, of the same which are directed along the vertical direction ZF so that the same can be moved in the vertical direction ZF relative to the support construction 40.

The actuation devices 71, 91 are respectively realized, for example, as towing rope or driving belt, hence generally as elongated flexible conveyor part, with a support drum 75 and 95, respectively, at the upper end 41b, 42b to which the towing ropes 72 and 92, respectively, or driving belts are rolled up. As the towing ropes or driving belts 72 and 92, respectively, with lower ends with regard to the ZF-direction are respectively mounted to connecting devices 66, 85 of the first base part B1 and of the second base part B2, the same—in the shown embodiment—need not be rolled-up at the lower end 41c, 42c of the respective support part 41 and 42, respectively, on a lower pulley. Accordingly, with the embodiment of the stack operating vehicle F of FIG. 1 no lower pulley is provided.

The actuation devices 71, 91 which are realized as elongated flexible conveyor parts 72 and 92, respectively, can also be realized as chain or as toothed belt or as toothed belt. Instead of the towing ropes 72 and 92, respectively, also adjustment cylinders or telescopic rods can be used.

The stack operating vehicles F comprises the movement device 10 for movement of the stack operating vehicle F on the base. The movement device 10 is depicted in FIG. 1 as formed from an arrangement of wheels 11, 12, 13, 14. In his regard, respectively, two wheels 11, 12 and 13, 14, respectively, are rotatably mounted particularly at the longitudinal sides S1 and S2 which are oriented contrary to each other by means of a respective wheel suspension 11a and 12a and 13a and 14a, respectively, wherein the wheel suspensions can be coupled to or arranged at a vehicle frame 30 or lower sections of the support structure 40. The pair of wheels 11, 12 is disposed at or in the near of the front side V and the pair of wheels 13, 14 is disposed at or in the near of the rear side R of the stack operating vehicle F. The wheels comprise an axis which together are coaxially alignable and which are coaxially aligned in a neutral position, wherein the axes run in the YF-direction.

A stack operating vehicle drive device 25 of the stack operating vehicle F is coupled to the movement device 10. By the stack operating vehicle drive device 25 the stack operating vehicle F can be set in movement and, in an embodiment of the stack operating vehicle F, wheels of the stack operating vehicle F can be set in rotation.

With an embodiment of the movement device 10 the wheels 11, 12, 13, 14 are not rotatable around a steering axis ZF, hence in a neutral position, in which the stack operating vehicle F executes a driving straight ahead, and rotatably disposed at the vehicle frame 30.

Optionally the stack operating vehicle F comprises a steering system 20 for execution of changes of the direction of the stack operating vehicle F during driving on a runway of the warehouse floor R. In this regard the steering system 20 is constructed preferably such the steering movements of the wheels are related to the neutral position in which the stack operating vehicle F executes a driving straight ahead. The steering system 20 can be realized in different manner. The stack operating vehicle F according to FIG. 1 comprises a steering system 20 with a first or front steering device 21 and a second or rear steering device 22 (FIG. 28). The first steering device 21 comprises a steering command function and a steering mechanism which is functionally commanded by the same. The steering mechanism is functionally coupled to the wheel suspensions with the rotation axes 11a, 12a for the front wheels 11, 12 such that the first steering device 21 can execute steering movements of the front wheels 11, 12 due to command signals which are generated by the command function, wherein the steering movements comprises a rotation of the wheels around the ZF-axis which is executed by the respective steering mechanism. The rotation of the wheels around the ZF-axis can be realized for example by corresponding swiveling of the respective wheel suspensions. Further the second steering device 22 comprises a steering command function and a steering mechanism which is functionally commanded by the same. The steering mechanism is functionally coupled to the wheel suspensions with the rotation axes 13a, 14a for the rear wheels 13, 14 such that the second steering device 22 can execute steering movements of the rear wheels 13, 14 due to command signals which are generated by the command function, wherein the steering movements comprises a rotation of the wheels around the ZF-axis which is executed by the respective steering mechanism. The rotation of the wheels around the ZF-axis can be realized for example by corresponding swiveling of the respective wheel suspensions. As an alternative thereto, the stack operating vehicle F can comprise only the first or front steering device 21 or the second or rear steering device 22 so that the stack operating vehicle F can only be steered by the front wheels 11, 12 or the rear wheels 13, 14. The wheels 11, 12, 13, 14 can be realized such that with the same the stack operating vehicle F can be driven on a planar runway, for example on the runway of a street or a warehouse. As an alternative thereto, the wheels 11, 12, 13, 14 can be realized such that the same can be put on rails so that the stack operating vehicle F with the same can be driven on rails. In this case the rails form the above-mentioned runway on a warehouse floor R.

Generally, the stack operating vehicle F can also include less than four wheels, for example three wheels, or more than four wheels, for example, six wheels. In this case the wheels which are disposed respectively at the X1-side or the X2-side or both at the X1-side and at the X2-side are steerable and connected with the steering mechanism of the respective steering devices 21 and 22, respectively, for execution of steering movements.

The stack operating vehicle F can comprise a vehicle frame 30. In FIG. 1 the vehicle frame 30 is shown as frame body. Alternatively or additionally thereto the vehicle frame 30 can be realized by a combination or arrangement of beams (not shown). With an embodiment of the stack operating vehicle F with a vehicle frame 30 the same is realized for mounting the movement device 10 with the wheels. Optionally the vehicle frame 30 can be realized for mounting the support structures 40 so that with this embodiment this support structure 40 is arranged and mounted to the vehicle frame 30. Optionally the vehicle frame 30 can be realized for mounting the vertical guide arrangement 50 so that with this embodiment the vertical guide arrangement 50 is arranged and mounted at the vehicle frame 30.

With the embodiment of the stack operating vehicle F according to FIG. 1 the vehicle frame 30 comprises: a front frame part 31 with regard to the XF-axis at which the wheel suspensions with the rotation axes 11a, 12a defined by the same for the front wheels 11, 12 are supported, a rear frame part 32, at which the wheel suspensions with the rotation axes 13a, 14a defined by the same for the rear wheels 13, 14 are supported, and the base plate 33 which is situated between the front frame part 31 and the rear frame part 32. The base plate 33 is fixedly connected with the front frame part 31 and the rear frame part 32 and hence mounted thereto so that the front frame part 31 and the rear frame part 32 can absorb the forces which are executed by the base plate 33.

The vehicle-fixed coordinate system KS-F can be defined particularly by means of the vehicle frame 30. In this regard the XF-axis can be defined as a symmetry axis between wheels which are lying opposite to each other with regard to the demanded drive direction or the wheel suspensions of the same. Independent of the existence of a vehicle frame 30, the vehicle-fixed coordinate system KS-F can generally also be defined by the longitudinal axis of the base frame or vehicle frame 30 which particularly is the symmetry axis of the base frame or vehicle frame 30. The ZF-axis can particularly be defined as a direction which is directed in the negative gravitational vector, hence directed contrary to the gravitational vector, when the base frame or the vehicle frame 30 is situated on a horizontal plane according to its intended function.

Generally the coordinate system KS-F can also be defined by the rotation axes which are provided by the movement device 10, in the embodiments of the stack operating vehicle F shown the rotation axes 11a, 12a, 13a, 14a, wherein the connection points of the wheels at the rotation axes 11a, 12a, 13a, 14a define the XF-YF-plane. In this regard the YF-axis can be a symmetry axis for the connection points.

Figure 2:
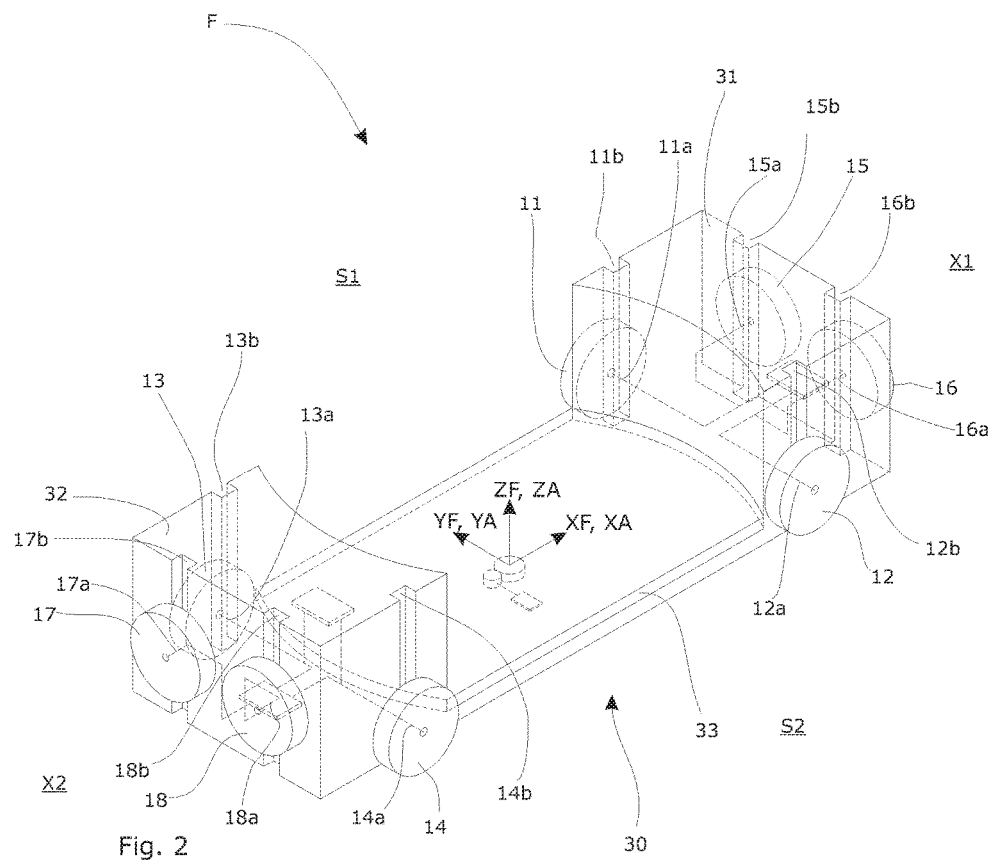
FIG. 2 is a closer view of an embodiment of the stack operating vehicle of FIG. 1.

In FIG. 2 a further embodiment of the stack operating vehicle F is shown which is based on the stack operating vehicle F of FIG. 1, wherein in the FIG. 2 essentially only the vehicle frame 30 and the movement device 10 of the stack operating vehicle F is shown—and not the support structure 40. The embodiment of the stack operating vehicle F sectionally shown in FIG. 2 differs from the embodiment of the stack operating vehicle F according to FIG. 1 by the arrangement of four additional wheels 15, 16, 17, 18 respectively with a rotation axis 15a and 16a and 17a and 18a, respectively, with which the respective wheel 15, 16, 17, 18 is rotatably mounted. In this regard two wheels 15, 16 are disposed at the front side X1 and two wheels 15, 16 are disposed at a rear side X2 of the vehicle frame 30, wherein the wheels 15 and 16 and 17 and 18, respectively, of the respective two wheels are distanced from one another in YF-direction such that the wheels 15, 16, 17, 18 in total alone guarantee a tilt stability of the stack operating vehicle F. The wheel suspensions respectively comprise a guidance part (not shown) in which respectively one of the rotation axes 15a and 16a and 17a and 18a respectively, is disposed and which is guided in a guide track 15b and 16b and 17b and 18b, respectively, which respectively runs along the ZF-direction so that the wheels due to a movement of the respectively related guidance parts can be moved along the respective guide track upward or downward in the ZF-direction. The steering command function of the first steering device 21 in this case comprises a drive device which is functionally commanded by the same and which is coupled to the guidance parts which are respectively guided by a guide track 15b, 16b and in which a respective rotation axis 15a, 16a for a front wheel 15 and 16 respectively, is incorporated. The drive device and the guidance parts are coupled such that the first steering device 21 can execute movements of the guidance parts in the respective guide track 15b, 16b in or contrary to the ZF-direction due to command signals which are generated by the command function. Also the steering command function of the second steering device 22 comprises a drive device which is functionally commanded by the same and which is coupled to the guidance parts which are respectively guided by a guide track 17b, 18b and in which a respective rotation axis 17a, 18a for a respective rear wheel 17 and 18 is incorporated. The drive device and the guidance parts are coupled such that the second steering device 22 can execute movements of the guidance parts in the respective guide track 17b, 18b in or contrary to the ZF-direction due to command signals which are generated by the command function. The respective drive device can comprise an adjustment motor which is functionally coupled with the steering command function and an adjustment mechanism which couples the same and the respective guidance parts. Also a separate drive device can be disposed at each guidance part with an adjustment motor which is functionally coupled with the steering command function and an adjustment mechanism which is coupled to the respective guidance part for movement of the guidance part in its guide track.

The areas of the adjustment of the wheels 15, 16, 17, 18 along the respective guide tracks 15b and 16b and 17b and 18b, respectively, can be realized in different manner. In the case that wheels 11, 12, 13, 14 which rotate around the YF-direction are not disposed retractable and extendable in the vertical direction, the extended state of the wheels 15, 16, 17, 18 is realized such that the wheels 11, 12, 13, 14 are with their outer circumference lifted from the warehouse floor R and positioned in a distance from the same so that the wheels 11, 12, 13, 14 have no contact with the warehouse floor R and no influence to the drive movement of the stack operating vehicle F. In this case in opposite thereto the retracted state of the wheels 15, 16, 17, 18 is realized such that the wheels 15, 16, 17, 18 are lifted from the warehouse floor R and are disposed in a distance from the same so that the wheels 11, 12, 13, 14 are with their outer circumference in contact with the warehouse floor R so that the wheels 11, 12, 13, 14 define the driving movement of the stack operating vehicle F.

Optionally also guide tracks 11b, 12b, 13b, 14b are formed—as shown—at the longitudinal sides S1, S2 of the vehicle frames 30 which run in the ZF-direction. The wheel suspensions of the wheels 11, 12, 13, 14 respectively comprise a guidance part (not shown) in which a respective rotation axis 11a and 12a and 13a and 14a, respectively, is mounted and which is guided in a guide track 11b and 12b and 13b and 14b, respectively, which runs along the ZF-direction so that the wheels 11, 12, 13, 14 can be moved due to a movement of the respectively associated guidance part along the respective guide track in the ZF-direction upward or downward. The steering command function of the first steering device 21 comprises in this case a drive device which is functionally commanded by the same and which is coupled with the guidance parts which are guided in a respective guide track 11b, 12b and in which respectively a rotation axis 11a, 12a for a front wheel 11, 12 is accommodated. The drive device is coupled with the guidance parts such that the first steering device 21 can execute movements of the guidance parts in the respective guide track 11b, 12b in or contrary to the ZF-direction due to command signals which are generated by the command function. Also the steering command function of the second steering device 22 comprises in this case a drive device which is functionally commanded by the same and which is coupled with the guidance parts which are guided in a respective guide track 13b, 14b and in which respectively a rotation axis 13a, 14a for a rear wheel 13, 14 is accommodated. The drive device is coupled with the guidance parts such that the second steering device 22 can execute movements of the guidance parts in the respective guide track 13b, 14b in or contrary to the ZF-direction due to command signals which are generated by the command function.

Also at each guidance part of one of the wheels 11, 12, 13, 14 a separate drive device with an adjustment motor which is functionally connected with the steering command function and an adjustment mechanism coupled between the same and the respective guidance part for movement of the guidance parts in their respective guide track can be disposed. With realization both the adjustability of the wheels 11, 12, 13, 14 and the wheels 15, 16, 17, 18 respectively in the vertical direction provision is particularly made that the command function generates command signals for the respective drive device, by which: either the wheels 11, 12, 13, 14 are moved in an extended state, in which the wheels 11, 12, 13, 14 with their outer circumference are in contact with the warehouse floor R so that the wheels 11, 12, 13, 14 define the driving movement of the stack operating vehicle F, and the wheels 15, 16, 17, 18 with their outer circumference are lifted from the warehouse floor R and are positioned in a distance from the same so that the wheels 15, 16, 17, 18 are not in contact with the warehouse floor R and have no influence on the driving movement of the stack operating vehicle F; or, the wheels 15, 16, 17, 18 are moved in an extended state, in which the wheels 15, 16, 17, 18 with their outer circumference are in contact with the warehouse floor R so that the wheels 15, 16, 17, 18 define the driving movement of the stack operating vehicle F, and the wheels 11, 12, 13, 14 with their outer circumference are lifted from the warehouse floor R and are positioned in a distance from the same so that the wheels 11, 12, 13, 14 are not in contact with the warehouse floor R and have no influence on the driving movement of the stack operating vehicle F.

Generally the guide tracks 11b, 12b, 13b, 14b need not be formed at the outer side of the vehicle frame 30, as it is shown in FIG. 2. The guide tracks can respectively also be realized as bar which comprises recesses for forming the respective guide track, wherein the bar is mounted at the vehicle frame 30 or at the support structure, hence at the side part 41, 42 of the same.

In FIGS. 5 and 6 a further embodiment of the stack operating vehicle according to the disclosure is shown. With this embodiment a base plate 33 is disposed non-rotatably on the vehicle frame 30.

Differing from the embodiment of the stack operating vehicle F according to FIG. 1 the support structure to which in this embodiment the reference numeral 140 is assigned is formed from, with regard to the XF-direction, two front support bars 141, 143 and two rear support bars 142, 144. A respective one of the front support bars 141, 143 and of the two rear support bars 142, 144, respectively, one support bar 141 and 142, respectively, is positioned at an edge 35 of the base plate 33 which is disposed at the first longitudinal side S1 of the stack operating vehicle F, and one support bar 143 and 144, respectively, is positioned at an edge 36 of the base plate 33 which is disposed at the second longitudinal side S2 of the stack operating vehicle F. The two front support bars 141, 143 are connected with one another at their upper ends 141a and 143a, respectively, hence at the upper ends 41b, 42b of the side part 41 and 42, respectively, by means of a connecting rod 145 so that the front support bars 141, 143 together with the connecting rod 145 form a bearing structure. In the same manner, the two rear support bars 142, 144 are connected with one another at their upper ends 142a and 144a, respectively, by means of a connecting rod 146 so that the rear support bars 142, 144 together with the connecting rod 146 form a bearing structure. The upper ends 141a, 142a of the support bars 141 and 142, respectively, which are disposed at the first longitudinal side S1 are also connected with one another by means of a connecting rod 147, and also the upper ends 143a, 144a of the support bars 143 and 144, respectively, which are disposed at the second longitudinal side S2 are connected with one another by means of a connecting rod 148 so that the complete support structure 140 is stiffened as bearing structure. In a further embodiment of the support structure 140 the same comprises only one of the connecting rods 147, 148 in order to connect the support parts 41 and 42 at their upper ends 41b and 42b, respectively, with one another for stiffening the support structures 140.

With the embodiment of the stack operating vehicle F according to FIGS. 5 and 6 the first actuation device 71 of the first height adjustment device 70 for adjustment of the first bearing device 60 and the second actuation device 91 of the second height adjustment device 90 for adjustment of the second bearing device 80 are each formed as towing rope 72 and 92, respectively, or drive belt with a upper guide pulley 75 and 95, respectively, at the upper end 41b. The guide pulley 75 and 95, respectively, is mounted on the connecting rod 147 and 148, respectively, as component of the drive device 73 and 93, respectively. As with the embodiment of the stack operating vehicle F according to FIG. 1 the actuation devices 71, 91 are respectively constructed as driving belt 72 and 92, respectively, with a guide pulley 75 and 95, respectively, at the upper end 41b, 42b, at which the driving belt 72 and 92, respectively, is rolled up. By analogy with the embodiment of FIG. 1 the actuation devices 71, 72 or driving belts 72 and 92, respectively, are mounted with a lower end at the connecting device 65 of the first base parts B1 and at the connecting device 83 of the second base part B2, respectively. In this regard the connecting device 65 is mounted at the first base body 63 of the first bearing device 60 at a lower end of the towing ropes 72 and the connecting device 85 of the second base parts the second bearing device 80 is mounted with a lower end of the towing ropes 92.

Figure 29:
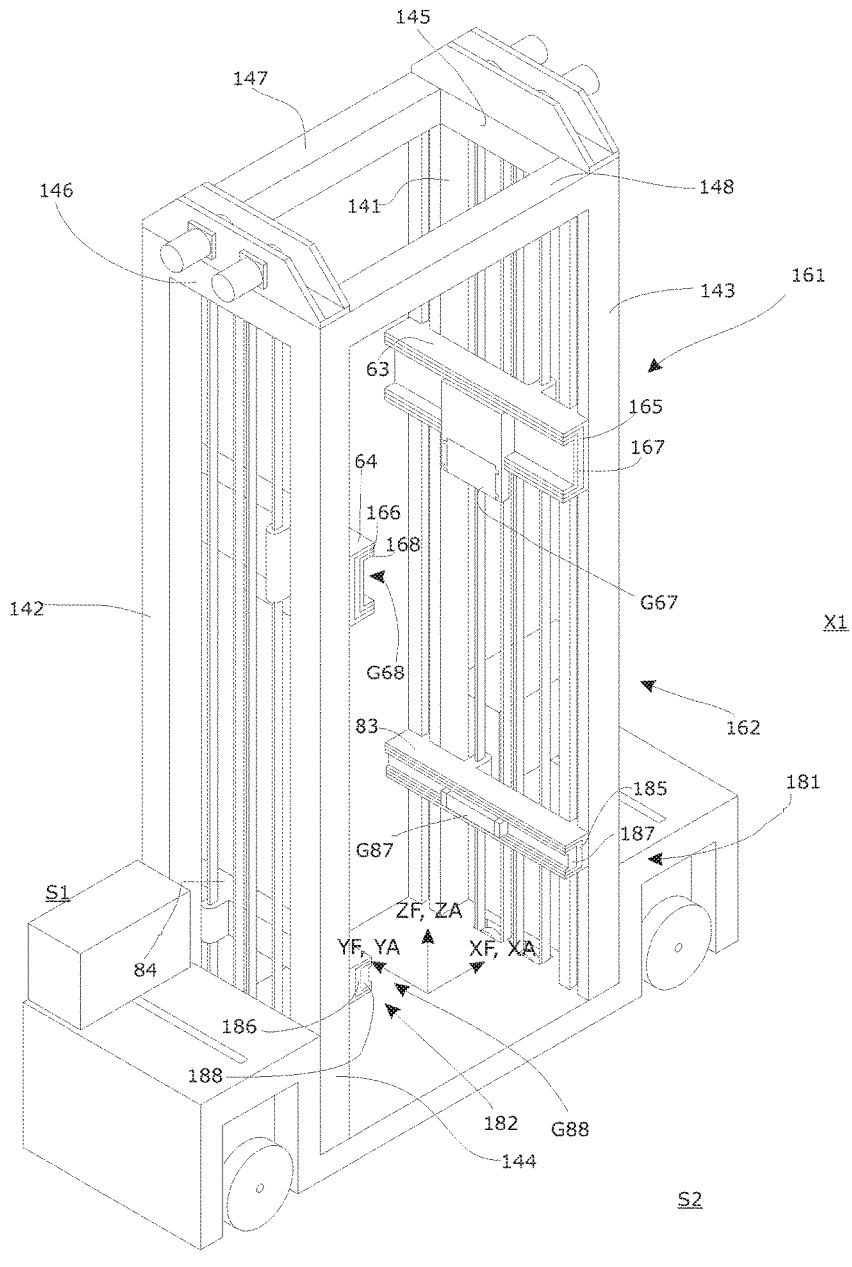
FIG. 29 depicts the embodiment according to FIG. 10, wherein the holding devices of the first and the second bearing base are in a retracted neutral position.

By analogy with the embodiment of the stack operating vehicle F according to FIG. 1 to the first height adjustment device 70 and the second height adjustment device 90, respectively, a height adjustment device F70 and F90, respectively, each with a height adjustment command function and a height adjustment drive device 73 and 93, respectively, which is respectively assigned to the respective height adjustment command function in a functional manner (FIG. 29). The height adjustment drive devices 73, 93 are realized such that with these command signals which are generated by a respective height adjustment command function the respective bearing base 60B and 80B, respectively, hence both base bodies 63, 64 and 83, 84, respectively, of the same in the same manner, can be moved from an initial state in a desired adjustment state respectively within the lower and uppermost adjustment state of the respective bearing base 60B and 80B, respectively.

The guiding device 50 of the embodiment of the stack operating vehicle F of FIG. 5 is realized differently to the guiding device 50 of the embodiment of the stack operating vehicle F of FIG. 1: The first base body 63 is guided with the first guidance part 55 which is formed thereon in the first guide track 153 which is formed in the support bar 143, wherein the cross-section of the first guidance part 55 and the length thereof in the ZF-direction is designed such that the base part B1 during its movement along the guide track 53 is held in a constant horizontal alignment in the XF-YF-plane. At the first guidance part 55 the connecting device 65 is formed and for this purpose can comprise a recess device as an opening or bore for capturing the towing ropes 72 and a clamping device for mounting the towing rope 72 at the connecting device 65 and the first guidance part 55, respectively. With the embodiment of the stack operating vehicle F of FIG. 4 at the first base body 83 of the second bearing device 80 two guidance parts 57a, 57b are disposed which are disposed on the side of the first base body 83 which faces the support bars 141, 143. The guidance parts 57a, 57b are distanced from one another in the YF-direction such that these are guided in a respective guide track 151 of the support bar 141 and in a guide track 153 of the support bar 143, respectively. At least one of the cross-sections of the guidance parts 57a, 57b and their lengths in the ZF-direction are designed such that the base part B2 during its movement along the guide track 151 and 153, respectively, is held in a constant horizontal alignment in the XF-YF level.

The adjustment devices V67, V68, V87, V88 can be realized in the same manner with a guiding device V10 and a capturing drive device AA (FIG. 29) as described above with reference to the embodiment of the stack operating vehicle F of FIG. 1: To the capturing devices 61, 62, 81, 82 or the holding device 69, 89 of the first bearing device 60 and the second bearing device 80, respectively, a capturing adjustment device F60 and F80, respectively, (FIG. 29) with a capturing adjustment command function and capturing drive device AA which is commanded by the same is assigned.

With the embodiments of the adjustment devices V67, V68 of FIG. 1, and with FIGS. 3-4 and with FIGS. 5-6, the respective connection parts V18 thereof have a minimum length which extends in the ZF- and ZA-direction.

In this regard the first bearing device 60 and the second bearing device 80 and the minimum length of the connection parts V18 of the first bearing device 60 and the adjustment devices V67, V68, V87, V88 and the length of the support devices 87, 88 are defined such that the support devices 87, 88 can be retracted in the YF- and YA-direction, respectively, hence, when viewed in the ZF-direction, into the inner of the stack operating vehicle F or in area of the base plate 33 and the support devices 67, 68 can be retracted in direction thereto that with a respective lowest state of the first bearing device 60 and of the second bearing device 80 the support devices 67, 68 of the first bearing device 60 or in the vertical direction downward ends V19 are situated within or below the areas of the second base part B2 and the base body 83, 84 of the second bearing device 80, when viewed in the vertical direction or the ZF- and ZA-direction, respectively, or, as described with reference to the embodiment of FIG. 1, the same is disposed according to one or both of the following alternatives when viewed in the vertical direction (ZA): (a) in the same height or below pointing to a contact surface (87a, 88a) of the second holding device (89) of the second bearing device (80) which is oriented in the vertical direction (ZA); or (b) below the second bearing base (80B).

Such lowest states of the first bearing device 60 and the second bearing device 80 are shown in FIG. 6. In this regard provision can also be made that with the lowest state of the first bearing device 60 a lower surface of the capturing device 67, 68 which is oriented contrary to the upper surface 67b, 68b rests on an edge of the base plate 33 or an edge of the vehicle frames 30.

The terms "lower state," "lowest state" or "below" are to be understood with regard to the negative ZF-direction. With the lowest state of the first bearing device 60 and of the second bearing device 80 the surfaces 67a, 68a are respectively positioned in a maximum distance d1, in short distance d1, from the warehouse floor R at this point (FIG. 6). The term "maximum distance" is to be understood as the maximum distance along the longitudinal direction L67 and L68, respectively, of the support device 67 and 68, respectively, or the longitudinal direction L87 and L88, respectively, of the support device 87 and 88, respectively, at the same YF-state of the first bearing device 60 or the second bearing device 80.

As an alternatively or additionally thereto, particularly when the stack operating vehicle F does not comprise a base plate 33 or a vehicle frame 30, the lowest state of the first bearing device 60 can be defined such that the front end section 67d, 68d is disposed below the lowest point of the support devices 87, 88 of the second bearing device 80 in its lowest state. In this regard the support device 67, 68 and particularly their support sections 67b and 68b, respectively, can as a whole be inclined downward from the end piece 67c, 68c. In this regard additionally the lowest state can be defined such that the end pieces 67c, 68c rest on the runway R.

The lowest states of the first bearing base 60B and of the second bearing base 80B of the embodiments of the stack operating vehicle F are provided such that a storage unit LE can be taken up or deposited by the holding device 69 and 89, respectively, which is respectively coupled thereto when the storage unit LE is situated directly on the warehouse floor R or on a shelf which is located on the warehouse floor R or a rack as a socket and hence is situated indirectly on the warehouse floor R so that the lower side thereof has a distance to the warehouse floor R.

For an explanation of this situation, reference is made to the storage units LE shown in FIGS. 7 to 9 which can be used optionally with the storage orders according to the disclosure: The storage unit LE1 of FIGS. 7 to 9 has with regard to its outer contour lines a rectangular shape and comprises four side plates LE11, LE12, LE13, LE14 and a base plate LE15, wherein the four side plates LE11, LE12, LE13, LE14 comprise an opening LE16 to an inner space LE20 which is delimited by the inner surfaces of the four side plates LE11, LE12, LE13, LE14 and the base plate LE15 and which is provided for receiving articles or components to be stored. The embodiment LE1 of a storage unit LE comprises a capturing device with at least a bearing surface. With the embodiment of the storage unit LE1 shown the capturing device is realized by capturing surfaces and particularly by lateral webs LE17, LE18 or holders or handles which protrude from the outer surfaces LE13a, LE14a of the side plates LE13 and LE14, respectively, and which comprise lower surfaces LE17b and LE18b, respectively, as capturing surfaces or contact surfaces which downward form steps which face a warehouse floor R on which the storage unit LE1 is disposed directly or indirectly as for example on a rack and which the base plate LE15 faces. These have a minimum distance d2 to the plane which defines the planar extension of the lower surface LE15a of the base plate LE15. In this regard the upper surfaces or the upper edge of the side plates LE13a, LE14a of the side plates LE13 and LE14, respectively, are situated in a distance d2 from the lower surface LE15a of the base plate LE15. In this regard under, minimum distance d2" a distance is to be understood which results along the extension of the webs LE17, LE18 between the side plates LE11 and LE13. The webs LE17, LE18 can generally be disposed at the upper edge LE13b and LE14b, respectively, of the side plates LE13 and LE14, respectively, according to FIGS. 6 to 8, or in a middle area or generally an area between a respective upper edge LE13b and LE14b, respectively, or an uppermost edge section of the storage unit LE1 and the base plate LE15.

The webs or holding pieces LE17, LE18 and the support devices 67, 68 and 87, 88, respectively, are formed such that the surfaces 67a, 68a and 87a, 88a, respectively, with regard to the gravitational vector can be contacted at contact surfaces of the capturing device in form of the lower surfaces LE17b, LE18b of the webs LE17, LE18 of a storage unit LE1 so that when the respective bearing base 60B and 80B, respectively, with the support devices 67, 68 and 87, 88, respectively, are moved from a downward state upward the storage unit LE1 can be lifted and vice versa. When the stack operating vehicle F is positioned in a corresponding manner in front of a storage unit LE1 the contacting of the surfaces 67a, 68a and 87a, 88a, respectively, of the support devices 67, 68 and 87, 88, respectively, at the lower surfaces LE17b and LE18b, respectively, can occur by moving along the support devices 67, 68 and 87, 88, respectively, by extension of the same relative to the respective bearing base 60B and 80B, respectively. In this regard the respective bearing base 60B and 80B, respectively, is positioned on a height at which the surfaces 67a, 68a and 87a, 88a, respectively, are disposed on the same height as the lower surfaces LE17b, LE18b. Also, the contacting of the surfaces 67a, 68a and 87a, 88a, respectively, of the support devices 67, 68 and 87, 88, respectively, at the lower surfaces LE17b, LE18b can occur such that the respective bearing base 60B and 80B, respectively, is adjusted to a vertical position or height position at the stack operating vehicle F at which the surfaces 67a, 68a and 87a, 88a, respectively, are disposed in a distance below the lower surfaces LE17b, LE18b. With this position of the respective bearing base 60B and 80B, respectively, the respective support devices 67, 68 and 87, 88, respectively, are extended relative to the respective bearing base 60B and 80B respectively, such that these are disposed below the lower surfaces LE17b, LE18b with a sufficient overlapping in the longitudinal directions L67, L68a and L87, L88 respectively. Subsequently the respective bearing base 60B and 80B, respectively, is moved upward until the surfaces 67a, 68a and 87a, 88a, respectively, of the support devices 67, 68 and 87, 88, respectively, contact the lower surfaces LE17b and LE18b, respectively, so that then by lifting the respective bearing base 60B and 80B, respectively, the storage unit LE1 can be moved contrary to the gravitational vector upward.

Vice versa in this state with a movement of the respective bearing base 60B and 80B, respectively, with the support devices 67, 68 and 87, 88, respectively, the storage unit LE1 can be deposited from an upper position downward on a contact surface as for example a warehouse floor R.

As can be taken from FIG. 5, in which the lowest states or lowest vertical positions of the first bearing base 60B and of the second bearing base 80B for the embodiments of the stack operating vehicle F according to the FIGS. 1 to 4 are shown, the holding devices 69 and 89 in their respective lower states in their respective lowest states in which the upper surfaces 67a, 68a and 87a, 88a, respectively, of the same are disposed in a vertical distance d1 relative to the warehouse floor R. In case that the vertical distance d1 smaller than the vertical distance d2 between the lower surfaces LE17b, LE18b and a warehouse floor R, the support devices 67, 68 and 87, 88, respectively, can, as described, rest against the lower surfaces LE17b, LE18b. In this regard a storage unit LE1 in this respective lower state can be taken up from below by the holding device 69 and 89, respectively.

With the embodiments of the stack operating vehicle F according to FIGS. 1 to 6 also a storage unit LE which is generally formed rectangular according to its outer contours can be taken up with their lower surface LE15a of the base plate LE15 by means of the support devices 67, 68 and 87, 88, respectively, and can be moved upward or downward by moving the respective bearing base 60B and 80B, respectively, upward or downward in the vertical direction. Hence, in this regard the base plate LE15 functions as capturing device and the lower surface LE15a of the base plate LE15 functions as contact surface. As even in the lower state the respective bearing base 60B and 80B, respectively, the surfaces 67a, 68a and 87a, 88a, respectively, are positioned at least the distance d1 above the warehouse floor R, with this storage order it is particularly defined that the storage unit LE1 which can be the lowest storage unit LE1 of a stack of storage units LE1 is disposed in a support device of a shelf or a support device as a socket so that the storage unit LE1 with the support sections 67b and 68b, respectively, can be taken up at the underside or lower surface LE15a.

With the embodiment of the stack operating vehicle F according to FIG. 5, the same comprises a vehicle frame 30 and a base plate 33 which is mounted non-rotatably on the vehicle frame 30.

Figure 10:
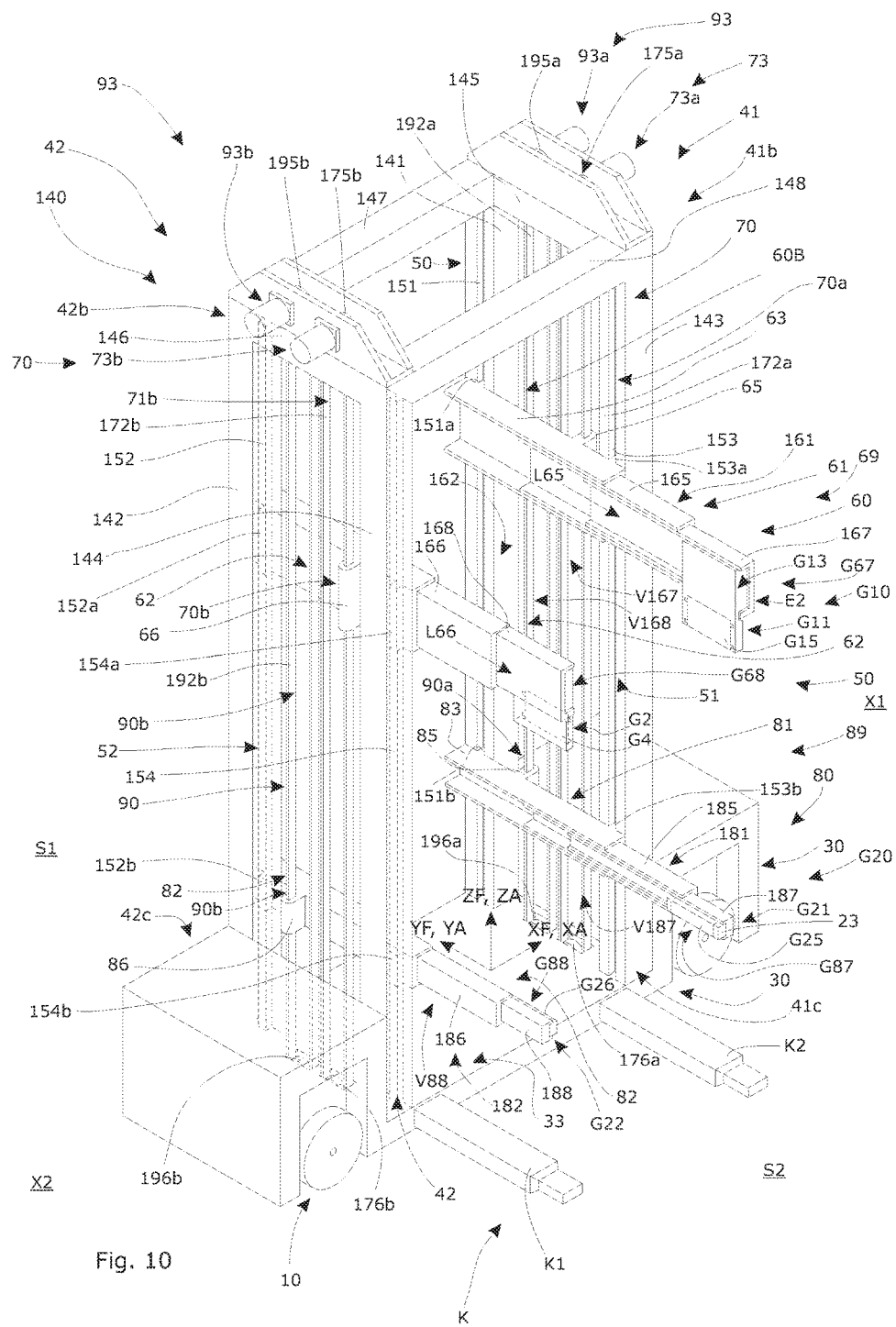

In the following the embodiment of the stack operating vehicle F according to FIG. 10 is described particularly with regard to the differences to the embodiment shown in FIG. 5.

With this embodiment of the stack operating vehicle F, the first bearing base 60B is formed from a first base body 63 and a second base body 64 which is separated from the same and the second bearing base 80B is formed from a first base body 83 and a second base body 84 which is separated from the same. As an alternative thereto the first bearing base 60B can be constructed as one-piece base part B1 according to of the embodiment of FIG. 1 in case that the base bodies 63 and 64 are connected to one another by the connection part V1. As an alternative or additionally thereto the second bearing base 80B can be constructed as one-piece base part B2 according to of the embodiment of FIG. 1 in case that the base bodies 83 and 84 are connected to one another by the connection part V2.

The support structure is designed according to the embodiment of FIG. 5 and the reference numeral 140 is assigned to the same. In this regard, the front support bars 141, 143 form the first support part 41 and the two rear support bars 142, 144 form the second support part 42.

The first height adjustment device 70 comprises a first base body adjustment device 70a for adjustment of the first capturing device 61 near and along the front support bars 141, 143 as well as the ZF- and the ZA-axis and comprises a second base body adjustment device 70b for adjustment of the second capturing device 62 near and along the rear support bars 142, 144 as well as the ZF- and the ZA-axis.

The first base body-adjustment device 70a for adjustment of the first base body 63 is formed from an actuation device 71a with two guide pulleys 175a, 176a and a flexible conveyor part 172a which circumferentially surrounds the same. In this regard the circumferentially surrounding flexible conveyor part 172a extends near the support bar 143 and is rotatably supported by a first guide pulley 175a at the connecting rod 145 and by a second guide pulley 176a at the vehicle frame 30 or at the base plate 33, or at the lower end 41c of the first support part 41. Hence the first guide pulley 175a is supported directly or indirectly at the upper end 41b of the first support part 41 and the second guide pulley 176a is rotatably supported directly or indirectly at the lower end 41c of the first support part 41. Further a partial drive device 73a is mounted directly or indirectly at the first support part 41 for driving the circumferentially surrounding flexible conveyor parts 172a. In this regard the partial drive device 73a can be coupled directly to the conveyor part 172a or can be coupled to one of the guide pulleys 175a, 176a and hence indirectly to the conveyor part 172a. At the outer side of the first base body 63, hence the side of the same which faces the first support part 41, a connecting device 65 is formed for mounting the conveyor part 172*a* at the first base body 63 so that the first base body 63 is moveable in the vertical direction in case that the conveyor part 172*a* is set in a circumferential movement due to a actuation of the partial drive device 73*a* around guide pulleys 175*a*, 176*a*.

The second base body adjustment device 70*b* for adjustment of the first base body 63 is formed from an actuation device 71*b* with two guide pulleys 175*b*, 176*b* and a flexible conveyor part 172*b* which circumferentially surrounds the same. In this regard the circumferentially surrounding flexible conveyor part 172*b* extends near the support bar 144 and is rotatably supported by a first guide pulley 175*b* at the connecting rod 146 and by a second guide pulley 176*b* at the vehicle frame 30 or at the base plate 33, or at the lower end 42*c* of the second support part 42. Hence the first guide pulley 175*b* is supported directly or indirectly at the upper end 42*b* of the second support part 42 and the second guide pulley 176*b* is supported directly or indirectly at the lower end 42*c* of the first support part 42. Further a partial drive device 73*b* is mounted directly or indirectly at the second support part 42 for driving the circumferentially surrounding flexible conveyor parts 172*b*. In this regard the partial drive device 73*b* can be coupled directly to the conveyor part 172*b* or can be coupled to one of the guide pulleys 175*b*, 176*b* and hence indirectly to the conveyor part 172*b*. At the outer side of the second base body 64, hence the side of the same which faces the second support part 42, a connecting device 66 is formed for mounting the conveyor part 172*b* at the second base body 64 so that the second base body 64 is moveable in the vertical direction in case that the conveyor part 172*b* is set in a circumferential movement due to a actuation of the partial drive device 73*b* around guide pulleys 175*b*, 176*b*.

The partial drive devices 73*a*, 73*b* together form the drive device 73 (FIG. 28) and are driven together by the height adjustment command function of the associated height adjustment device F70 by command signals, wherein the command function for execution of a desired height adjustment path of the base body 63, 64 is formed such that the command signals effect at the partial drive devices 73*a*, 73*b* the same desired height adjustment path of the base body 63, 64—at least within predetermined limits of inaccuracy—so that the contact surfaces 67*a*, 67*b* of the support devices 67, 68 which are disposed at the base bodies 63, 64 provide a horizontal, i.e. running in the XF-YF-plane, or an at least approximately horizontal contact surface.

In analogy to the first height adjustment device 70 the second height adjustment device 90 comprises a first base body adjustment device 90*a* for adjustment of the first capturing device 81 near and along the front support bars 141, 143 as well as the ZF- and the ZA-axis and a second base body adjustment device 90*b* for adjustment the second capturing device 82 near and along the rear support bars 142, 144 as well as the ZF- and the ZA-axis.

The first base body-adjustment device 90*a* is formed from an actuation device 91*a* with two guide pulleys 195*a*, 196*a* and a circumferential flexible conveyor part 192*a*. In this regard the circumferentially surrounding flexible conveyor part 1792*a* extends near the support bar 143 and is rotatably supported by a first guide pulley 195*a* at the connecting rod 145 and by a second guide pulley 196*a* at the vehicle frame 30 or at the base plate 33, or at the lower end 41*c* of the first support part 41. Hence the first guide pulley 195*a* is supported directly or indirectly at the upper end 41*b* of the first support part 41 and the second guide pulley 196*a* is rotatably supported directly or indirectly at the lower end 41*c* of the first support part 41. Further a partial drive device 93*a* is mounted directly or indirectly at the first support part 41 for driving the circumferentially surrounding flexible conveyor parts 192*a*. In this regard the partial drive device 93*a* can be coupled directly to the conveyor part 192*a* or can be coupled to one of the guide pulleys 195*a*, 196*a* and hence indirectly to the conveyor part 192*a*. At the outer side of the first base body 83, hence the side of the same which faces the first support part 41, a connecting device 85 is formed for mounting the conveyor part 192*a* at the first base body 83 so that the first base body 83 is moveable in the vertical direction in case that the conveyor part 192*a* is set in a circumferential movement due to a actuation of the partial drive device 93*a* around guide pulleys 195*a*, 196*a*.

The second base body adjustment device 90*b* for adjustment of the first base body 63 is formed from an actuation device 91*b* with two guide pulleys 195*b*, 196*b* and a flexible conveyor part 192*b* which circumferentially surrounds the same. In this regard the circumferentially surrounding flexible conveyor part 192*b* extends near the support bar 144 and is rotatably supported by a first guide pulley 195*b* at the connecting rod 146 and by a second guide pulley 196*b* at the vehicle frame 30, particularly at the base plate 33, or at the lower end 42*c* of the second support part 42. Hence the first guide pulley 195*b* is supported directly or indirectly at the upper end 42*b* of the second support part 42 and the second guide pulley 196*b* is supported directly or indirectly at the lower end 42*c* of the first support part 42. Further a partial drive device 93*b* is mounted directly or indirectly at the second support part 42 for driving the circumferentially surrounding flexible conveyor parts 192*b*. In this regard the partial drive device 93*b* can be coupled directly to the conveyor part 192*b* or can be coupled to one of the guide pulleys 195*b*, 196*b* and hence indirectly to the conveyor part 192*b*. At the outer side of the second base body 64, hence the side of the same which faces the second support part 42, a connecting device 66 is formed for mounting the conveyor part 192*b* at the second base body 64 so that the second base body 64 is moveable in the vertical direction in case that the conveyor part 192*b* is set in a circumferential movement due to a actuation of the partial drive device 93*b* around guide pulleys 195*b*, 196*b*.

The partial drive devices 93*a*, 93*b* together form the drive device 93 (FIG. 28) and are driven together by the height adjustment command function of the associated height adjustment device F90 by command signals, wherein the command function for execution of a desired height adjustment path of the base body 83, 84 is formed such that the command signals effect at the partial drive devices 93*a*, 93*b* the same desired height adjustment path of the base body 83, 84—at least within predetermined limits of inaccuracy—so that the contact surfaces 89*a*, 89*b* of the support devices 87, 88 which are disposed at the base bodies 83, 84 provide a horizontal, i.e. running in the XF-YF-plane, or an at least approximately horizontal contact surface.

The conveyor parts 191*a*, 191*b*, 192*a*, 192*b* can be realized as a band or as a chain.

The first guiding device 51 of the guide arrangement 50 is formed from a first partial guidance track 151 which is formed in or at the support bar 141, and a second partial guidance track 153 which is formed in or at the support bar 143. The first guiding device 51 of the vertical guide arrangement 50 at which the first base body 63 is moveable in vertical direction, hence along the ZF- and the ZA-axis, is formed with the embodiment of the stack operating vehicle F of FIG. 10 from a guide track 151 which is formed in or at the support bar 141 and is formed from a guide track 153 which is formed in or at the support bar 143 and the guidance parts 151a, 153a, 151b, 153b. In this regard the guidance parts 151a, 153a are formed at the surface areas of the first base body 63 which face the support bars 141, 143 such that the same by their respective shape are guided in the guide tracks 151 and 153, respectively, such that the guidance parts 151a, 153a are guided in the guide tracks 151 and 153, respectively, for their movement in the vertical direction. In this regard further the guidance parts 151b, 153b are formed at the surface areas of the second base body 83 which face the support bars 141, 143 such that the same are guided by their respective shape in the guide tracks 151 and 153, respectively, such that the guidance parts 151b, 153b are guided in the guide tracks 151 and 153, respectively, for their movement in the vertical direction. With a corresponding shape of a guidance part 151a, 153a and 151b, 153b, respectively, the first guiding device 51 can also be realized with one guidance part 151a or 153a and 151b or 153b, respectively, and hence with a corresponding guide track 151 and 153, respectively.

The second guiding device 52 of the guide arrangement 50 is formed from a first partial guidance track 152 which is formed in or at the support bar 142, and a second partial guidance track 154 which is formed in or at the support bar 144. The second guiding device 52 of the vertical guide arrangement 50 at which the second base body 64 is moveable in vertical direction, hence along the ZF- and the ZA-axis, is formed with the embodiment of the stack operating vehicle F of FIG. 10 from a guide track 152 which is formed in or at the support bar 142 and is formed from a guide track 154 which is formed in or at the support bar 144 and the guidance parts 152a, 154a, 152b, 154b. In this regard the guidance parts 152a, 154a are formed at the surface areas of the first base body 63 which face the support bars 142, 144 such that the same by their respective shape are guided in the guide tracks 152 and 154, respectively, such that the guidance parts 152a, 154a are guided in the guide tracks 152 and 154, respectively, for their movement in the vertical direction. With a corresponding shape of a guidance part 152a, 154a and 152b, 154b, respectively, the second guiding device 52 can also be realized with one guidance part 152a or 154a and 152b or 154b, respectively, and hence with a corresponding guide track 152 and 154, respectively.

With the embodiment of FIG. 10 the stack operating vehicle F can also comprise support parts 41, 42 according to FIG. 1 instead of support bars.

With the embodiment of the stack operating vehicle F according to FIG. 10 the first bearing base 60B is formed from a first base body 63 and a second base body 64 which is separated therefrom. In an embodiment which is an alternative thereto the bearing base 60B can be constructed as one-piece base part B1 according to of the embodiment of FIG. 1 in case that the base bodies 63 and 64 are connected to one another by the connection part V1. In the same manner with the embodiment of the stack operating vehicle F according to FIG. 10 the second bearing base 80B is formed from a first base body 83 and a second base body 84 which is separated therefrom. In an embodiment which is an alternative thereto, the bearing base 80B can be constructed as one-piece base part B2 according to of the embodiment of FIG. 1 in case that the base bodies 83 and 84 are connected to one another by the connection part V1.

The vehicle frame 30 and the movement device 10 and the arrangement of the same at the vehicle frame 30 or at the support structure can be realized as described with reference to the FIGS. 1 and 2.

The holding devices 61, 62, 81, 82 can be realized as with the embodiment of the stack operating vehicle F according to FIG. 1. Alternatively, the holding devices 61, 62 or the holding devices 81, 82 or, as shown in FIG. 10, the holding devices 61, 62, 81, 82 can respectively be realized as telescopic holders.

In this regard the first capturing devices 61, 81 are realized respectively as first telescopic holder 161 and 181, respectively, by a telescope intermediate part 165 and 185, respectively, which is displaceably disposed at the base body 63 and 83, respectively, and a telescopic endpiece 167 and 187, respectively, which is displaceably disposed at the telescope intermediate part 165 and 185 respectively. Generally also more than one telescope intermediate part 165 and 185, respectively, and for example two telescope intermediate parts can be provided. The base body 63 and 83, respectively, the at least one telescope intermediate part 165 and 185, respectively, and the telescopic endpiece 167 and 187, respectively, are formed as U-profile parts of the telescopic holder 161 and 181, respectively, and are positioned in the order specified respectively coaxially in one another. In an extended state of the first capturing device 61 and 81, respectively, the parts are maintained in the order specified at respective overlapping sections to one another, wherein in the order specified each part forms a prolongation of the respectively preceding part in the order specified and viewed from the base body 63 and 83, respectively. In the entire extended state of the telescopic holder 161 and 181, respectively, parts which respectively neighbor one another contact a stop device and particularly a first stop device at which respectively locking device can be coupled. The locking device is realized such that the same is actuated and the corresponding, neighboring parts are locked together in their extended state, when neighboring parts which abut one another contact their first stop device.

Also in this regard, the second capturing devices 62, 82 are realized respectively as second telescopic holder 162 and 182, respectively, by a telescope intermediate part 166 and 186, respectively, which is displaceably disposed at the base body 64 and 84, respectively, and a telescopic endpiece 168 and 188, respectively, which is displaceably disposed at the telescope intermediate part 166 and 186 respectively. Generally also more than one telescope intermediate part 166 and 186, respectively, and for example two telescope intermediate parts can be provided. The base body 634 and 84, respectively, the at least one telescope intermediate part 166 and 186, respectively, and the telescopic endpiece 168 and 188, respectively, are formed as U-profile parts of the telescopic holder 162 and 182, respectively, and are positioned in the order specified respectively coaxially in one another. In an extended state of the first capturing device 62 and 82, respectively, the parts are maintained in the order specified at respective overlapping sections to one another, wherein in the order specified each part forms a prolongation of the respectively preceding part in the order specified and viewed from the base body 64 and 84, respectively. In the entire extended state of the telescopic holder 162 and 182, respectively, parts which respectively neighbor one another contact a stop device and particularly a first stop device at which respective locking devices can be coupled. The locking device is realized such that the same is actuated and the corresponding, neighboring parts are locked together in their extended state, when neighboring parts which abut one another contact their first stop device.

To the capturing devices 61, 62, 81, 82 or the holding device 69, 89 of the first bearing device 60 and the second bearing device 80, respectively, a capturing adjustment device F60 and F80, respectively, (FIG. 28) with a capturing adjustment command function is functionally assigned. Further, in each of the capturing devices 61, 62, 81, 82 and hence in each of the telescopic holders 161, 162, 181, 182 a respective adjustment device V167 and V168 and V187 and V188, respectively, is integrated, by which the respective telescopic holder 161, 162, 181, 182 can be brought in an adjustment state between the entirely retracted and the entirely extended state. The respective adjustment device V167 and V168 and V187 and V188, respectively, can particularly be realized according to the state of the art. The adjustment devices V167, V168, V187, V188 respectively comprise a guiding device for movement of the parts of the respective telescopic holder 161, 162, 181, 182—hence of the base bodies, of the at least one telescope intermediate part and of the telescopic endpieces—relative to one another and also a partial drive device by which the parts of the respective telescopic holder 161, 162, 181, 182 are driven for adjustment of the same. The capturing partial drive device of the telescopic holder 161 and the capturing partial drive device of the telescopic holder 162 together form a gripping drive arrangement A60. In a corresponding manner the adjustment device V87 and the adjustment device V88 respectively comprise a capturing partial drive device which together form a capturing partial drive device A80 with the same functionality of the gripping drive arrangement A60. The capturing partial drive devices are respectively designed such that with the same, due to command signals which are generated by the respective capturing adjustment command function, the capturing devices 61, 62 and 81, 82, hence with the given embodiment the telescopic holder 161, 162, 181, 182 of a respective one bearing device 60 and bearing device 80, can be moved from an initial state in a desired extended state respectively within the entirely retracted and with regard to the YF- or YA-direction at least one entirely extended state of the capturing devices 61, 62 and 81, 82, respectively, and the telescopic holder 161, 162 and 181, 182, respectively.

Figure 11:
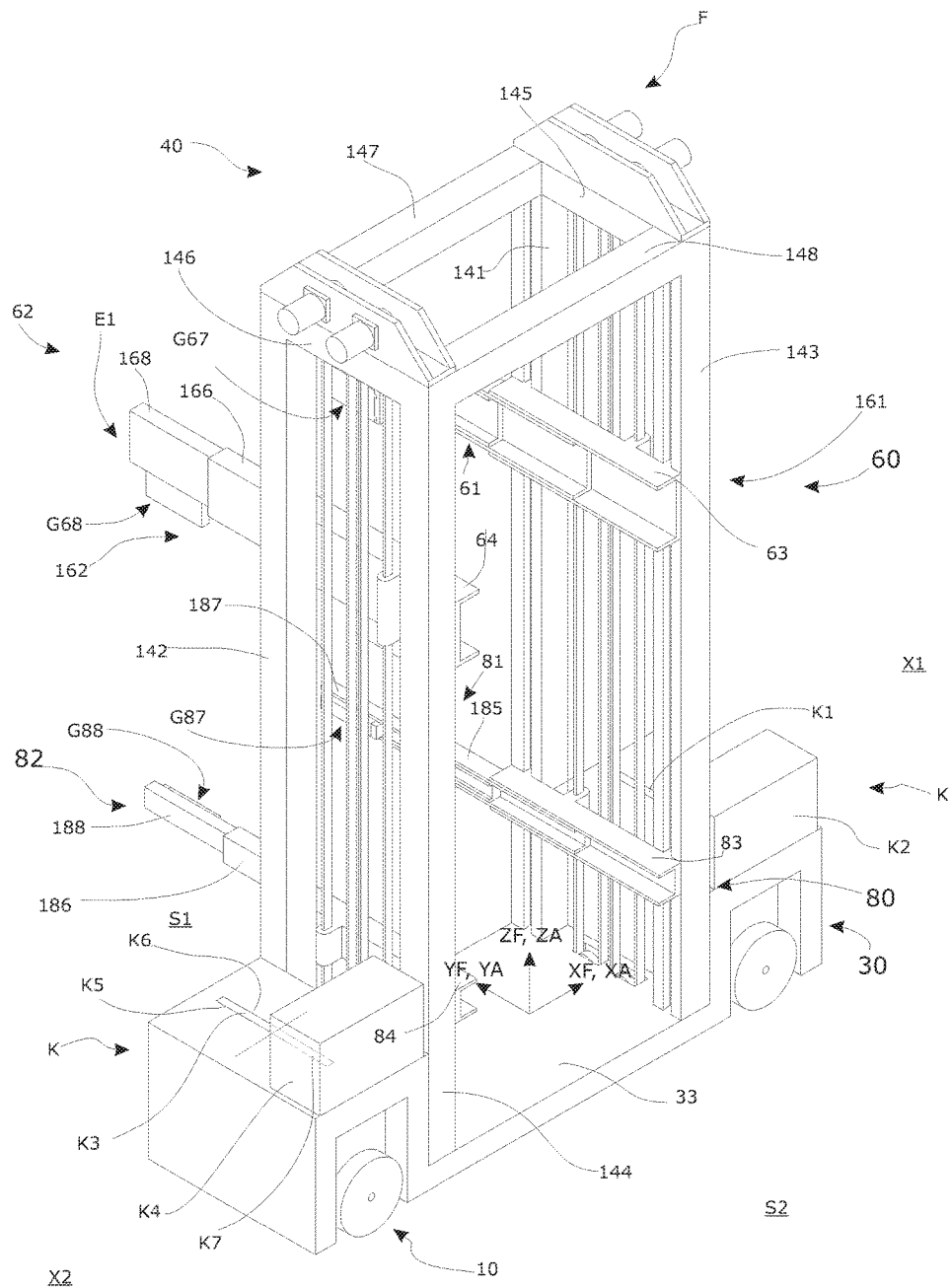
FIG. 11 is a further embodiment of the stack operating vehicle according to FIG. 10, wherein this embodiment of the stack operating vehicle is shown in a further operational state in which the first and the second bearing device respectively is disposed in a middle height position or adjustment position, wherein the gripping devices are in a retracted state.

According to an embodiment of the stack operating vehicle F the telescopic holders 161, 162 or the telescopic holders 181, 182 or both the telescopic holders 161, 162 and the telescopic holders 181, 182 with the capturing adjustment device F60 and F80, respectively, (FIG. 28) with a capturing adjustment command function are designed such that the same can be extended both on the side S2 (FIG. 10) and on the side S1 (FIG. 11). As an alternative thereto, the mentioned components can be realized such that the same can only be adjusted between a middle state (FIG. 29) and an extended state according to FIG. 10 or FIG. 11.

Figure 12:
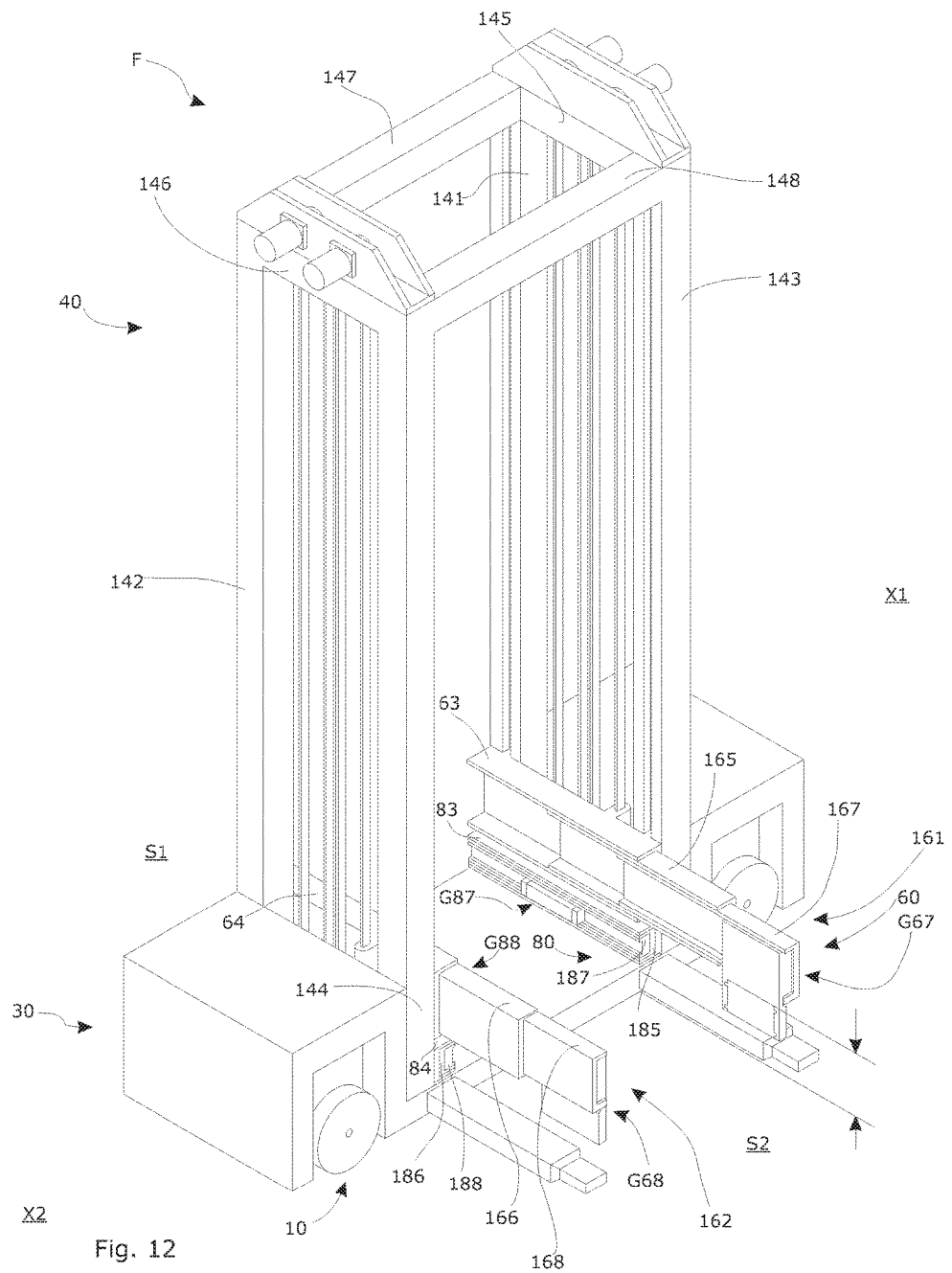
FIG. 12 is a further embodiment of the stack operating vehicle according to FIG. 10, wherein this embodiment of the stack operating vehicle is shown in a further operational state in which the first bearing device is disposed in a lower adjustment position, wherein the gripping devices are shown in a retracted state.

In FIG. 12 the embodiment of the stack operating vehicle F according to FIG. 10 is shown in an operational state in which the telescopic holders 161, 162 or the telescopic holders 181, 182 respectively are disposed at the support structure 40 in a undermost state with regard to the vertical direction.

At the holding devices 69, 89 of the embodiment of the stack operating vehicle F according to FIG. 10, hence the telescopic holders 161, 162, 181, 182, respectively one gripping arrangement G10 and G20, respectively, is disposed for taking up and holding a storage unit LE. Generally a gripping arrangement can be disposed at the holding device 69 or the holding device 89 or both the holding device 69 and the holding device 89.

Figure 13:
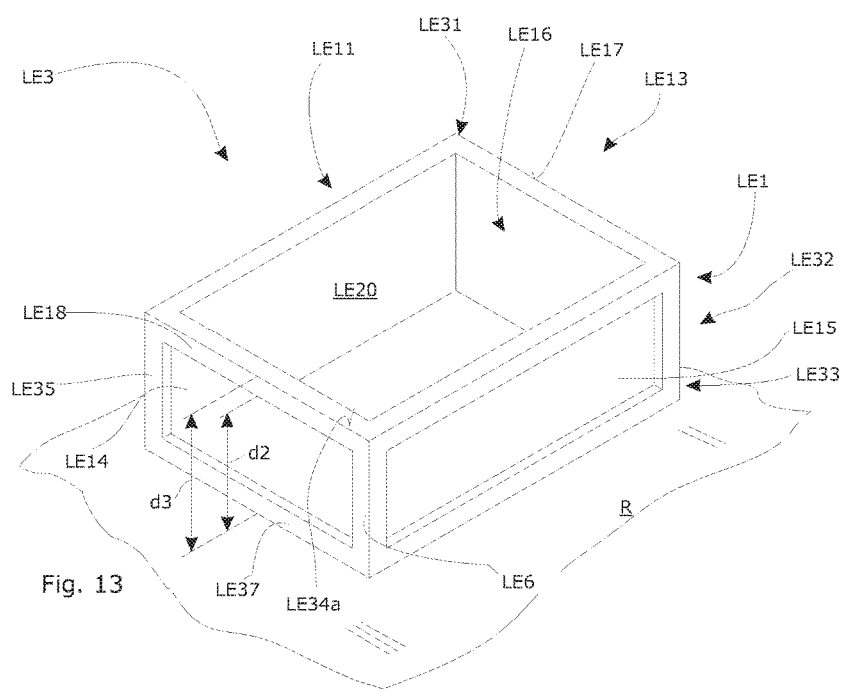
Figure 14:
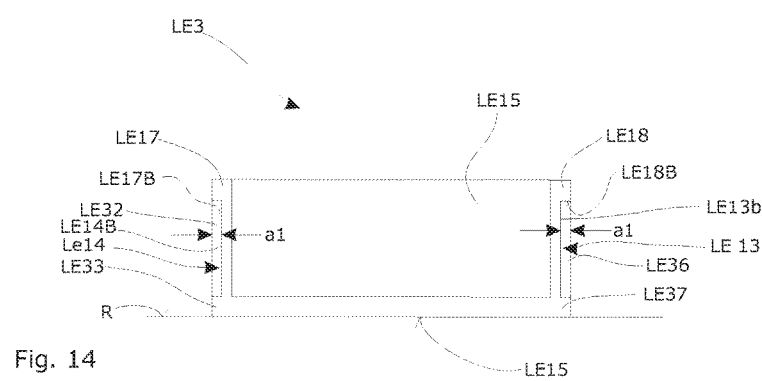
FIG. 14 is a presentation of the storage unit according to FIG. 13 in a side view.

The arrangement G10 and G20 is suitable for taking of and for holding storage units which can be designed in different manner. As an example, the storage unit 1 shown in FIGS. 7 to 9 is provided. As an alternative thereto, a storage unit 3 according to FIGS. 13 and 14 can be provided. The storage unit 3 is formed rectangular with regard to their outer contour lines and comprises—as the storage unit 1—the four side plates LE11, LE12, LE13, LE14 and the base plate LE15 so that the four side plates LE11, LE12, LE13, LE14 delimit an opening LE16 to the inner space LE20. The storage unit 3 comprises a capturing device with at least a contact surface, wherein the capturing device can be realized by capturing surfaces and particularly by lateral webs LE17, LE18 or of handles. With the storage unit 3 at least the side plates LE13 and LE14 of the side plates LE11, LE12, LE13, LE14 are framed by lateral frame sections. In this regard the frame sections of the side plate LE13 are formed from the web LE17 with the lower surface LE17b, lateral frame sections LE31, LE32 and optionally a lower frame section LE37 and the frame sections of the side plate LE14 are formed from the web LE18 with the lower surface LE18b, lateral frame sections LE35, LE36 and optionally a lower frame section LE37. In FIG. 14 the framed surface frame sections of the side plates LE13 and LE14 are assigned the reference numeral LE13b and LE14b.

The gripping arrangement G10 comprises a gripping device G11 which is disposed at the telescopic endpiece 167 and a gripping device G12 which is disposed at the telescopic endpiece 168. The gripping devices G11, G12 can be disposed at the telescopic endpieces 167, 168 in a movement-fixing manner, hence particularly fixed thereto. With this embodiment the gripping devices G11, G12 can be fixed particularly in den longitudinal directions L65 and L66, respectively, centered at the telescopic endpieces 167, 168. Analogously, the gripping arrangement G20 comprises a gripping device G21 which is disposed at the telescopic endpiece 187 and a gripping device G22 which is disposed at the telescopic endpiece 188. The gripping devices G21, G22 can be disposed at the telescopic endpieces 187, 188, respectively, in a movement-fixing manner, hence particularly fixed thereto. With this embodiment the gripping devices G21, G22 can particularly be fixed in a centered manner with regard to the longitudinal directions L85 and L86, respectively, at the telescopic endpieces 187, 188.

As an alternative embodiment the gripping devices G11, G12, and where applicable the gripping devices G21, G22 are respectively moveably coupled to the telescopic endpiece 167 and 168 and 187 and 188, respectively, for movement in the YF- or YA-direction relative to respective telescopic endpiece by means of a shifting device or adjustment device G67 and G68 and G87 and G88, respectively. In this regard, the gripping devices G11, G12 can respectively be formed from a base body G13 and G14 and G23 and G24, respectively, and an adjustment part G15 and G16 and G25 and G26, respectively, which is moveably disposed at the respective base body G13 and G14 and G23 and G24, respectively, and is, in relation to the same, retractably and extendably formed. The adjustment part is positioned in its extended state in contact with at least one capturing device of a storage unit LE which is to be taken up by the gripping arrangement G10 and G20, respectively, wherein the extended state of the adjustment parts G15, G16 or G25, G26 and the at least one capturing surface are realized such that with the gripping arrangement G10 and G20 and their extended adjustment parts G15, G16 or G25, G26 the storage unit LE can be held with its total weight and also can be moved upward in the vertical direction, hence lifted, or moved downward, hence lowered.

Figure 16:
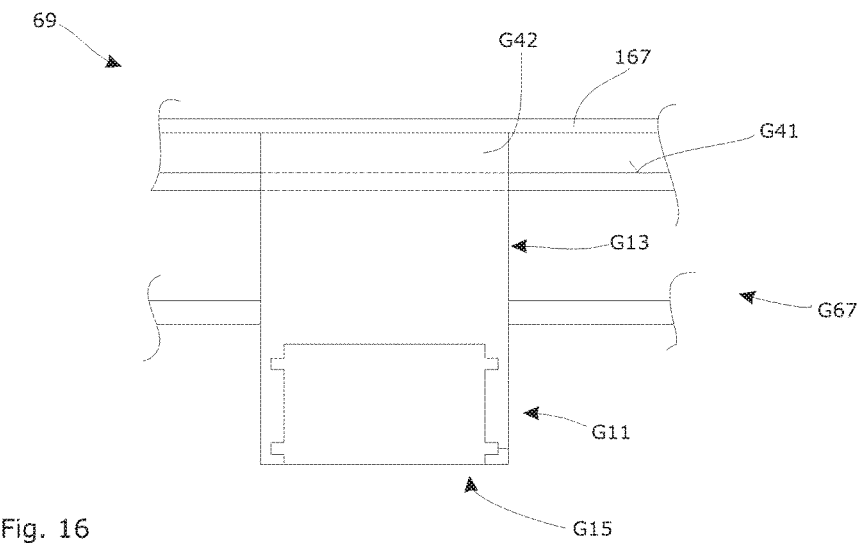
FIG. 16 is a side view of a gripping device according to FIGS. 10 and 15.

In the following, the shifting device G67 and G68 and G87 and G88, respectively, will be described with the example of the adjustment device G67 with reference to the FIGS. 16 and 17. The shifting devices G68, G87, G88 can be realized in the same manner.

In this regard the shifting device G67 comprises a base body guiding device G40 with a base body guide track G41 of the respective telescopic endpieces, in the given case of the telescopic endpieces 167, and a base body part or base body guidance part G42 of a base body connection G43 which is guided therein. The base body guidance part G42 is received by the base body-guide track G41 in the basis of its design in the cross-section in the longitudinal direction L65 of the base body 63 such that the base body guidance part G42 can be moved by the base body guide track G41 in the longitudinal direction L65 along the base body guide track G41 and at the same time transversely to this direction. The shifting device G67 of FIGS. 16 and 17 comprises a positioning partial drive device G50 particularly with a drive motor G44 and a drive wheel G45 which is coupled to the same and driven by the same, which is formed at an underside G46 of a retaining web G47 of the respective telescopic endpieces, wherein the underside G46 extends in the longitudinal direction L65, wherein in the given case the telescopic endpieces 167 are formed. As an alternative thereto, the capturing partial drive device G50 with the drive motor G44 and the drive wheel G45 can generally be disposed at the respective telescopic endpiece, in the given case at the telescopic endpiece 167. The telescopic holder with the first base body 63 together with the capturing partial drive device G50 form the first capturing device 61. In the following the reference numeral G50 is also used for the capturing partial drive device of the adjustment device V168 and where appropriate for the adjustment devices V187, V188.

To the positioning partial drive devices G50 of the shifting devices G67, G68 and the positioning partial drive devices G50 of the shifting devices G87, G88 of the embodiment of the stack operating vehicle F according to FIG. 10 respectively the capturing adjustment device F60 and F80 (FIG. 28), respectively, with the respective capturing adjustment command function is assigned. The positioning partial drive devices G50 of the shifting devices G67, G68 and G87, G88, respectively, are respectively realized such that with the same due to command signals which are generated by the respective capturing adjustment command function the shifting devices G67, G68 and G87, G88, respectively, of a respective one bearing device 60 and bearing device 80, respectively, can be moved from an initial state in a desired extension state, respectively of the end E1 (FIG. 11), E2 (FIG. 10) with regard to the longitudinal direction L67, and L68 and L87 and L88, respectively, of the respective telescopic endpieces 167 and 168 and 187 and 188, respectively, of the telescopic holder 161 and 162 and 181 and 182, respectively.

In this regard the shifting devices G67, G68 of the bearing device 60 and the shifting devices G87, G88 of the bearing device 80 respectively form a gripping positioning arrangement AP1 and AP2, respectively, (FIG. 28). The shifting devices G67, G68 and G87, G88, respectively, are respectively realized such that with the same due to command signals which are generated by the respective capturing adjustment command function the shifting devices G67, G68 and G87, G88, respectively, of a bearing device 60 and bearing device 80, respectively: with a retracted state of the telescopic holders 161 and 162 and 181 and 182, respectively, (FIG. 29) the respective base body G13 and G14 and G23 and G24, respectively, of the gripping devices G11 and G12 and G21 and G22, respectively, with regard to the longitudinal direction L67 and L68 and L87 and L88, respectively, are disposed centered or in the middle between ends E1 (FIG. 10), E2 (FIG. 11) of the respective telescopic endpieces 167 and 168 and 187 and 188, respectively, of the telescopic holder 161 and 162 and 181 and 182, respectively; with a first extended state of the telescopic holders 161 and 162 and 181 and 182, respectively, (FIG. 11) the respective base body G13 and G14 and G23 and G24, respectively, are disposed at the first ends E1 (FIG. 11) of the respective telescopic endpieces 167 and 168 and 187 and 188, respectively, of the telescopic holder 161 and 162 and 181 and 182, respectively; and with a second extended state of the telescopic holders 161 and 162 and 181 and 182, respectively, (FIG. 10) the respective base body G13 and G14 and G23 and G24, respectively, are disposed at the first ends E2 (FIG. 10) of the respective telescopic endpieces 167 and 168 and 187 and 188, respectively, of the telescopic holder 161 and 162 and 181 and 182, respectively, wherein the base bodies G13 and G14 and G23 and G24, respectively, are moved continuously corresponding to the extension state of the telescopic holder 161 and 162 and 181 and 182, respectively, between the ends E1, E2 and wherein the both base bodies G13, G14 or G23, G24, respectively, of a respective holding device 69 and 89, respectively, are moved within predetermined limits of inaccuracy in the same manner.

The gripping devices G11 and G12 and G21 and G22, respectively, further comprise respectively an adjustment part guiding device G60 for guiding the adjustment part G15 between a retracted and the extended state.

Figure 15:
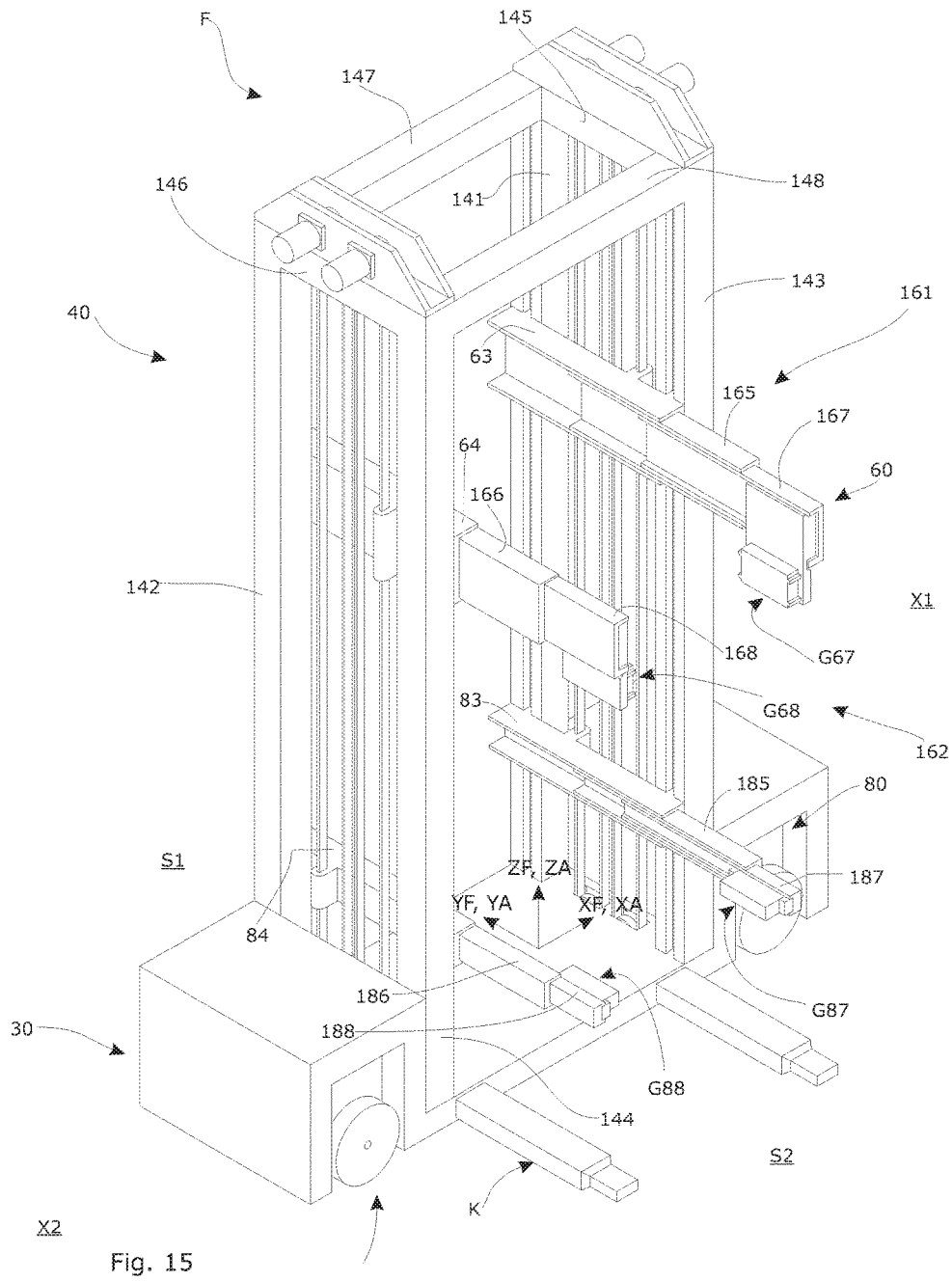
FIG. 15 is a schematic perspective presentation of a further embodiment of the stack operating vehicle, wherein the gripping devices of the holding devices are realized according to the embodiment of the gripping devices of FIG. 10, wherein the gripping devices are shown in an extended state.
Figure 17:
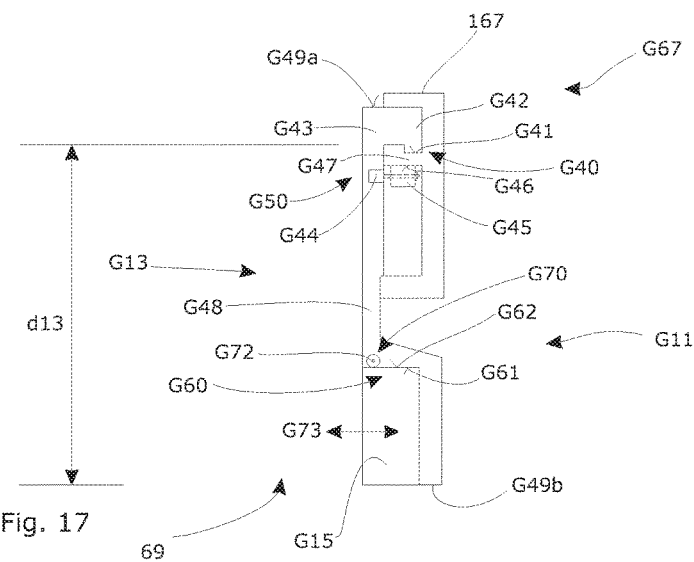
FIG. 17 depicts the gripping device according to FIG. 16 in the retracted state.

With the embodiment of the gripping device G11 according to FIG. 17 the adjustment part guiding device G60 is formed from an adjustment part guide track G61 of the respective base body G13 and an outer contour G62 of the adjustment part G15 so that the outer contour allows a longitudinal displacement of the adjustment part G15 relative to respective base body G13 between a retracted state (FIG. 10) and a folded-out state and hence extended state (FIG. 15).

The embodiment of the gripping device G67 according to FIG. 17 comprises a positioning partial drive device G70 particularly with a drive motor and a drive wheel G72 which is coupled with the same and which is driven by the same and which is formed at a longitudinal surface G61 of the adjustment part guide track G61, the longitudinal surface G61 extending in the adjustment direction G73. As an alternative thereto, the positioning partial drive device G70 can be disposed at the adjustment part G15.

Figure 18:
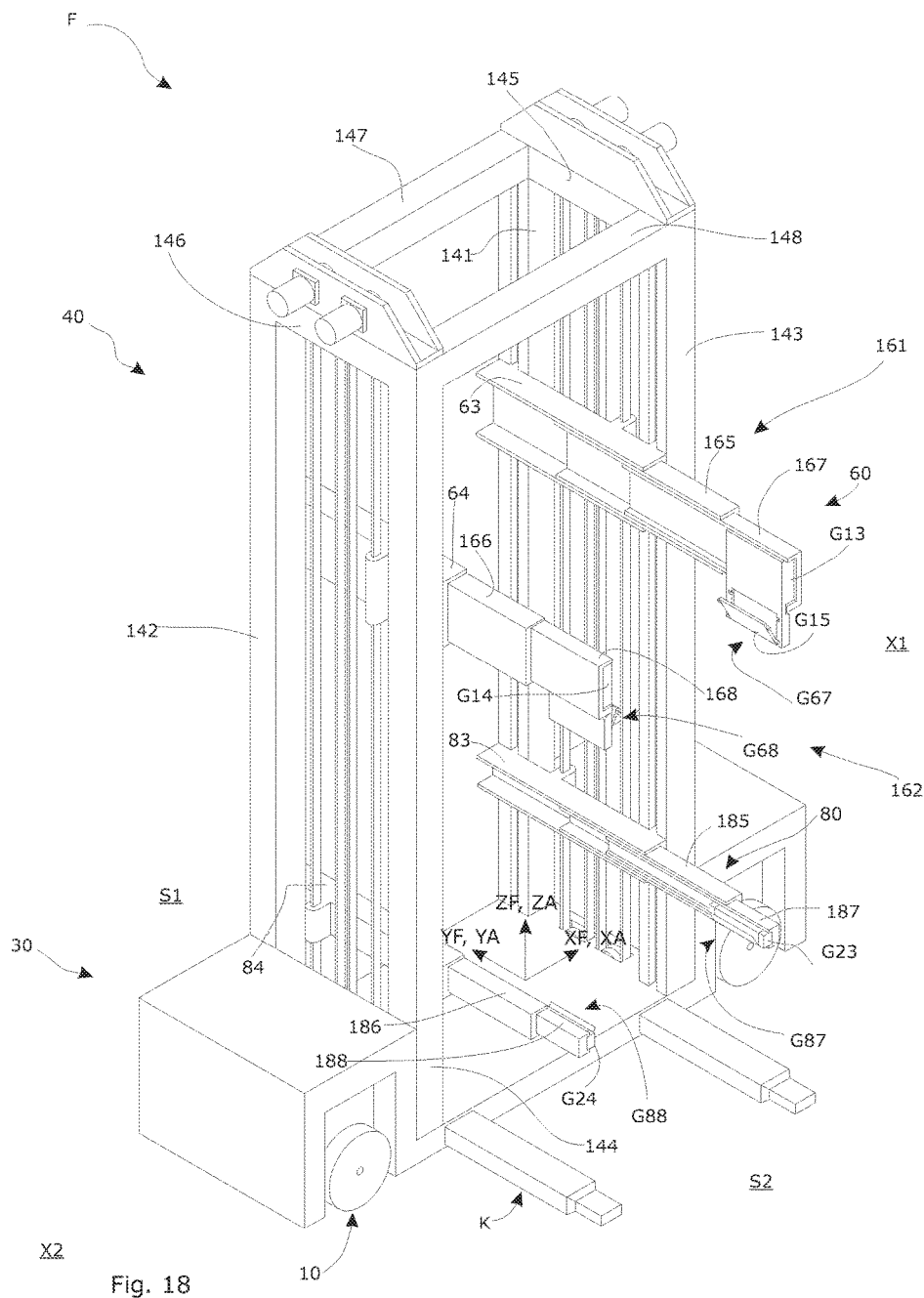
FIG. 18 depicts the embodiment of the stack operating vehicle according to FIG. 15 in a further operational state, in which a further embodiment of the gripping devices are in an extended state.
Figure 19:
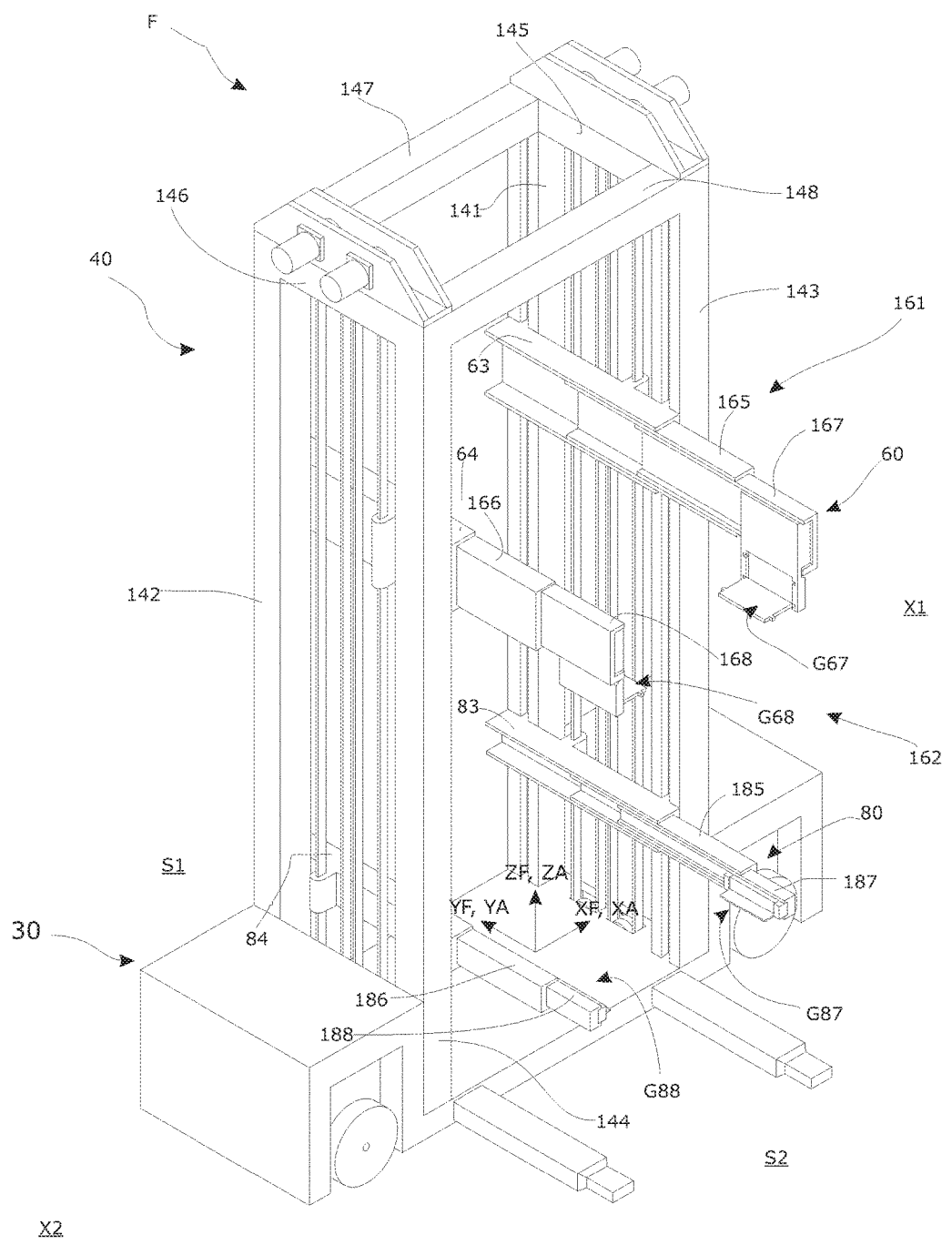
FIG. 19 is a schematic perspective presentation of a further embodiment of the stack operating vehicle, in which with regard to the embodiments of FIGS. 10 and 15, the first bearing device comprises two pairs of gripping devices, the gripping devices are shown in a retracted state.
Figure 20:
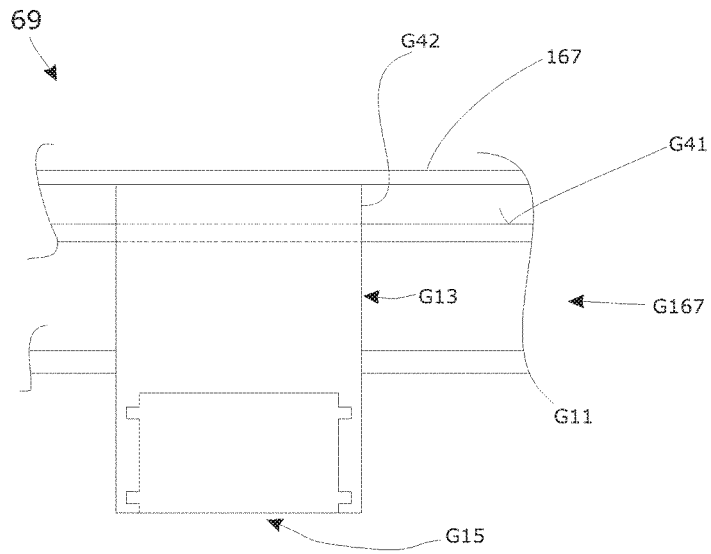
FIG. 20 is a side view of a gripping device in the embodiment of the same according to the FIGS. 10 and 15.
Figure 21:
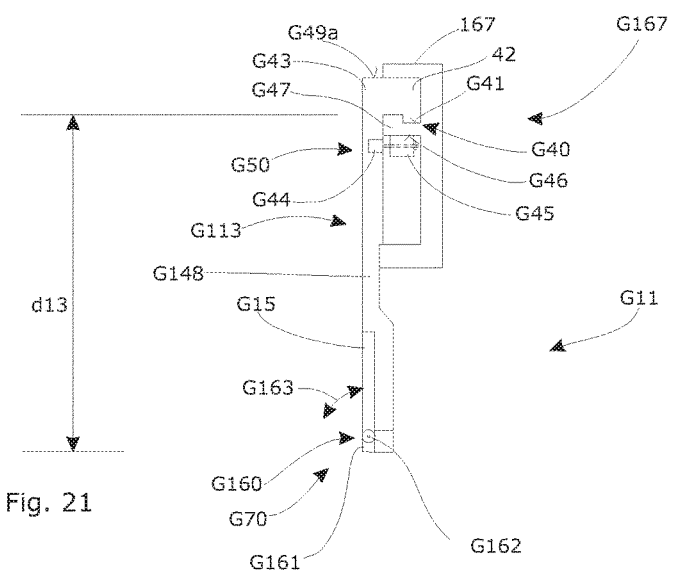
FIG. 21 depicts the gripping device of FIG. 20 in the retracted state.

With the embodiment of the gripping device G167 according to FIG. 21, the adjustment part guiding device G160 is formed from a base body joint part G161 of the respective base body G13 and an adjustment part joint part G62 of the adjustment part G15, allowing a rotational movement and particularly a swivel movement of the adjustment part G15 (arrow G163 in the FIG. 21) relative to respective base body G13 between a retracted state (FIG. 21) and a folded-out, extended state (FIG. 19) is permitted. In FIG. 18 a partially folded-out, extended state of the adjustment parts G15 of the gripping devices G11 and G12 and G21 and G22, respectively, is shown.

The embodiment of the gripping device G167 according to FIG. 21 comprises the positioning partial drive device G70 particularly with a drive motor which is disposed at the base body G13 or the adjustment part G15.

The positioning partial drive device G70 of a respective bearing device 60, 80 form a gripping drive device AG1 and AG2 (FIG. 28), respectively. The gripping drive device A6, A8 are respectively realized such that with the same, due to command signals which are generated by a respective capturing adjustment command function respectively of a gripping adjustment device, the adjustment parts G15 respectively of a bearing device 60 and bearing device 80 can be moved between a retracted and the extended state. In this regard the adjustment parts G15 respectively of a bearing device 60 and bearing device 80, respectively, are moved within predetermined limits of accuracy axisymmetric with regard to the YF- or YA-axis.

The gripping devices G67, G167 comprise a connection part G48 and G148, respectively, which respectively extends in the XF-direction between an upper end G49a and a lower end G49b and has a length d13 between an uppermost position of the guidance contour G42 and the lower end G49b for which respectively a minimum length is provided which extends in the ZF- and ZA-direction, respectively: This can be determined for the first bearing device 60 such that with a respective undermost state the first bearing device 60 and the second bearing device 80 the support devices 67, 68 of the first bearing device 60 are disposed within or below area of the second base part B2 and the base body 83, 84, respectively, hence the telescopic holder 181, 182 of the second bearing device 80, when viewed in the vertical direction or the ZF- and ZA-direction, respectively.

The undermost state of the first bearing device 60 and the second bearing device 80 are shown in FIG. 12. The undermost state of the first bearing device 60 and the second bearing device 80 thus lie on an edge of the base plate 33 or an edge of the vehicle frame 30. The undermost states of the first bearing base 60B and the second bearing base 80B of the embodiments of the stack operating vehicle F are respectively provided such that a storage unit LE can be taken up or deposited by the holding device 69 and 89, respectively, which is coupled thereto, when the storage unit LE is situated on the warehouse floor R. In this manner a storage unit LE which is standing on the warehouse floor R can be taken up or grabbed and moved upward both with the first bearing device 60 and the second bearing device 80 by the respective gripping device.

The webs LE17, LE18 and the support devices 67, 68 and 87, 88, respectively, are formed such that the surfaces 67a, 68a and 87a, 88a, respectively, with regard to the direction of gravity can be contacted with contact surfaces of the capturing device in form of the lower surfaces LE17b, LE18b of the webs LE17, LE18 of a storage unit LE1 so that subsequently, when the respective bearing base 60B and 80B, respectively, together with the support devices 67, 68 and 87, 88, respectively, are moved from a lower state upward, the storage unit LE1 can be lifted, an vice versa. In case that the stack operating vehicles F is positioned in a corresponding manner in front of the storage unit LE1, the abutting of surfaces 67a, 68a and 87a, 88a, respectively, of the support devices 67, 68 and 87, 88, respectively, at the lower surfaces LE17b and LE18b, respectively, can occur by moving the support devices 67, 68 and 87, 88, respectively, along, due to the extension of the same in relation to the respective bearing base 60B and 80B, respectively. In this regard the respective bearing base 60B and 80B, respectively, is positioned on a height at which the surfaces 67a, 68a and 87a, 88a, respectively, are disposed on the same height as the lower surfaces LE17b, LE18b. Also, the abutting of the surfaces 67a, 68a and 87a, 88a, respectively, of the support devices 67, 68 and 87, 88, respectively, on the lower surfaces LE17b, LE18b can occur in that the respective bearing base 60B and 80B, respectively, is adjusted to a vertical position or height position at the stack operating vehicle F at which the surfaces 67a, 68a and 87a, 88a, respectively, are disposed in a distance below the lower surfaces LE17b, LE18b. In this position of the respective bearing base 60B and 80B, respectively, the respective support devices 67, 68 and 87, 88, respectively, are extended in relation to the respective bearing base 60B and 80B, respectively, until the same are disposed below the lower surfaces LE17b, LE18b with a sufficient overlapping viewed in the longitudinal directions L67, L68a and L87, L88, respectively. Subsequently the respective bearing base 60B and 80B, respectively, is moved upward until the surfaces 67a, 68a and 87a, 88a, respectively, of the support devices 67, 68 and 87, 88, respectively, abut on the lower surfaces LE17b and LE18b, respectively, so that then by moving the respective bearing base 60B and 80B, respectively, upward, the storage unit LE1 can be moved upward contrary to the gravitational vector.

Vice versa, in this state the storage unit LE1 can be deposited from above downward on a contact surface for example a warehouse floor R by a movement of the respective bearing base 60B and 80B, respectively, with den support devices 67, 68 and 87, 88, respectively.

As can be taken from FIG. 5, in which the undermost states or undermost vertical positions of the first bearing base 60B and the second bearing base 80B are shown for the embodiments of the stack operating vehicle F according to FIGS. 1 to 4, the holding devices 69 and 89 are located in their respective downmost states in which their upper surfaces 67a, 68a and 87a, 88a, respectively, are positioned in a distance d1 above the warehouse floor R. In case that the distance d1 is less than the distance d2 between lower surfaces LE17b, LE18b and a warehouse floor R, the support devices 67, 68 and 87, 88, respectively, can as described abut on the surfaces LE17b, LE18b. In this manner a storage unit LE1 can be taken up from below in this respective undermost state by the holding device 69 and 89, respectively.

With the embodiments of the stack operating vehicle F according to FIGS. 1 to 6 a storage unit LE, which is generally designed rectangular according to their outer contours, can be taken up with their lower surface LE15a of the base plate LE15 by means of the support devices 67, 68 and 87, 88, respectively, and can be moved in the vertical direction upward or downward by raising or lowering the respective bearing base 60B and 80B, respectively. Hence, in this regard the base plate LE15 forms the capturing device and the lower surface LE15a of the base plate LE15 forms the contact surface. As even in the downmost state of the respective bearing base 60B and 80B, respectively, the surfaces 67a, 68a and 87a, 88a, respectively, are disposed at least the distance d1 above the warehouse floor R, that with this storage order particularly provision is made that the storage unit LE1 which can be the downmost storage unit LE1 of a stack of storage units LE1, is situated in a storing device of a shelf or a storing device as a socket so that the storage unit LE1 can be taken up by the support sections 67b and 68b at the underside or the lower surface LE15a.

With the embodiment of the stack operating vehicle F according to FIG. 5 the same comprises a vehicle frame 30 and a base plate 33 which is non-rotatably supported on the vehicle frame 30.

Figure 23:
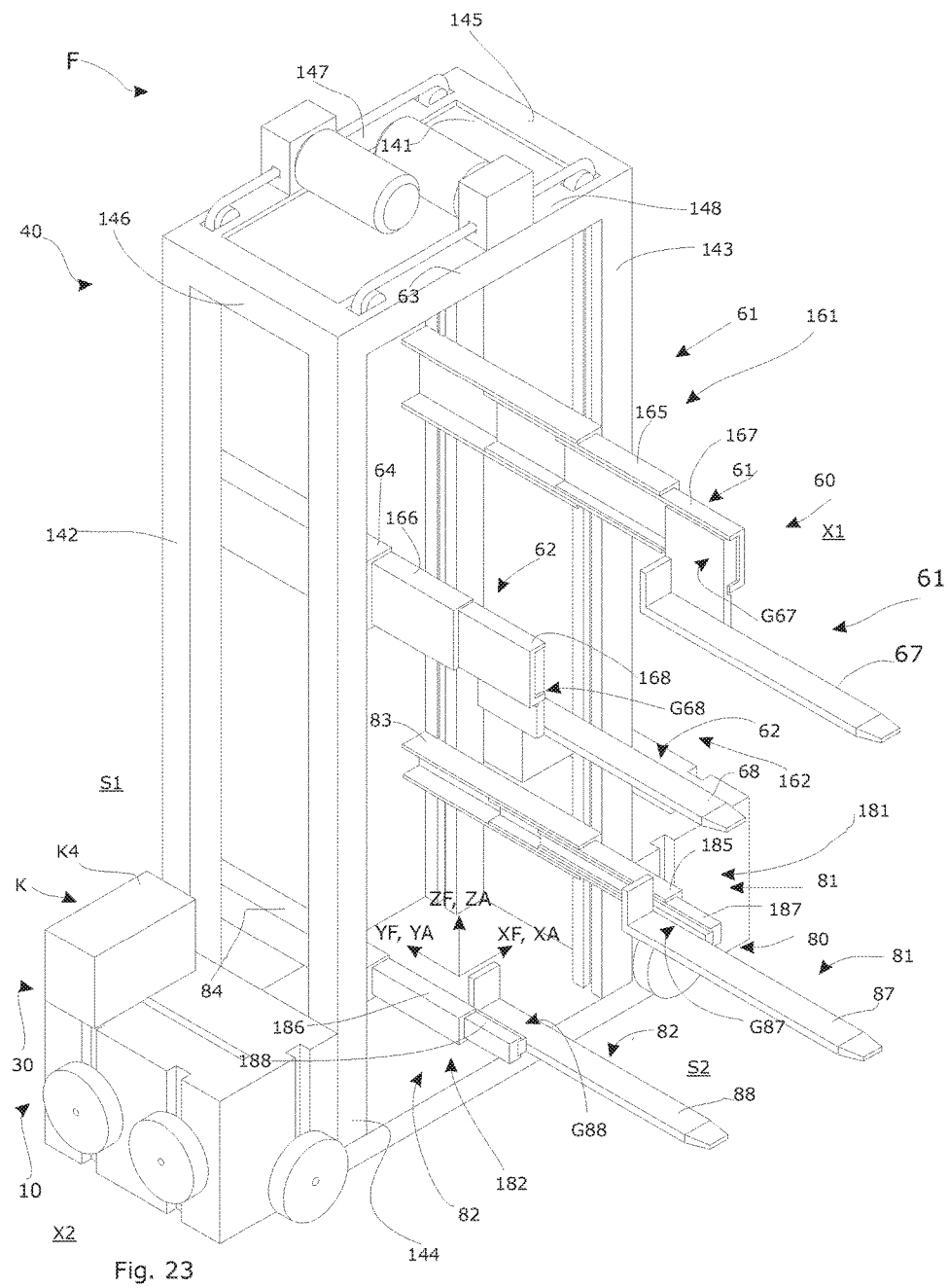
FIG. 23 is a schematic perspective presentation of an embodiment of the support structures for arrangement on a movement device of an embodiment of the stack operating vehicle, wherein the support structure comprises a vertical guide arrangement with a first guiding device for guiding the first bearing device at the support structure and with a second guiding device for guiding the second bearing device at the support structure and a first height adjustment device for adjustment of the first bearing device and a second height adjustment device for adjustment of the second bearing device.

FIG. 23 shows an embodiment of the stack operating vehicle F with capturing devices 61, 62, 81, 82 which respectively are realized as telescopic holder 161 and 162 and 181 and 182, respectively, wherein to the end pieces telescopic holder 161 and 162 and 181 and 182, respectively, are coupled and instead of the gripping devices bar-shaped bearing devices 67 and 68 and 87 and 88, respectively, are moveably coupled with relation to the respective end pieces 167 and 168 and 187 and 188, respectively.

FIGS. 24 to 27 show different embodiments of the section of the stack operating vehicle F which is disposed on the movement device 10. With these embodiments at a telescopic endpiece 167, 168, 187, 188 two gripping devices G11a, G11b, G12a, G12b, G21a, G21b, G22a, G22b are respectively disposed such that the same are fixed to one another in terms of movement. At a telescopic endpiece 167, 168, 187, 188 two respective gripping devices G11a and G11b, G12a and G12b, G21a and G21b, G22a and G22b, respectively, are disposed which are disposed respectively at a first end E1 and at a second end E2 of the gripping devices G11a, G11b, G12a, G12b, G21a, G21b, G22a, G22b so that in both extended states of the telescopic holder 161 and 162 and 181 and 182 (FIGS. 11 and 10), respectively, the respective outer gripping devices G11a, G11b, G12a, G12b, G21a, G21b, G22a, G22b are used for taking up a storage unit LE without requiring an adjustment of a gripping device G11a, G11b, G12a, G12b, G21a, G21b, G22a, G22b at the respective end pieces.

Further, in FIG. 10 an embodiment of a tilting compensation device K particularly in form of two tilting compensation supports K1, K2 is shown which is moveable along the YF-direction between a retracted state and between an extended state at the first side S1 (FIG. 11) and an extended state at the second Side S2 (FIG. 10) by means of a tilting compensation adjustment device AK in order to secure the stack operating vehicle F against tilting due to tilting moments which can be generated by an unilateral load caused by storage units LE.

Figure 22:
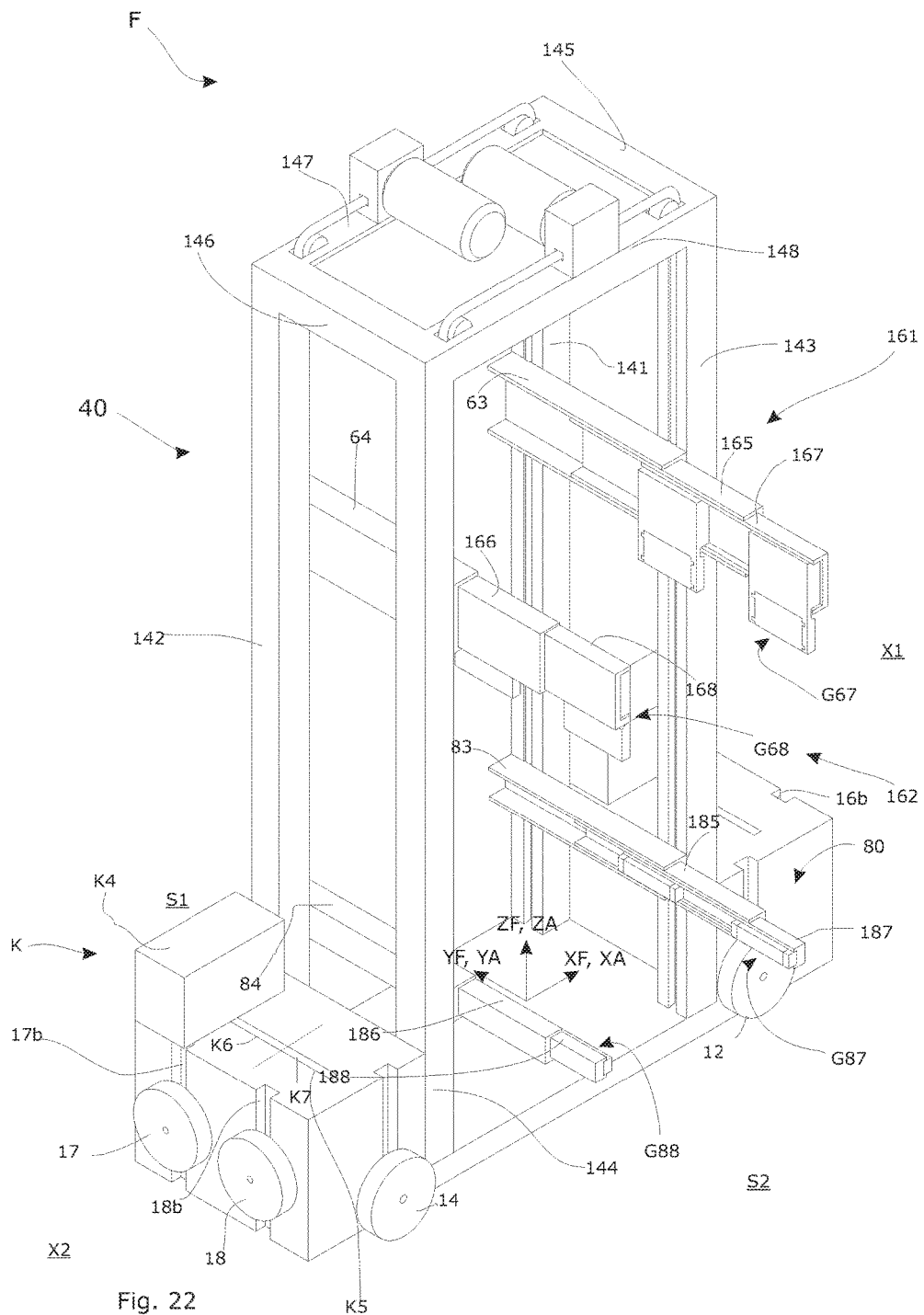
FIG. 22 is a schematic perspective presentation of a further embodiment of the stack operating vehicle in which the bearing device of the holding devices are realized in an alternative manner with regard to the embodiment of the gripping devices of FIG. 10 or FIG. 18.

Alternatively or additionally the tilting compensation device K can be formed as a tilting compensation device K which is formed at the vehicle frame 30 and comprises a guiding device K3 and a counterweight K4. This embodiment of the tilting compensation device K is shown in FIG. 11. The guiding device K3 comprises a guide track K5 which extends along or in the YF-direction and in which the counterweight K4 is guided, whereby the same coact with each other by their cross-section profile. The guide track comprises collateral parts K6, K7 which are situated respectively on sides which are positioned opposite to each other in relation to a line which runs in the XF-direction and through a center of an area which is delimited by the support structure viewed in the ZF- or ZA-direction. Particularly, provision can be made that the collateral parts K6, K7 have a width which amounts to at least a quarter of the width in the YF-direction which has the area which is delimited by the support structure 40 in the ZF- or ZA-direction. By positioning the counterweight K4 on the side section K7 which is disposed on the side S2 a counter moment is generated against a moment which is generated by the weight of a storage unit which is held by a bearing device on the first side S1 in the extended state and raised from the base R (FIG. 11), and vice versa (FIGS. 22 and 23).

With the tilting compensation device K a tilting compensation adjustment device with a tilting compensation command function is associated which is functionally connected with the tilting compensation adjustment device AK (FIG. 28). The tilting compensation adjustment device AK is realized such that with this, due to command signals which are generated by the tilting compensation command function, the tilting compensation device K can be moved from an initial state to a desired adjustment state within the provided end states, hence for example between retracted state and an extended state or between a two states which lie opposed to each other (FIGS. 10 and 11).

Figure 24:
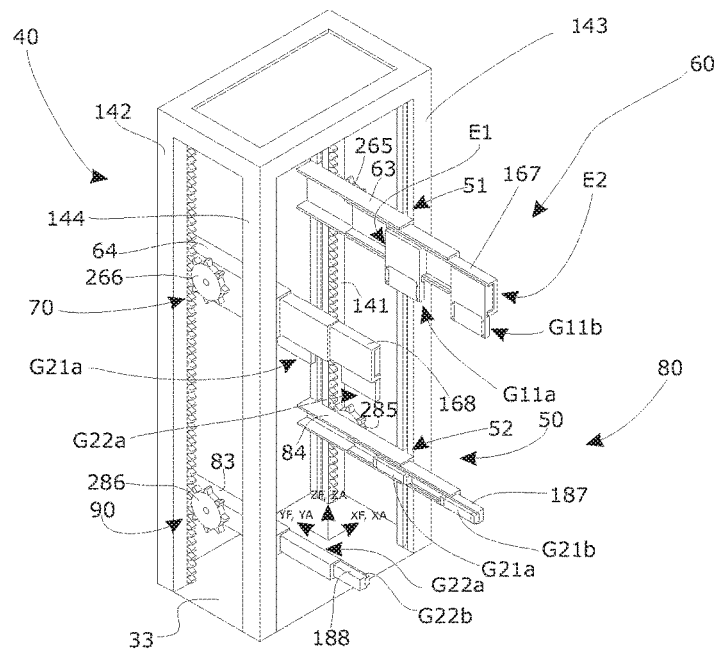
FIG. 24 is a further embodiment, in comparison to the embodiment of FIG. 23, of a combination of the support structures, height adjustment devices and the vertical guide arrangement.
Figure 25:
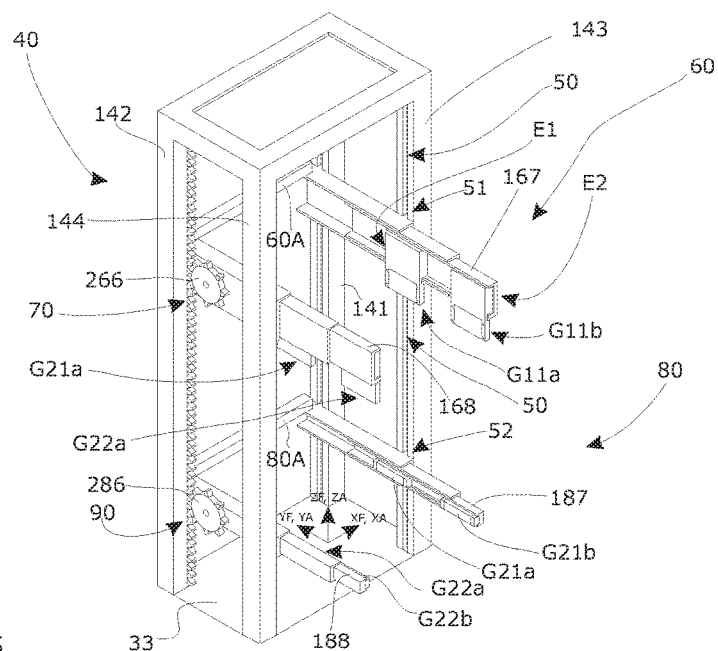
FIG. 25 is a further embodiment, in comparison to the embodiment of FIG. 24, of a combination of the support structures, height adjustment devices and the vertical guide arrangement.

Further FIGS. 24 and 25 show different embodiments of the adjustment devices 70, 90, respectively as combinations of a gear wheels and a toothed rack. According to FIG. 24 respectively one toothed rack is disposed at the support bars 141 and 142. These together with the gear wheels 265, 266 and 285, 286 which are rotatably disposed at the base bodies 63, 64 and 83, 84, respectively, as connecting devices which respectively are engaged in the toothed rack, form height adjustment devices 70 and 90, respectively.

Figure 26:
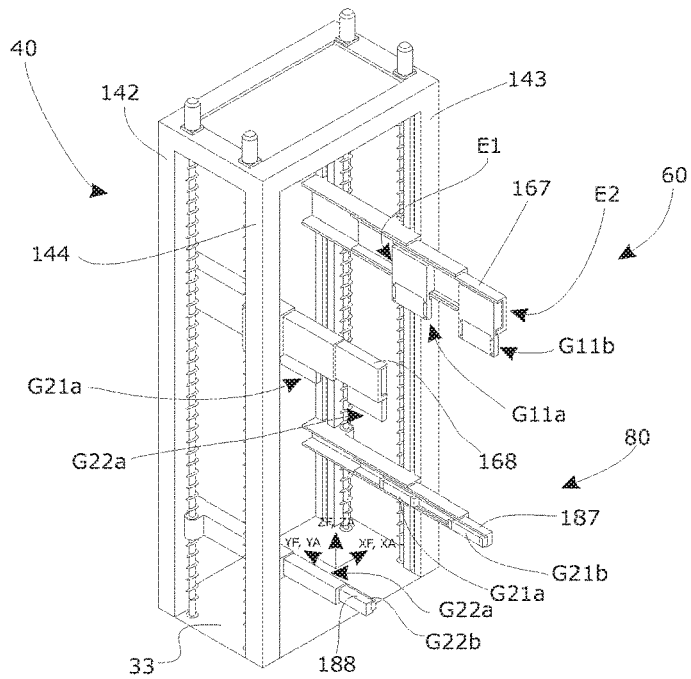
FIG. 26 depicts a further embodiment, in comparison to the embodiments of FIGS. 24 and 25, of a combination of the support structures, height adjustment devices and the vertical guide arrangement.
Figure 27:
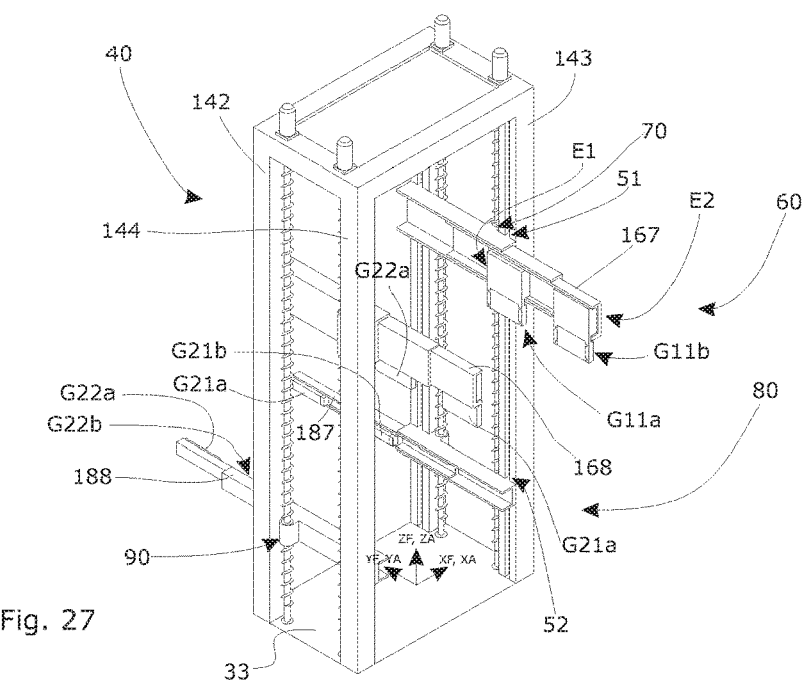
FIG. 27 depicts a further embodiment, in comparison to the embodiments of FIGS. 24 to 26, of a combination of the support structures, height adjustment devices and the vertical guide arrangement.

FIGS. 26 and 27 show different embodiments of the adjustment devices 70, 90, respectively, as worm drive.

The support structures shown in FIGS. 24 to 27 can be formed from one of the embodiments of the disclosure described herein.

A vehicle system S is shown in FIG. 28. The functions of the vehicle systems S herein described above are functionally connected with a vehicle control device F2 which can individually control the different functions of the vehicle systems S. The functions of the vehicle systems S and the vehicle control device F2 form the vehicle control system F1.

In FIG. 28, a functional presentation of an embodiment of the vehicle control system F1 is presented which is formed for controlling: the height adjustment drive devices 73, 93; the gripping drive arrangements A60, A80; optionally at least one of the gripping drive devices AG1, AG2 and therewith optionally the respective corresponding gripping device positioning arrangement AP1 and AP2, respectively; and optionally, the tilting compensation adjustment device AK.

The combination of the adjustment devices FG1, F60, F70 and FG2, F80, F90 can also be named as arrangement control device.

The function blocks shown in this regard can be separate computer modules or processors or software modules or program modules, wherein several or all of the show function blocks of the vehicle control system F1 are integrated in a computer module or processor.

The vehicle control system F1 can comprise a transmission and receiving device F10 with which the vehicle control device F2 can be commanded. The vehicle control device F2 can be realized such that the same can be in communication connection with f10 FZ per radio.

In FIGS. 30 to 38 steps of a sequence of storage orders is shown which are executed with one of the shown embodiments of the stack operating vehicle F and particularly with of the embodiment of the stack operating vehicle F of FIG. 10.

Figure 30:
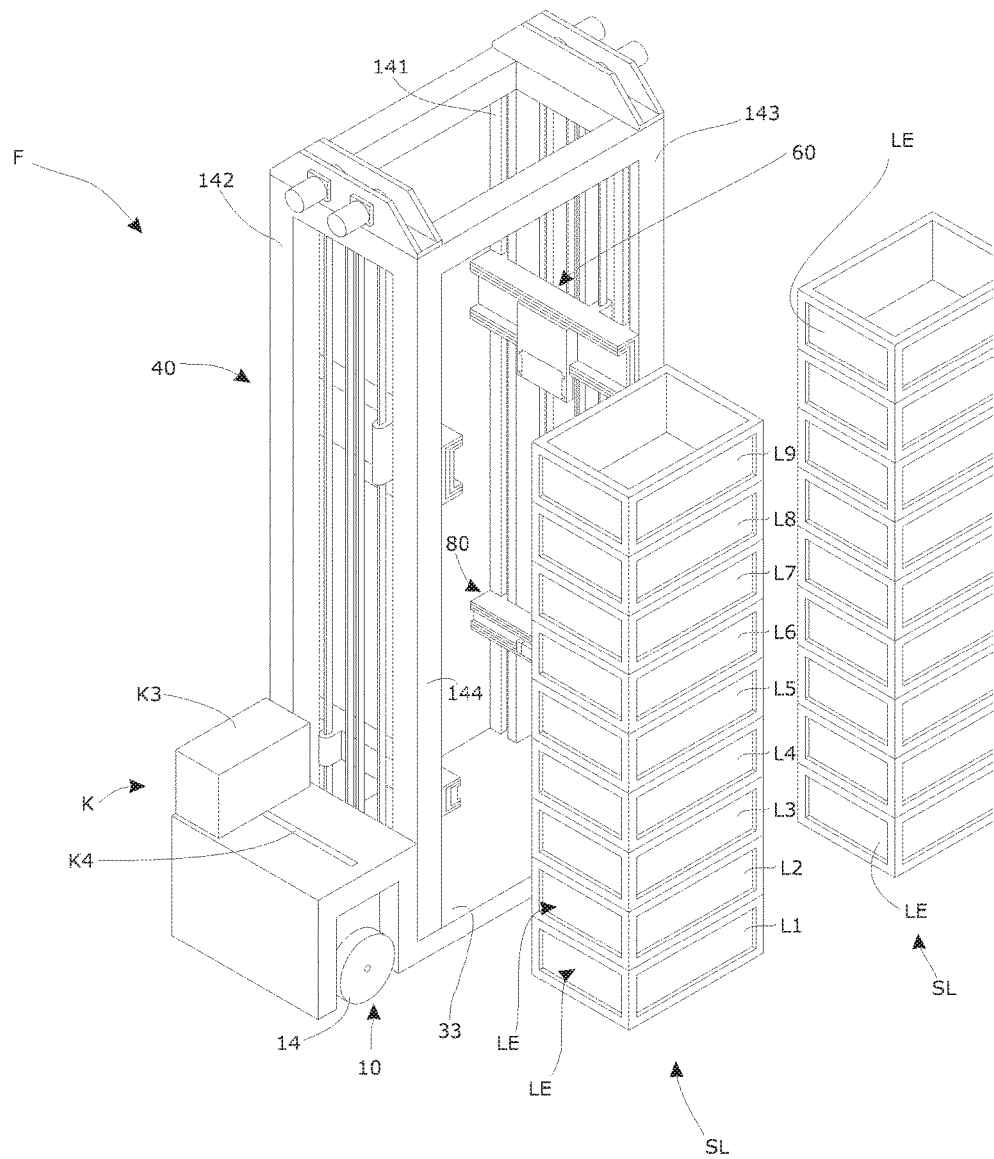
FIGS. 30 to 38 depict different steps of a method for execution of storage orders according to the present disclosure, wherein the steps of the method are shown with the embodiment of the stack operating vehicle of FIG. 10.
Figure 31:
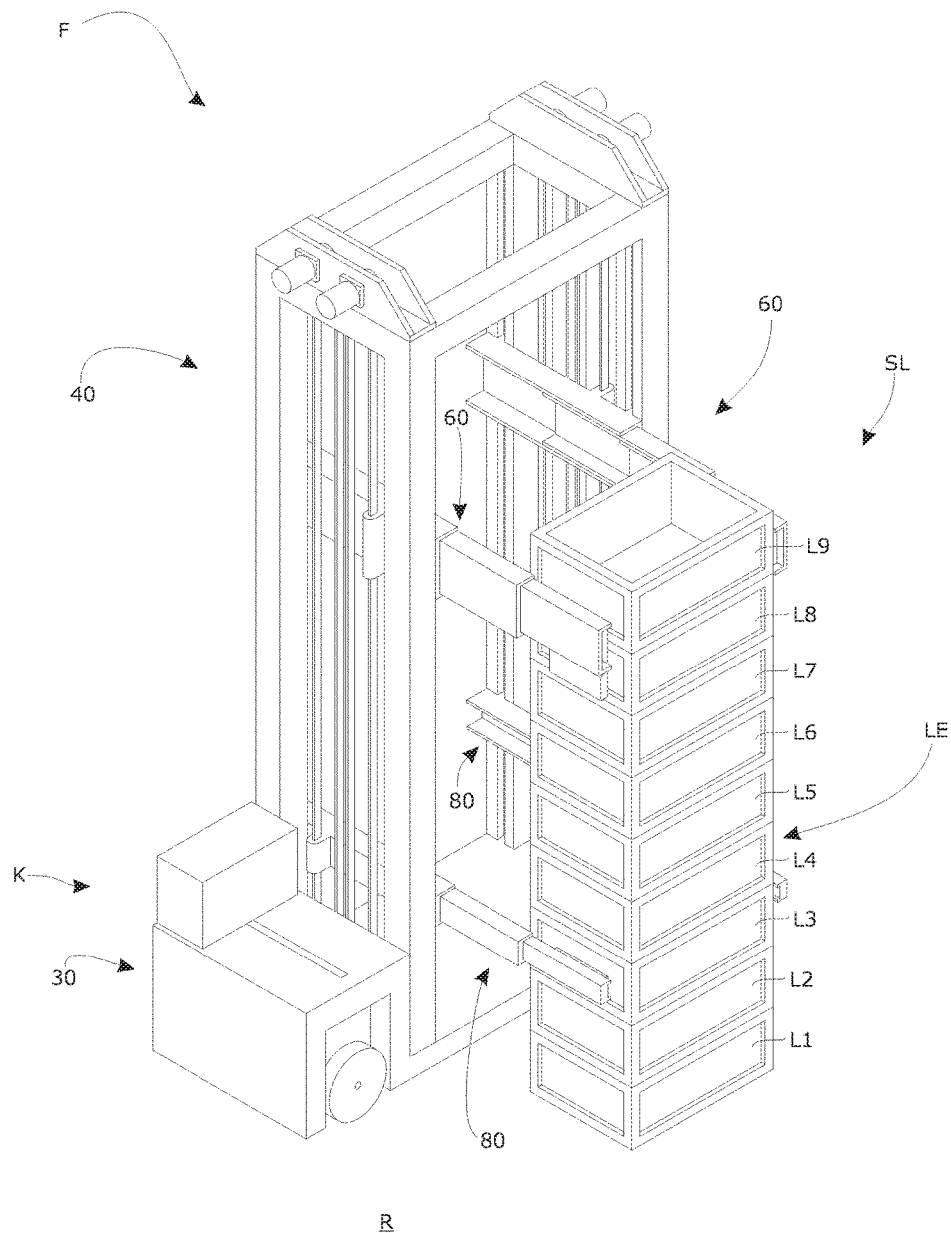

If not yet occurred, for a start a positioning of the stack operating vehicle F in front of a stack SL of storage units LE can be provided such that the first holding device 69 and the second holding device 89 face the stack SL, wherein particularly the storage units LE are disposed within the base body of the first bearing base B1 and the second bearing base B2 when viewed in the XF-direction. With the embodiments of the stack operating vehicle F of FIG. 1 the stack SL of storage units LE has to be situated at the side S2 of the stack operating vehicle F, whereas with the embodiments of the stack operating vehicle F of FIG. 10 the stack SL of storage units LE can be situated at the sides S1 or S2 of the stack operating vehicle F. In FIG. 30 the stack operating vehicle F according to FIG. 10 is shown in such a positioning in front of the stack SL of storage units LE, wherein the single storage units LE are assigned the reference numerals L1, L2, L3, L4, L5, L6, L7, L8, L9.

In case that a tilting compensation device K exists, provision can be made that before capturing or capturing of at least a storage unit LE the tilting compensation device K is activated such that a compensation moment against a tilting moment is realized which is generated by the weight force of the at least a storage unit LE which is held lifted from the base by at least a holding device 69, 89 of at least a bearing device 60, 80. The tilting compensation device K can be activated in at least two ways. In one way, the embodiment of the tilting compensation device K according to FIG. 10 is activated by extending of the two tilting compensation supports K1, K2 on the side on which the at least one storage unit LE is held lifted from the base by a bearing device 60, 80. Another way, with the embodiment of the tilting compensation device K according to FIG. 11, the device is activated by driving the counterweight K4 on a side section K5, K6 which is disposed on the side S1 or S2, on the at least one storage unit LE is held lifted from the base by the bearing devices 60, 80.

Figure 32:
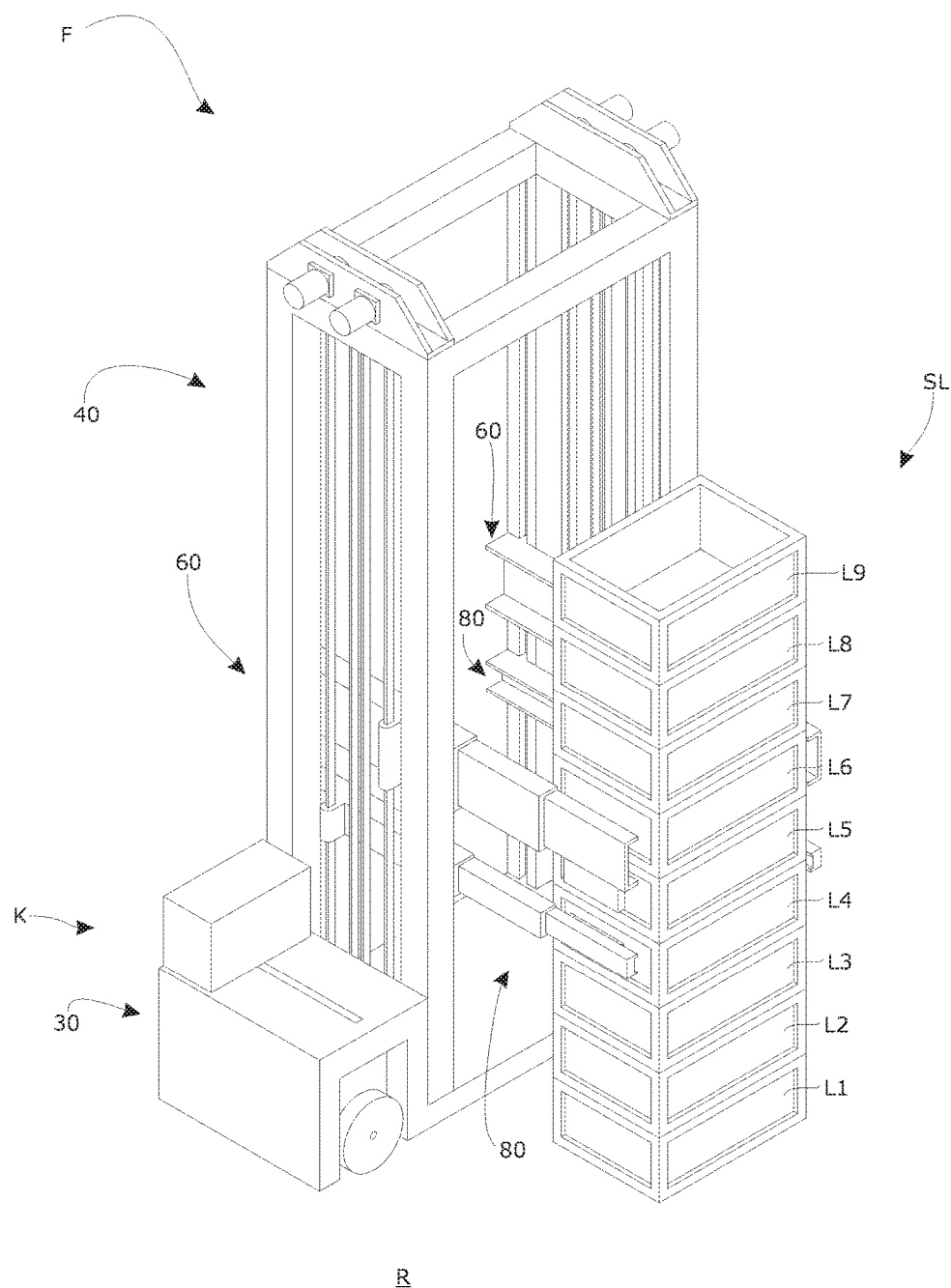
Figure 33:
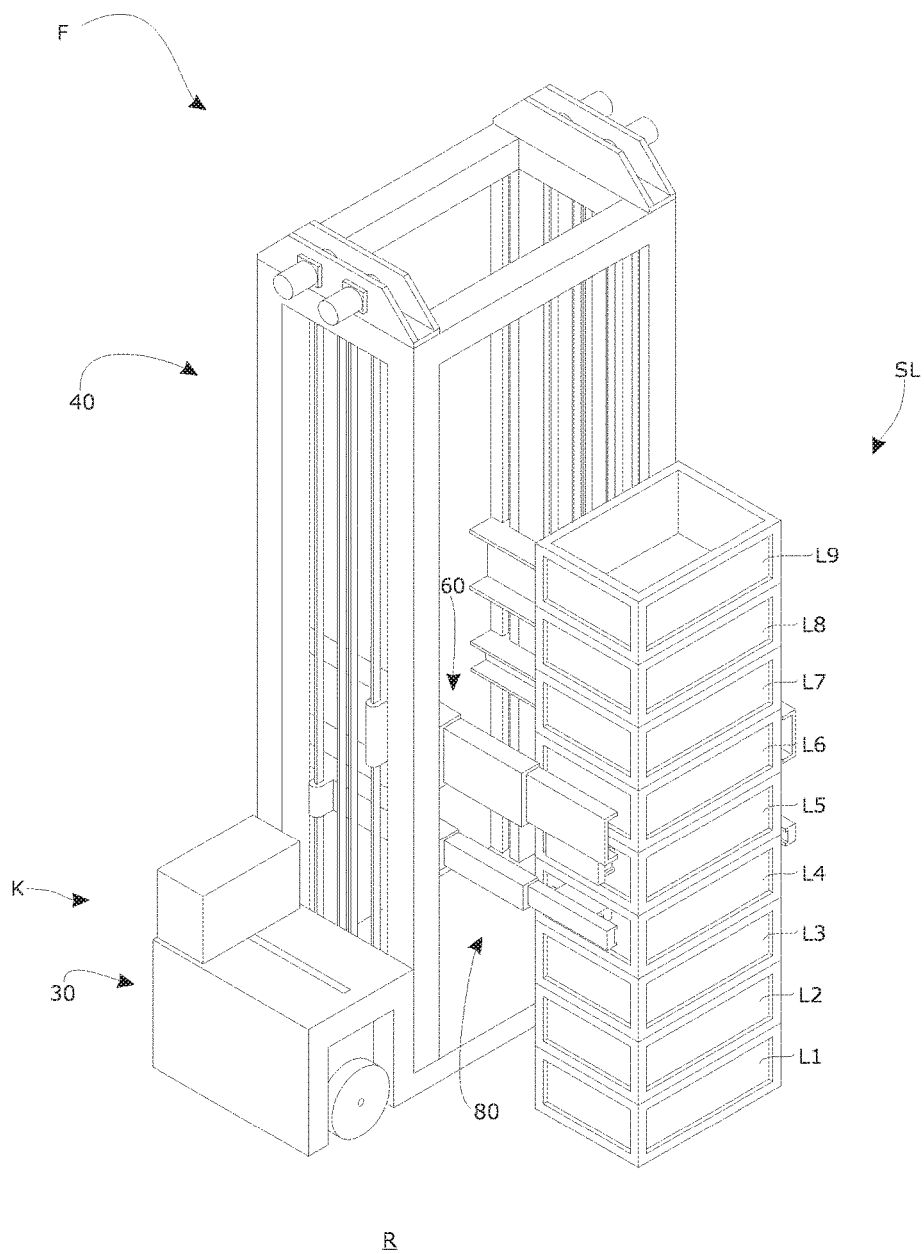

In such an initial position of the stack operating vehicle F, the holding devices 69, 89 of the bearing device 60, 80 are extended on the side of the stack operating vehicle F on which the stack SL of storage units LE on the warehouse floor RE is disposed. In this regard the holding devices 69, 89 are extended so far that these are situated in a capturing position, wherein they extend in the YF-direction so far that they are able in this regard at least one storage unit LE to be taken up in several ways, as explained here. With the capturing devices 61, 62 and 81, 82, respectively, with the support devices 67, 68 and 87, 88, respectively, of FIG. 1 or 5 and a stack of storage units LE according to FIGS. 7 to 9, the support devices 67, 68 and 87, 88, respectively, extend below and along the undersides LE17b and LE18b (FIG. 8) of the lateral webs LE17 and LE18, respectively, of a storage unit LE according to FIGS. 7 to 9. In a second way, using the capturing devices 61, 62 and 81, 82, respectively, in form of the telescopic holders of FIGS. 10 to 27 and a stack of storage units LE according to FIGS. 7 to 9, the adjustment parts G15, G16 and G25, G26, respectively, of the respective gripping devices G11, G12 and G12, G22, respectively, are disposed below and along the Undersides LE17b and LE18b (FIG. 8) of the lateral webs LE17 and LE18, respectively, of a storage unit LE according to FIGS. 7 to 9. In a third way, using the capturing devices 61, 62 and 81, 82, respectively, in form of the telescopic holder of FIGS. 10 to 27 and a stack of storage units LE according to FIGS. 13 to 14 the adjustment parts G15, G16 and G25, G26, respectively, of the respective gripping devices G11, G12 and G12, G22, respectively, are situated below the lower surfaces LE17b and LE18b, respectively, and within the framed surface sections LE13b, LE14b of the side plates LE13 and LE14, respectively, of storage units LE according to FIGS. 7 to 9. This operational state is shown in FIG. 32.

The extending of the holding devices 69, 89 in the before-mentioned states can be provided simultaneously in order to abbreviate the time for the execution of the respective storage order.

With the capturing devices 61, 62 and 81, 82, respectively, in form of the telescopic holders of FIGS. 10 to 27 in the next steps an extending of the adjustment parts G15, G16 and G25, G26, respectively, of the respective gripping devices G11, G12 and G12, G22 (FIG. 33), respectively, is provided, (a) until the adjustment parts G15, G16 and G25, G26, respectively, capture the side plates LE13, LE14 such that in this state the adjustment parts of the captured storage unit LE, where applicable with further storage units LE which are situated on the same, can be lifted, or (b) until the adjustment parts G15, G16 and G25, G26, respectively, are below the lower surfaces LE17b and LE18b, respectively, are disposed and optionally additionally are contacting the same.

In this regard also provision can be made that both before-mentioned conditions (a) and (b) are fulfilled.

These steps of the extending of the adjustment parts G15, G16 and the adjustment parts G25, G26 can be realized simultaneously.

Figure 34:
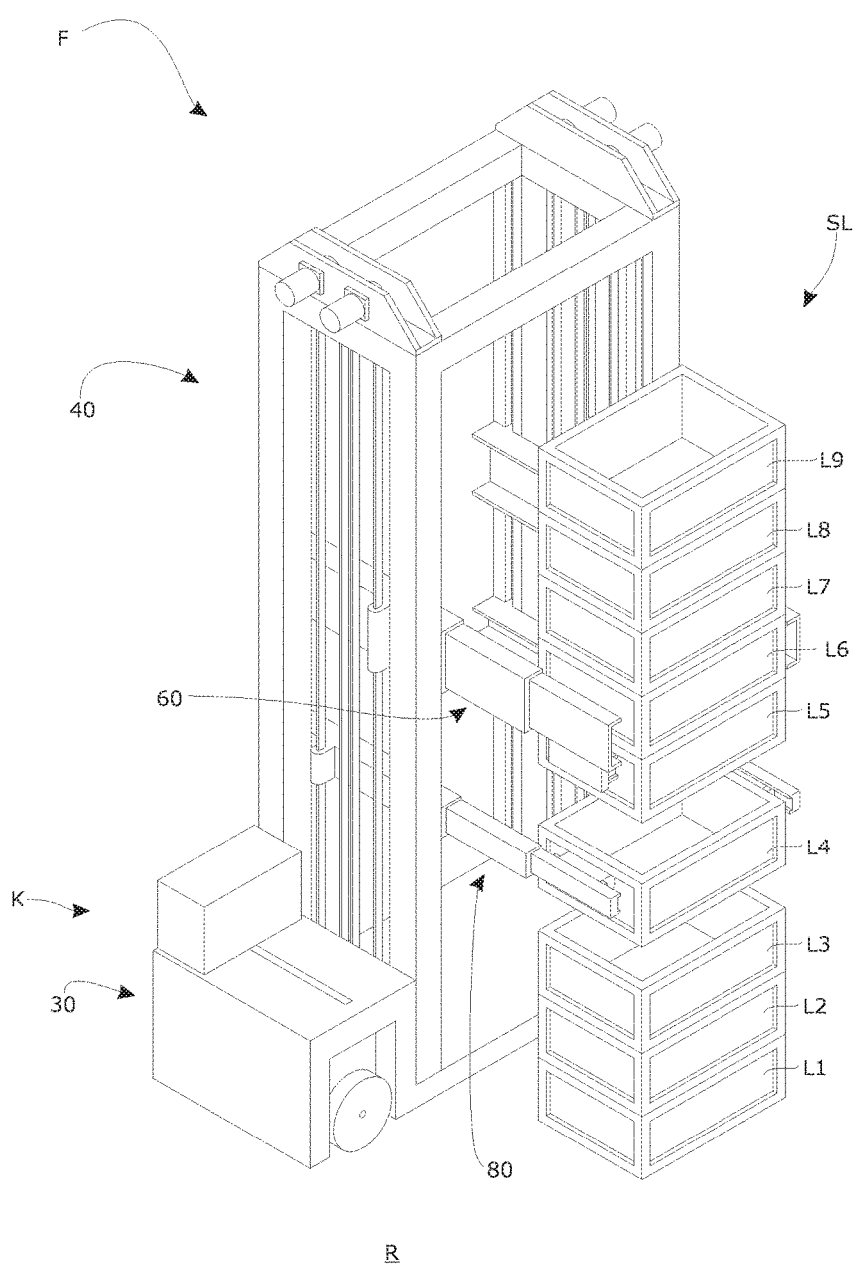

In the next steps the bearing device 60, 80 is driven upward in the ZF-direction, with (1) in the ZF-direction raising of the at least one storage unit LE which is captured by the holding device 69 of the first bearing device 60—in FIG. 34 the storage unit LE5 with the storage units LE6, LE7, LE8, LE9 lying above—by movement of the first bearing device 60 in positive ZF-direction, hence upward, due to a corresponding actuation of the first height adjustment device 70, and (2) in the ZF-direction raising of the at least one storage unit LE which is captured by the holding device 89 of the second bearing device 80, respectively—in FIG. 34 the storage unit LE4—by movement of the second bearing device 80 in positive ZF-direction, hence upward, due to a corresponding actuation of the second height adjustment device 90.

With another state of the bearing device 60, 80 the situation can be given that the bearing device 60 moves several storage units LE upward.

In this regard provision can particularly be made that the raising of the at least storage unit LE by the first bearing device 60 viewed in ZF-direction is moved upward a larger path as the raising of the at least one storage unit LE by the second bearing device 80. In this regard particularly provision can be made that the larger path is larger as the path which is covered by the first bearing device 60 by a difference which makes a safe lateral moving away in the horizontal direction possible.

Figure 35:
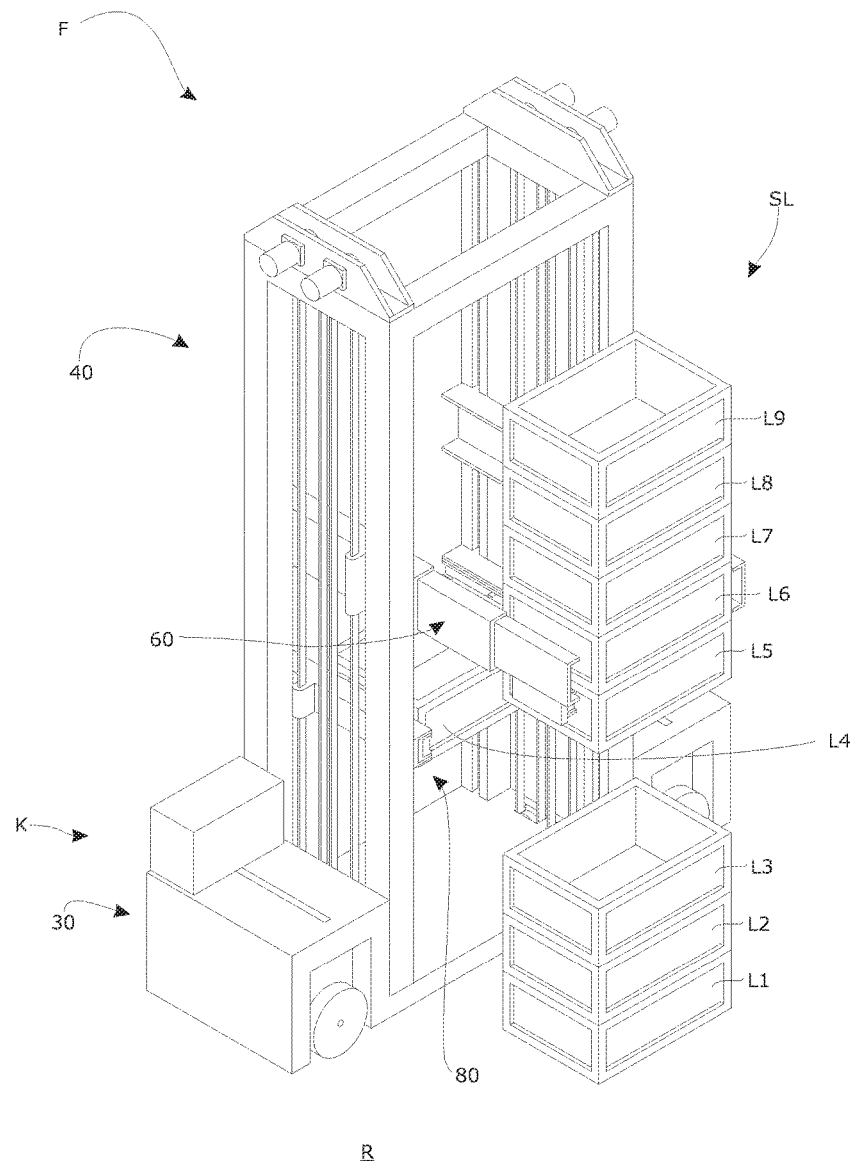
Figure 36:
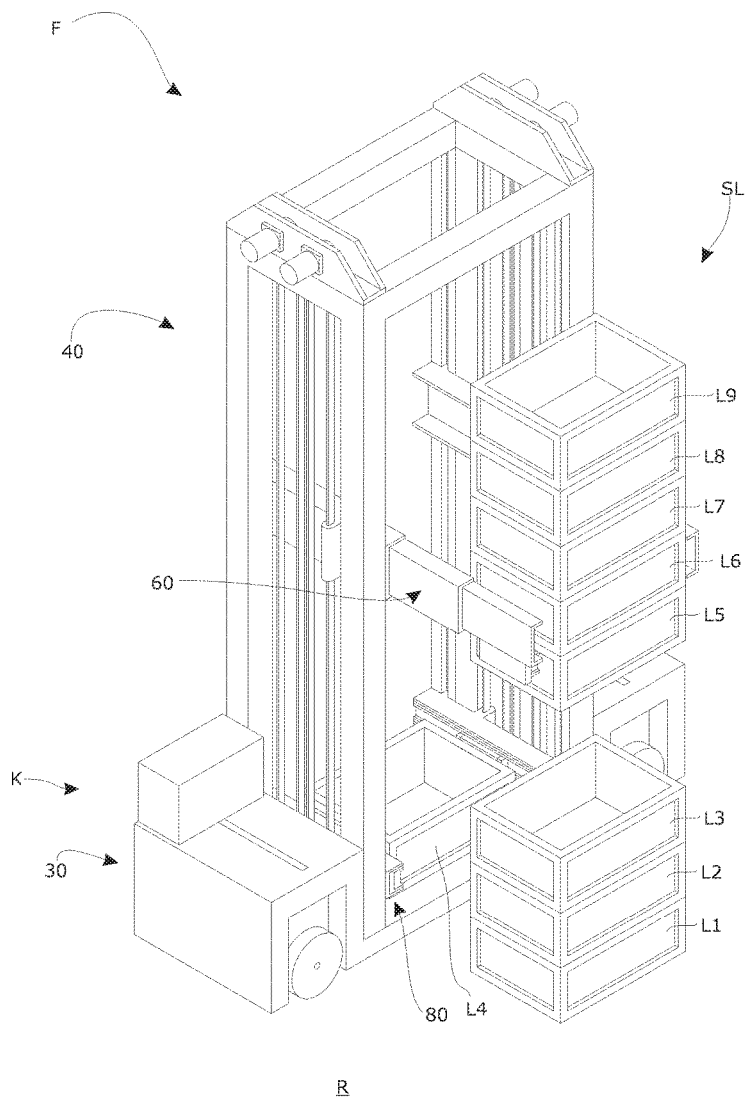

In a further step—with the extended state of the first holding device 69—the holding device 89 of the second bearing device 80 is brought in a retracted state, in which the at least one storage unit LE which is captured by the same is situated at least outside the ground plot area of the stack SLE of storage units LE when viewed contrary to the ZF-direction, and in which particularly the storage unit LE which is captured by the same is situated within the area of the stack operating vehicle F which is delimited or demarcated by the inner sides of the support structures (FIG. 35).

Optionally provision can be made that the at least one storage unit LE which is captured and held by the second holding device 89 is deposited on the base 33 or on another depository as an intermediate depository (FIG. 36) by movement of the second bearing device 80 in negative ZF-direction, hence downward, due to a corresponding actuation of the second height adjustment device 90.

Figure 37:
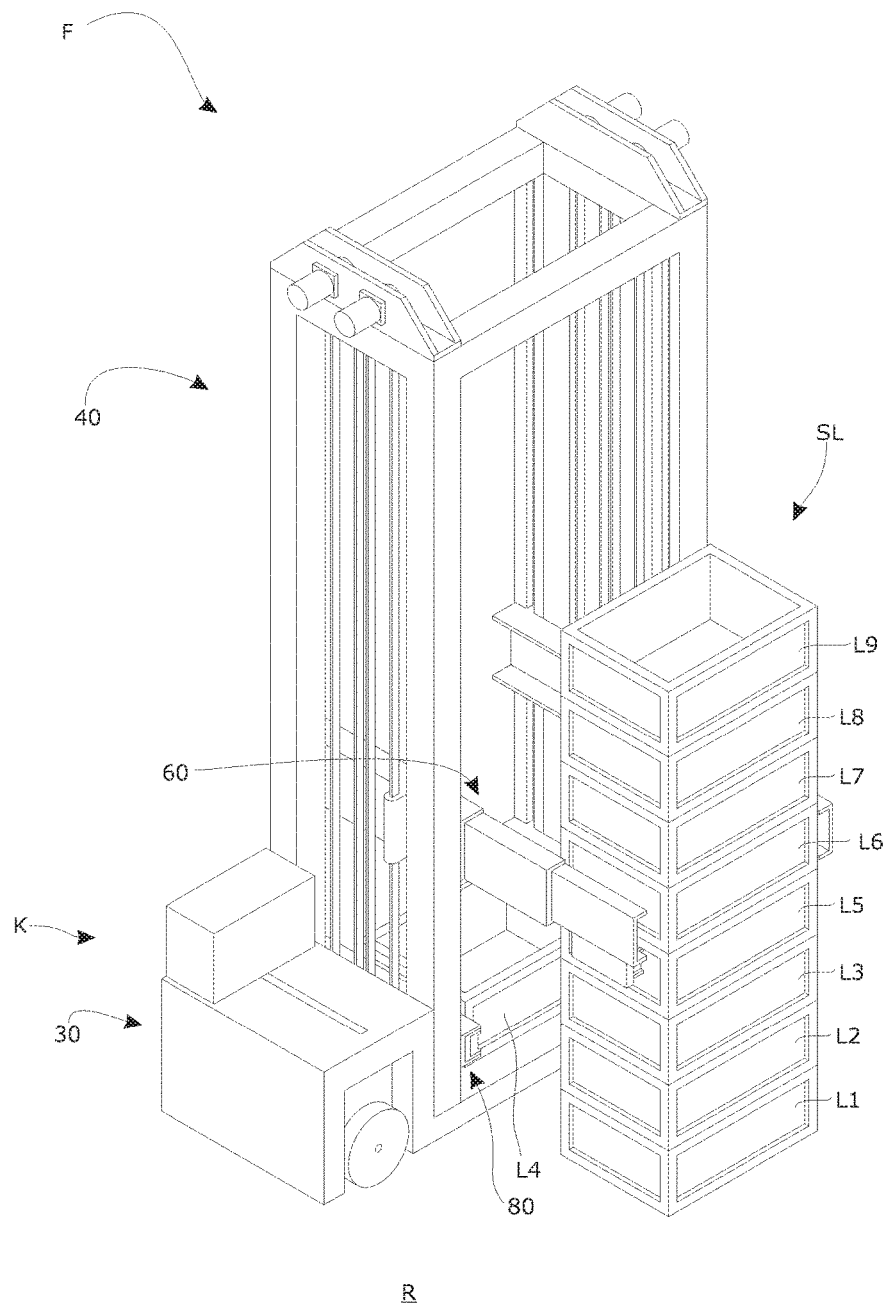

In a next step subsequently or also in parallel to the before-mentioned step the at least one storage unit LE which is captured and held by the first holding device 69 is deposited by movement of the first bearing device 60 in negative ZF-direction, hence downward, due to a corresponding actuation of the first height adjustment device 70, on the remaining stack, hence the stack of storage units LE1, LE2, LE3 (FIG. 37).

Figure 38:
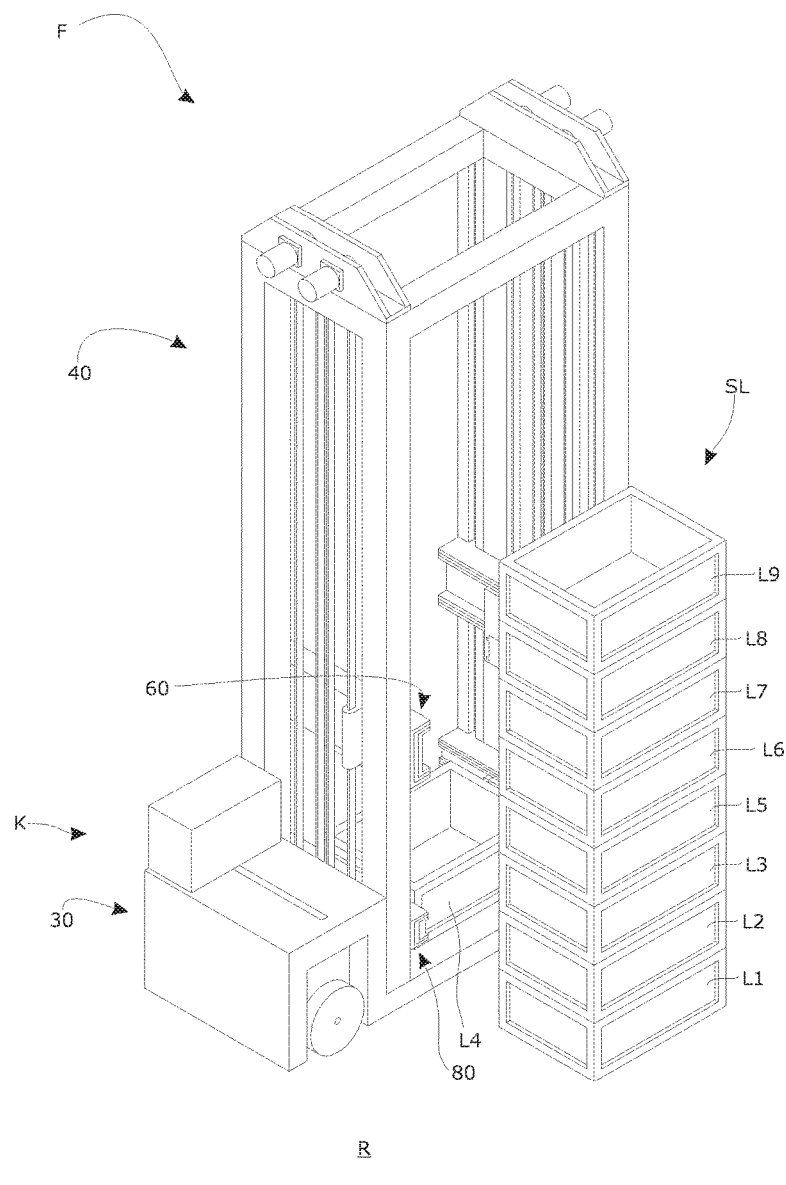

Optionally the first holding device 69 can be moved in the retracted state (FIG. 38).

Figure 39:
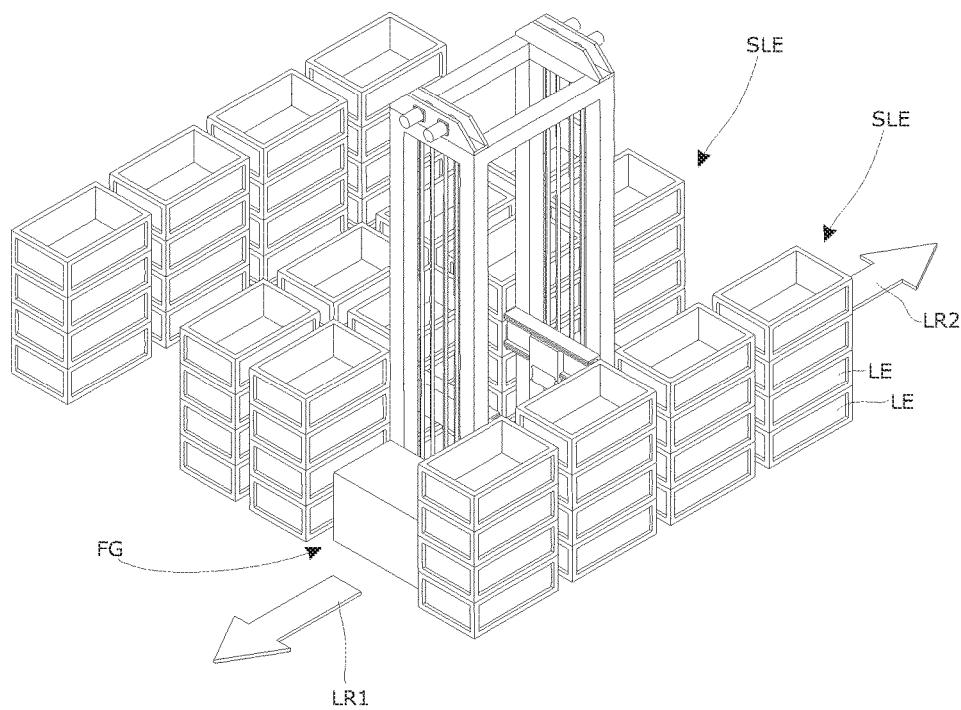
FIG. 39 depicts an embodiment of movement of the stack operating vehicle in an aisle which is recessed between a row of stacks of storage units.

In FIG. 39 is shown that the stack operating vehicle F is designed in an advantageous manner also insofar as the same can be driven in the directions LR1, LR2 along an aisle FG which is recessed between rows of stacks SLE of storage units LE when the aisle FG has a width which is adapted to the size of the stack operating vehicle F.

Figure 40:
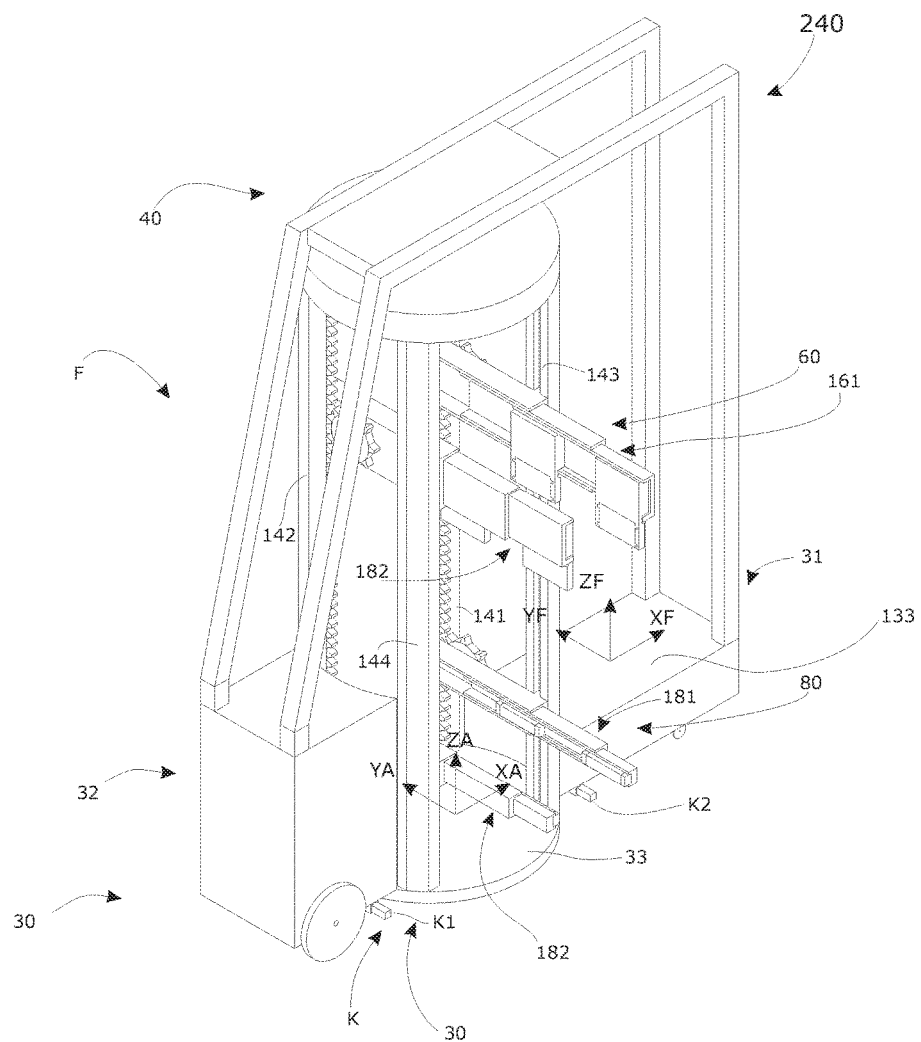
FIGS. 40 and 41 depict a further embodiment of a stack operating vehicle in which a base plate 33 is rotatably disposed at and opposite to the vehicle frame.
Figure 41:
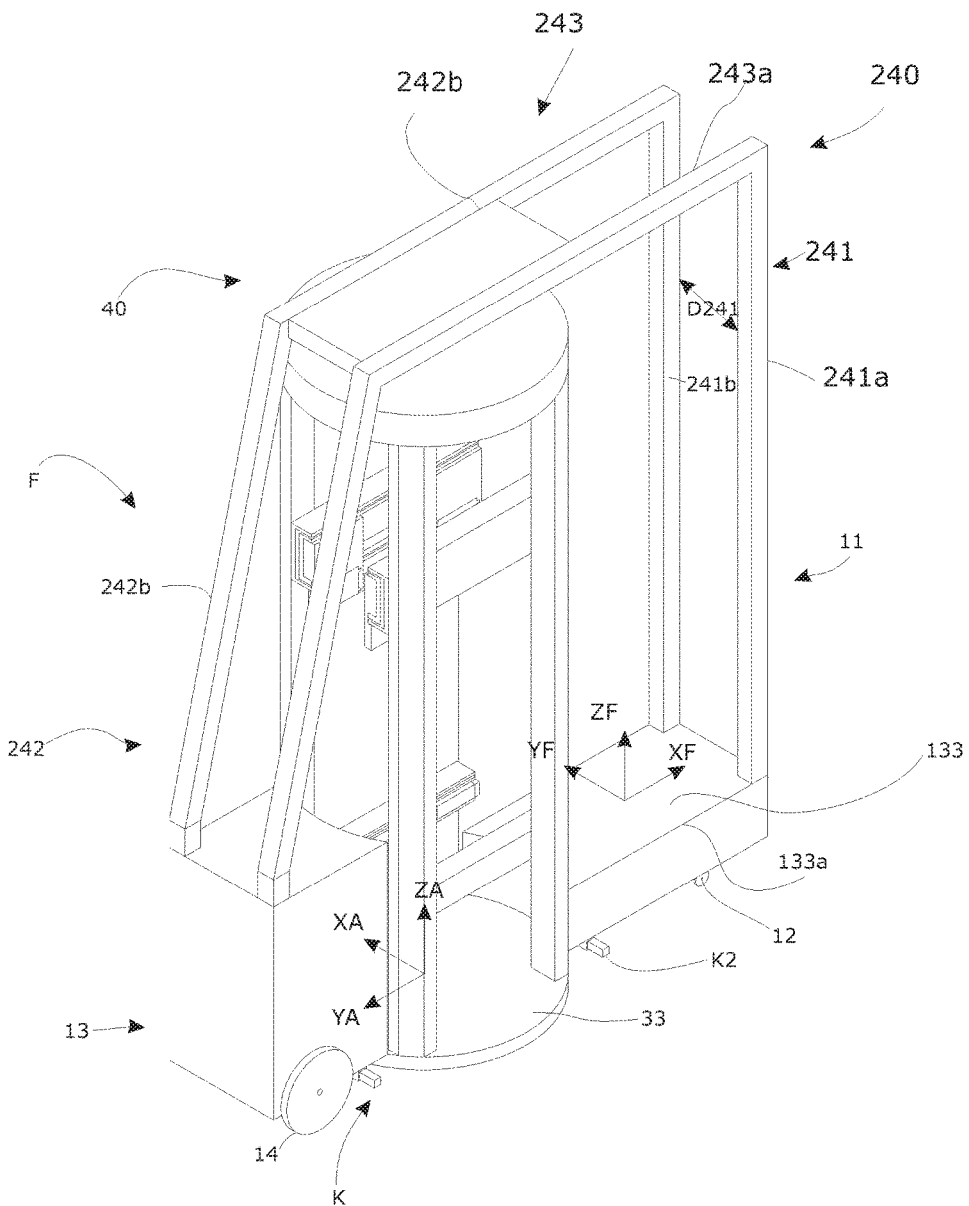

FIGS. 40 and 41 show a further embodiment of the stack operating vehicle F with which the base plate 33 is rotatably disposed at and opposed to the vehicle frame 30. With this embodiment the bearing device 60 and 80 are designed according to FIG. 22 and the guide arrangement 50 and the height adjustment devices 70, 90 are designed according to FIG. 22. However, these can also be realized according to another embodiment described herein.

Figure 42:
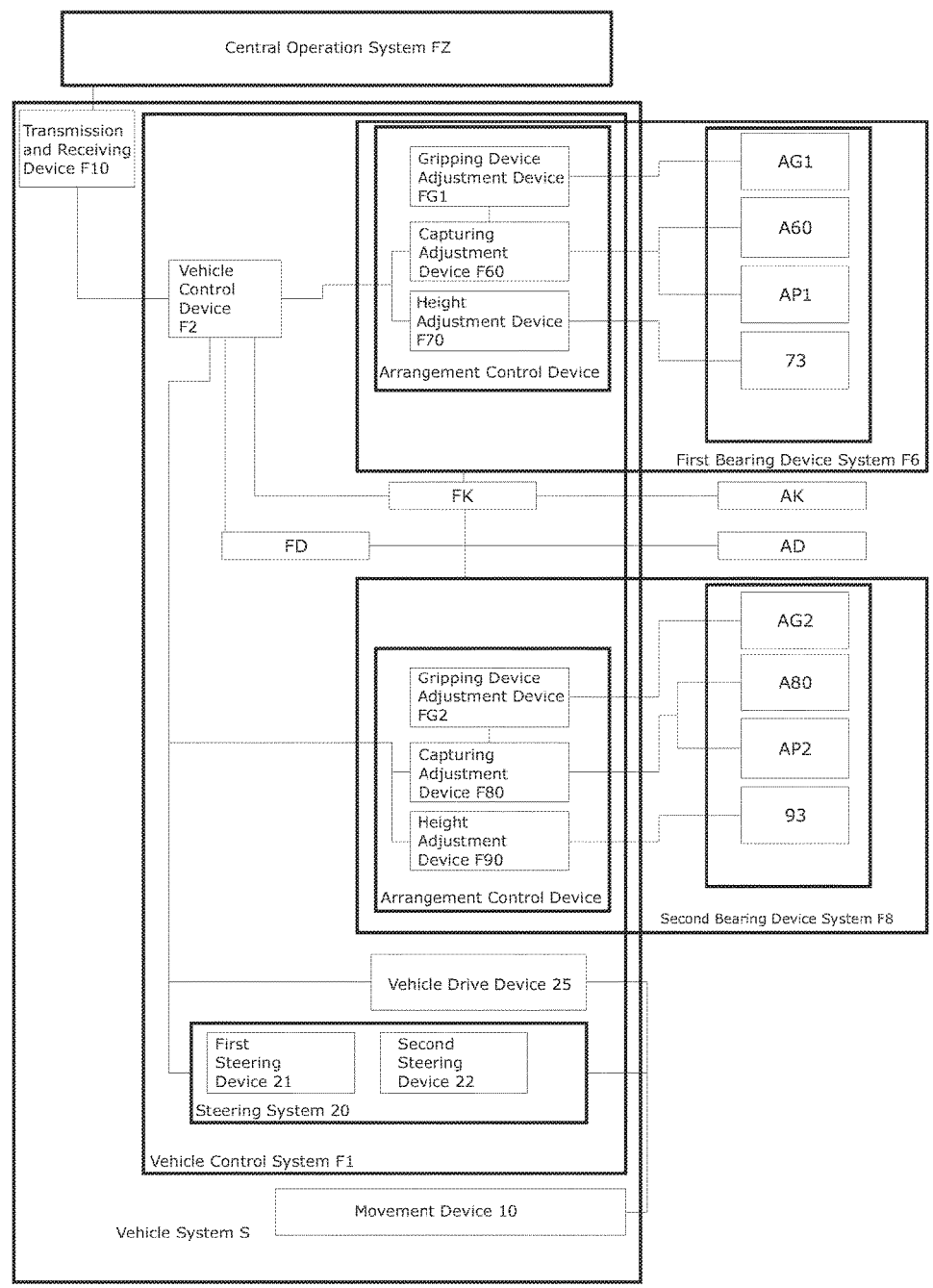
FIG. 42 depicts an embodiment of the vehicle control system 1 for the embodiment of the stack operating vehicle shown in FIGS. 40 and 41 which particularly comprises a bogie adjustment device which is commanded by the vehicle control system.

Thereby the vehicle control device F1 contains with regard to the embodiment of the same shown in FIG. 28—as shown in FIG. 42—additionally a bogie adjustment device FD with a bogie adjustment function and a bogie adjustment device FD with the drive device 24$a$ which is functionally commanded by the bogie adjustment function (FIG. 1). The bogie adjustment device FD is functionally connected with the vehicle control device F2. The bogie adjustment device FD and particularly the drive device 24$a$ is realized such that with the same the base plate 33 can be moved from an initial state in a demanded state due to command signals which are generated by the respective bogie adjustment function.

In this regard can particularly the vehicle frame 30 and the movement device 10 and the rack 40 according to one of the embodiments described herein.

Viewed in the XF-direction behind the base plate 33 a contact surface 133 for an intermediate storage and if applicable for transport of a storage unit LE can be disposed. When the first bearing device 60 and/or the second bearing device 80 respectively are retracted and realized such that the respective on, if applicable with a storage unit LE which is held by the respective one, can be moved by rotation of the base plate 33 within the support structures 40 from the state shown in FIG. 40 into the state shown in FIG. 41, the same can deposit a storage unit LE on the contact surface 133 in order to be able to fulfil multistage storage tasks with the tasks described.

The stack operating vehicles F can comprise an outer support structure 240 which comprises at least one support bar section 241 which is disposed at a front end of the contact surface 133. The support bar section 241 is disposed at a position and has a design, with which a stack which is situated on the contact surface 133 is positioned behind the support bar section 241 when viewed from the contact surface 133 in order to protect the same. With the embodiment according to FIGS. 40, 41 two of them are disposed in YF-direction next to another and in a distance D241 to one another. The distance D241 can amount to ¼ of the largest YF-width of the contact surface 133. The support bar section 241 can be formed from one or several support bar sections which extend along to one another. According to the FIGS. 40, 41 two support bar sections 241$a$, 241$b$ are provided which are respectively disposed at the lateral outer edges of the contact surface 133.

Further the stack operating vehicles F can comprise at least one rear support bar section 242. Optionally the stack operating vehicle F can also comprise at least a middle support bar section 243 which connects the front and the rear support bar section 242 with one another. In this regard also two respective front support bar sections 241$a$, 241$b$, two rear support bar sections 242 and two middle support bar sections 243$a$, 243$b$ can be disposed which, as shown in FIGS. 40, 41, are connected with one another in XF-direction and thereby form two support bar brackets, particularly in order to protect the support structure 40 and components which are disposed at the same.

Figure 43:
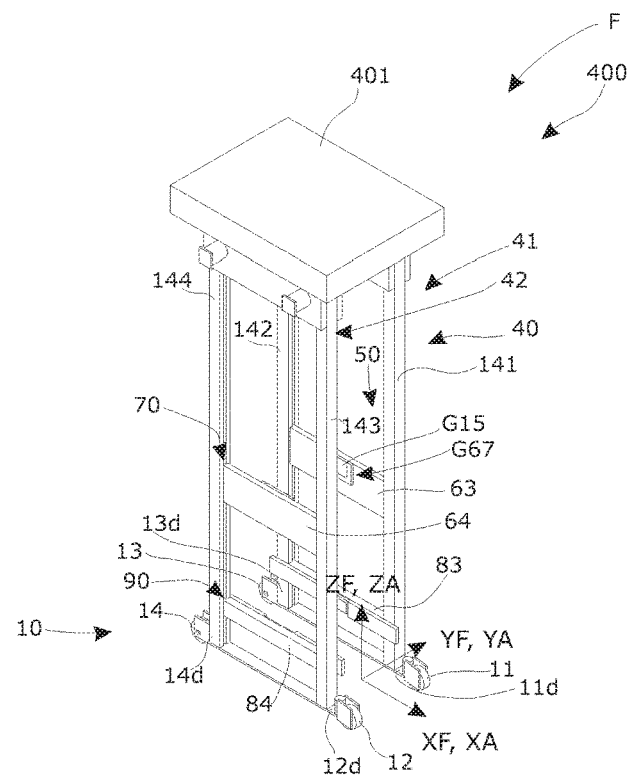
FIG. 43 a further embodiment of a stack operating vehicle with wheels which are articulated directly at the support bars of the support structure.

FIG. 43 shows a further embodiment of the stack operating vehicle F which particularly is assigned the reference numeral 400. With this embodiment the wheels 11, 12, 13, 14 are respectively articulated to the support bars 141$d$ and 142$d$ and 143$d$ and 144$d$, respectively, which extend along the YF-direction by means of a pivot joint directly or by means of a storage device. On this basis the wheels 11, 12, 13, 14 with the pivot joints form the movement device 10. The stack operating vehicle 400 can also comprise an embodiment of a steering system 20 which is described with reference to the FIGS. 1 and 28, wherein the wheels 11, 12, 13, 14 are rotatably disposed at the vehicle frame 30 for execution of steering rotations by means of a suspension device rotatable.

Figure 45:
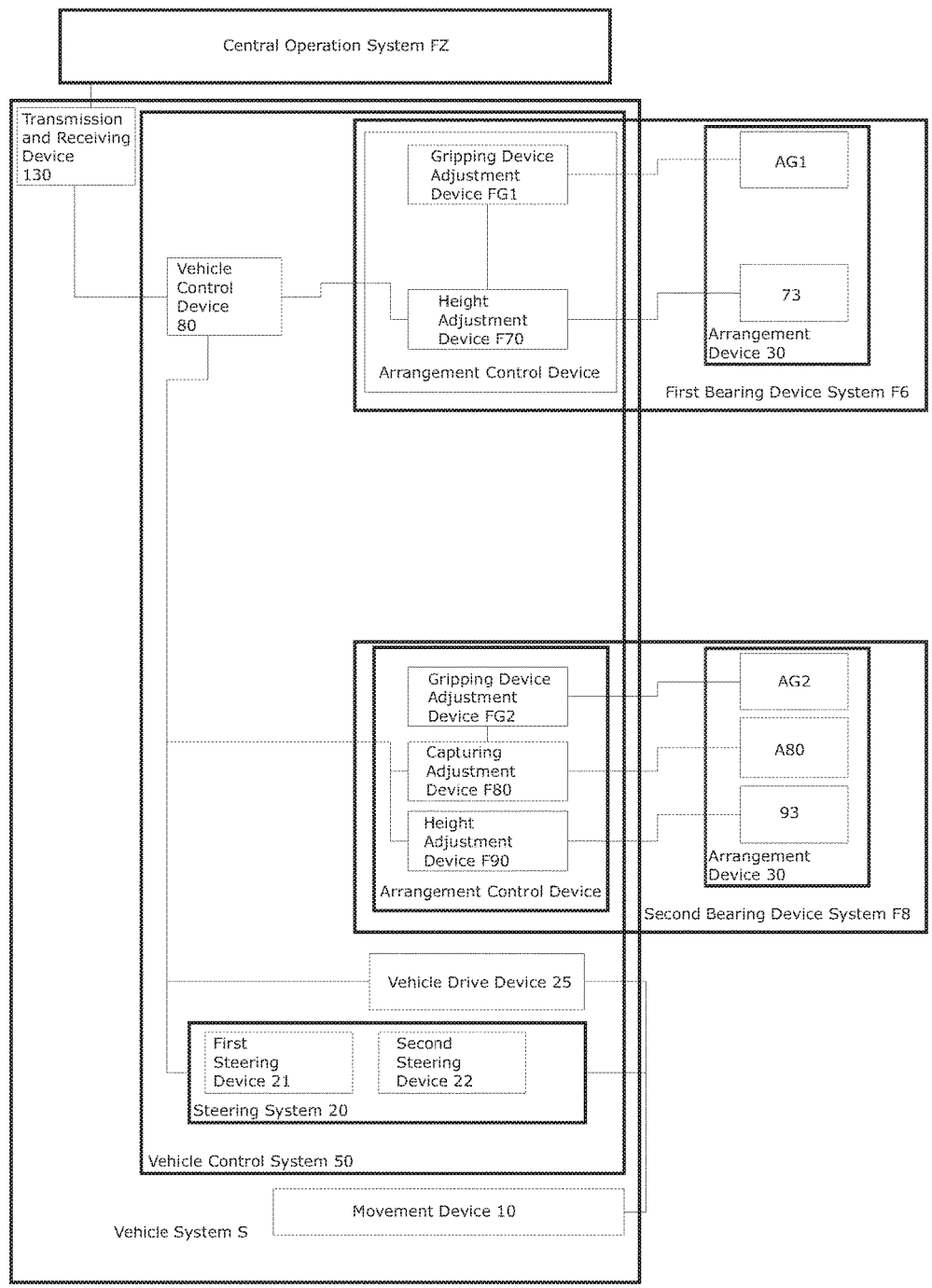
FIG. 45 depicts a functional stack operating vehicle system for adjusting different operational states of the stack operating vehicle of FIG. 43.

Further the stack operating vehicle 400 can comprise a herein described embodiment of a vehicle system S and particularly a herein described embodiment of a vehicle control system F1. FIG. 45 shows a functional presentation of the stack operating vehicle system which is provided for adjustment of different operational states of the embodiment of the stack operating vehicle shown in FIG. 43.

The stack operating vehicle 400 can comprise a suspension counterpart 401 (FIG. 43) which is arranged at the upper ends of the support bars and which is designed such that at the same the stack operating vehicle 400 can be lifted off the warehouse floor R.

The stack operating vehicle 400 comprises further a first bearing device 60 and a second bearing device 80 which respectively can be designed according to one of the embodiments described herein. With the stack operating vehicle 400 the guide arrangement 50 and the height adjustment devices 70, 90 are designed according to one of the embodiments described herein, particularly according to FIGS. 1, 10 and 18.

According to an embodiment the first bearing device 60 is designed as being not extendable along the XF-direction. Particularly, the first bearing device 60 comprises a first bearing base 60B and particularly base bodies 63, 64 separated from one another according to an embodiment described herein. Also the coupling of the base body 63, 64 with a guide arrangement 50 and height adjustment devices 70, 90 can be realized according to an embodiment described herein. Hence, an own capturing device is not provided at the first bearing base 60B. However, to the base bodies 63, 64 respectively a gripping device G67 with an adjustment part G15 is coupled which can be realized according to the embodiment of FIGS. 16 and 17 or 20 and 21.

The second bearing device 80 can be realized according to an embodiment which is described herein with reference to FIG. 10, 15, 18 or 22 and can particularly be realized in a telescopic manner.

Figure 44:
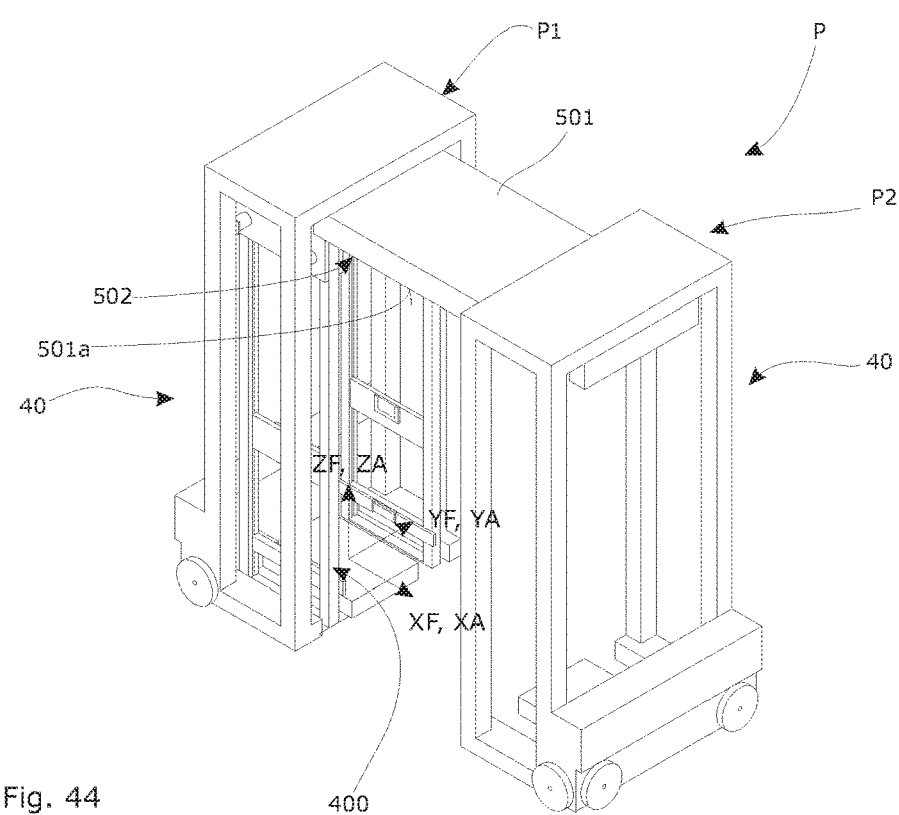
FIG. 44 depicts a portal vehicle with a first side part, a second side part and a bearing plate connecting the first and second side parts, to which a stack operating vehicle according to FIG. 43 is movably suspended.

In FIG. 44 a portal vehicle 500 with a first side part P1, a second side part P2 and a bearing device 501 is shown which connects both and which can particularly be formed as a bearing plate 501. The bearing device 501 or bearing plate 501 comprises, for example at the underside 501$a$ of the same, a guiding device 502 with a guide track at which the suspension counterpart 401 and the stack operating vehicle 400 is held, if applicable together with storage units LE captured by the same, and can be moved in the longitudinal direction XFP of the portal vehicle 500 within the same and particularly between the side parts P1 and P2. In FIG. 44 a portal vehicle coordinate system with a portal vehicle longitudinal axis or XFP-direction, a vertical direction ZFP or portal vehicle vertical axis and a portal vehicle transverse axis or YFP-direction is shown. By means of the guiding device 502 the stack operating vehicle 400 can be retracted particularly inner of the respectively corresponding support structures 40, when viewed in the YF-direction, and thereby alternately in the support structure 40.

The side parts P1 and P2 can be realized as shown particularly as frame device.

The portal vehicle 500 is formed such that the distance between the side parts P1 and P2 is dimensioned such that a row of stacks of storage units LE is disposed between the side parts P1 and P2. Thereby storage orders as described herein can be executed by means of the suspended stack operating vehicle 400.

As a variant the stack operating vehicle 400 which is suspended in the portal vehicle 500 can also be realized without wheels 11, 12, 13, 14. According to an embodiment of the portal vehicle 500 the same includes: a first side part P1; a second side part P2 which is distanced to the first side part P1 in a longitudinal direction XFP of the portal vehicle 500 for providing a storage unit stack clearance 505 which is situated between the same; a bearing device 501 which connects the same and which delimits the storage unit stack clearance 505 in a height direction ZF; and a stack operating vehicle 400 which is moveable by means of a guiding device 502, wherein the guiding device is formed such that the stack operating vehicle 400 is moveable in the longitudinal direction XFP of the portal vehicle 500 between a first position, in which the stack operating vehicle 400 is retracted in the first side part P1, and a second position, in which the stack operating vehicle 400 is retracted in the second side part P2.

In this embodiment, the stack operating vehicle 400 includes: a first bearing device 60 with a gripping device for capturing a storage container; a second bearing device 80 with a second bearing base 80B and with a second holding device 89 for applying at least a storage unit LE, wherein the second holding device 89 is supported at the second bearing base 80B moveably along the longitudinal direction XF, which runs along the longitudinal direction XFP of the portal vehicle 500; a vertical guide arrangement 50 at which the first bearing device 60 and the second bearing device 80 are guided respectively on an adjustment path along the vertical direction ZA, wherein the same are formed such that the first bearing base 60B and the second bearing base 80B are situated one upon the other at least one another overlapping over their entire adjustment paths in the vertical direction ZA; a first height adjustment device 70 to which the first bearing device 60 is coupled and by which the first bearing device 60 is moveable along the vertical direction ZA; and a second height adjustment device 90 to which the second bearing base 80B is coupled and by which the second bearing base 80B is moveable along the vertical direction ZA.

Figure 46:
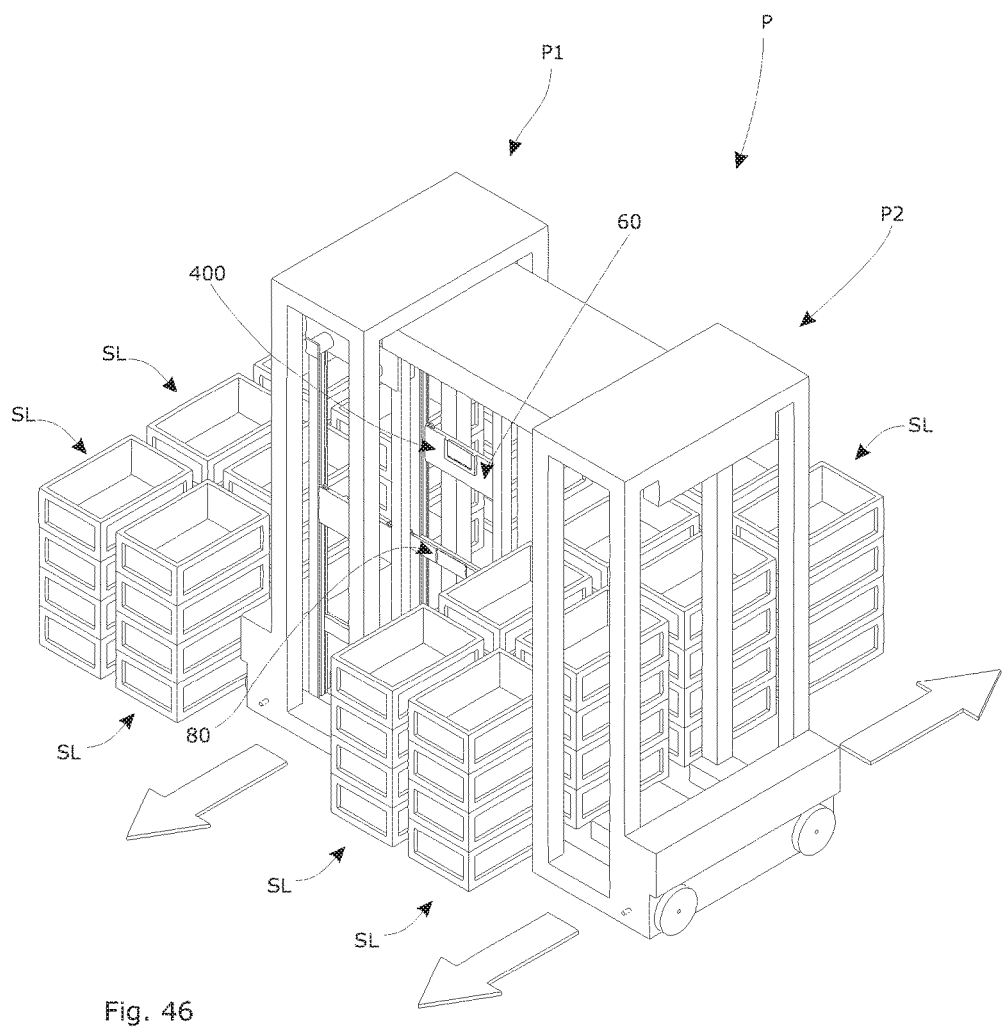
FIG. 46 depicts an operational state of the portal vehicle with the stack operating vehicle suspended therein, wherein the portal vehicle drives in two aisles which are situated between stacks of storage units.

FIG. 46 depicts an operational state of the portal vehicle with the stack operating vehicle suspended therein, wherein the portal vehicle drives in two aisles which are situated between stacks of storage units.

Figure 47:
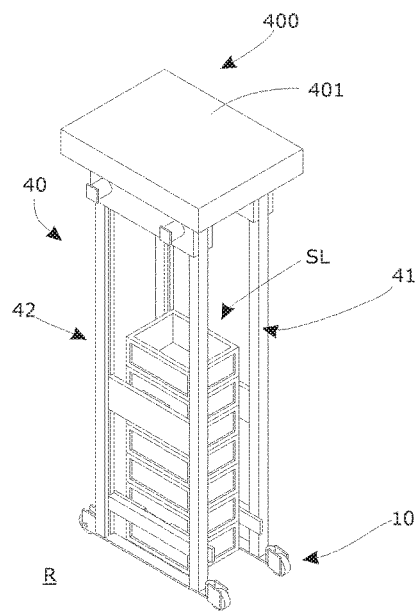
FIGS. 47 to 49 depict different operational states of the stack operating vehicle according to FIG. 43.
Figure 48:
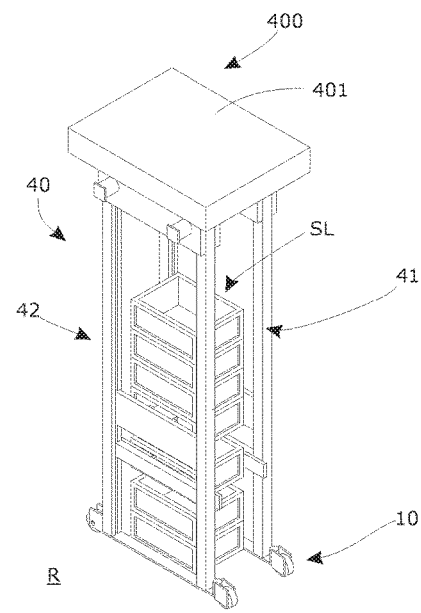
Figure 49:
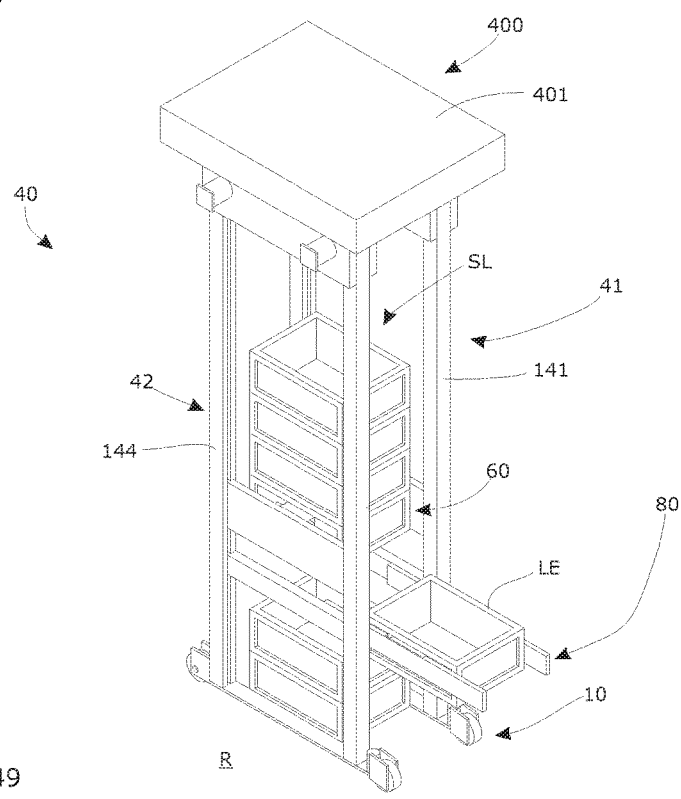

FIGS. 47 to 49 show different operational states of the embodiment of the stack operating vehicle according to FIG. 43

Figure 50:
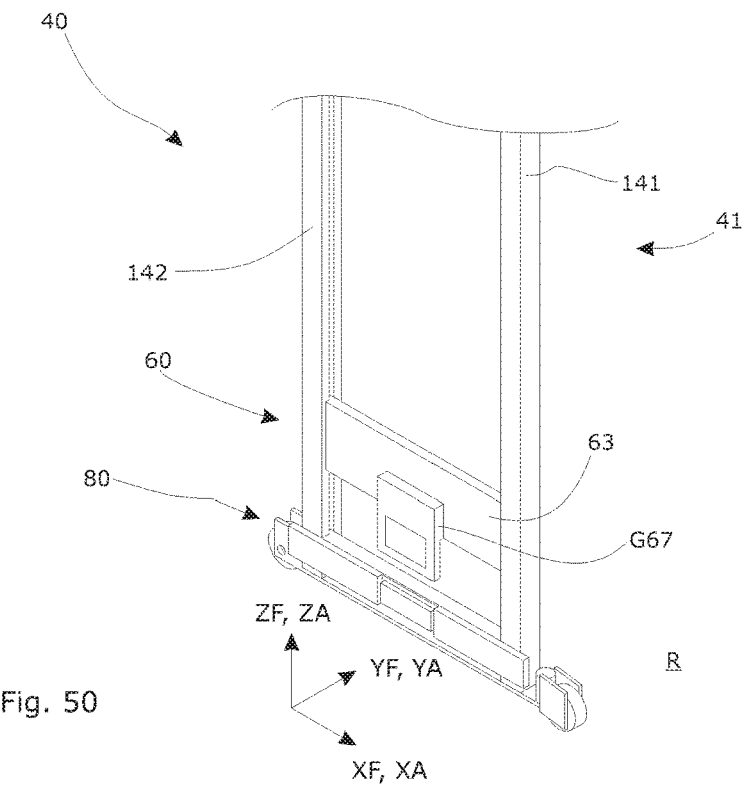
FIG. 50 is a perspective presentation of a section of a support part of the embodiment of FIG. 43, wherein the height adjustment devices are not shown and wherein the first bearing device is disposed in a middle height position and the second bearing device is disposed in its lowest height position at the support structure.

FIG. 50 depicts in perspective a section of a support part of the embodiment of the stack operating vehicle according to FIG. 43, wherein the height adjustment devices are not shown and wherein the first bearing device is disposed in a middle height position and the second bearing device is disposed in its lowest height position at the support structure.

Figure 51:
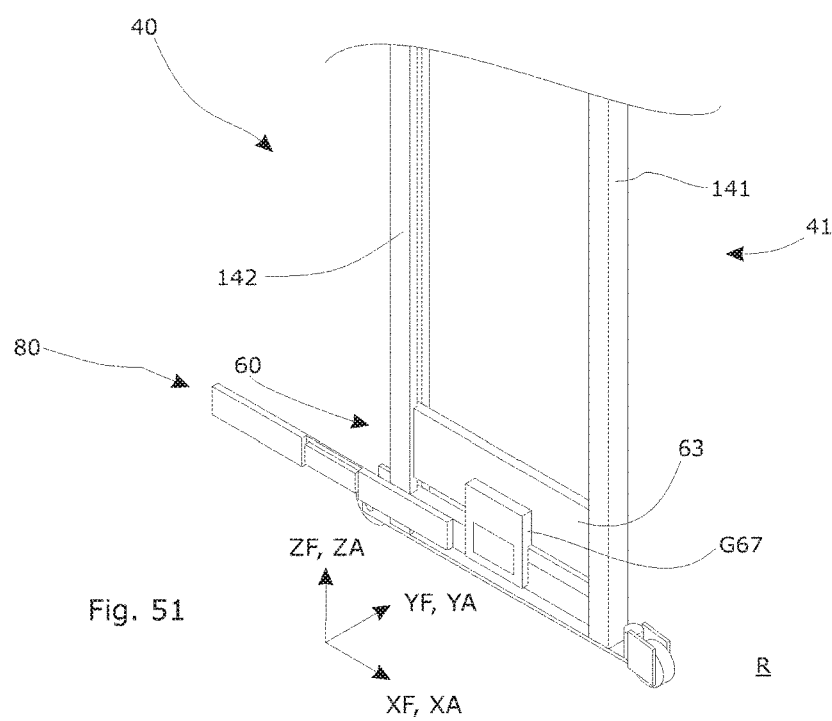
FIG. 51 is a perspective presentation of a section of a support part of the embodiment of the stack operating vehicle of FIG. 43, wherein the height adjustment devices are not shown and wherein the first bearing device and the second bearing device are disposed in their lowest height positions at the support structure.
Figure 52:
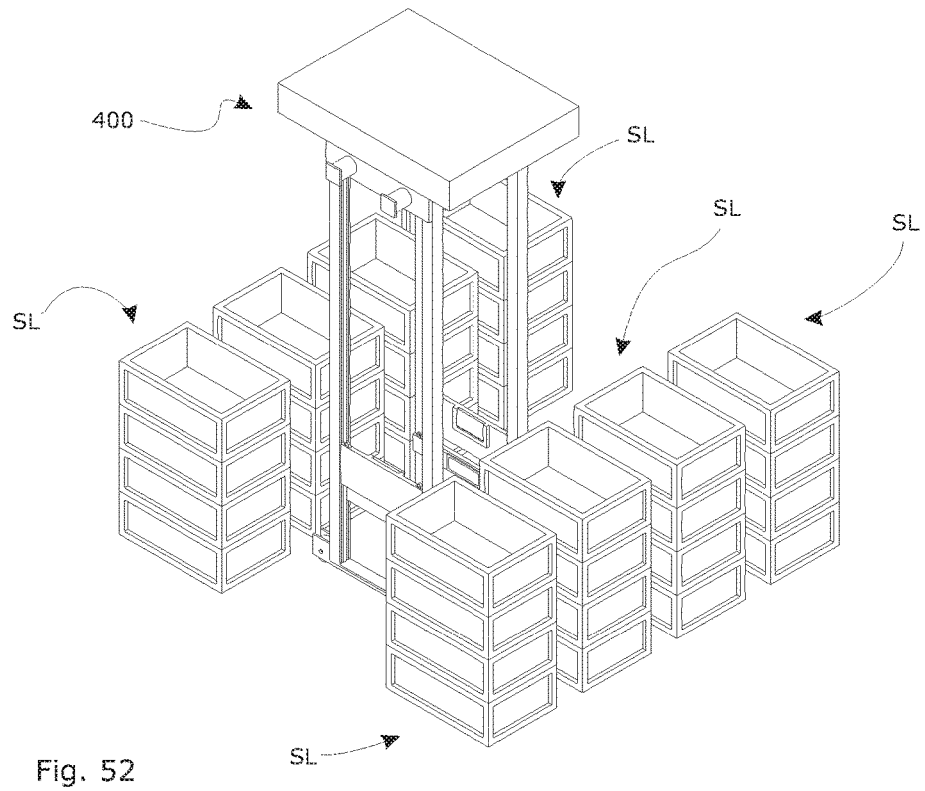
FIGS. 52 to 59 depict different positions of action of the stack operating vehicle of FIG. 43 in several stacks of storage units.
Figure 53:
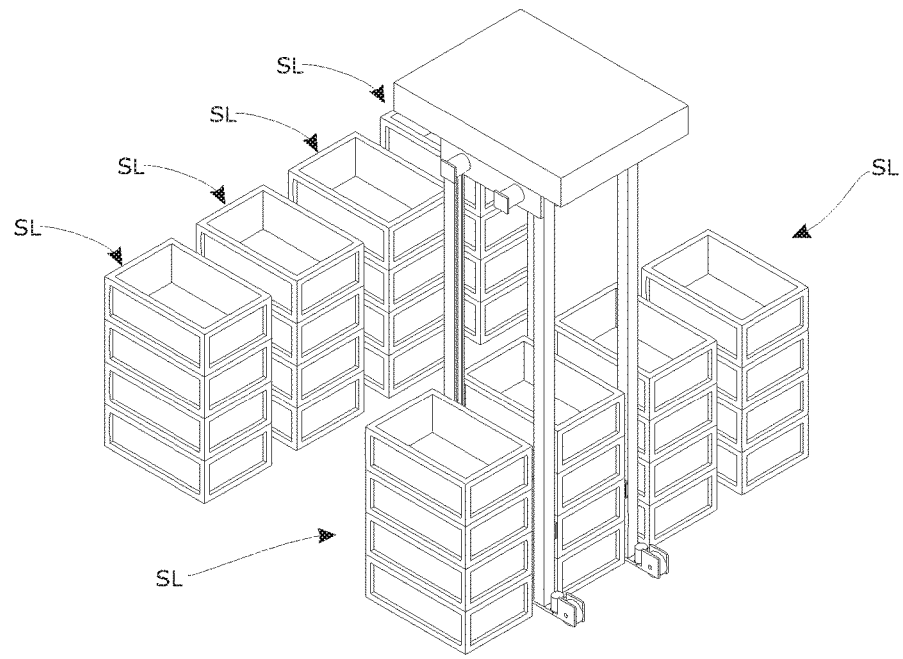
Figure 54:
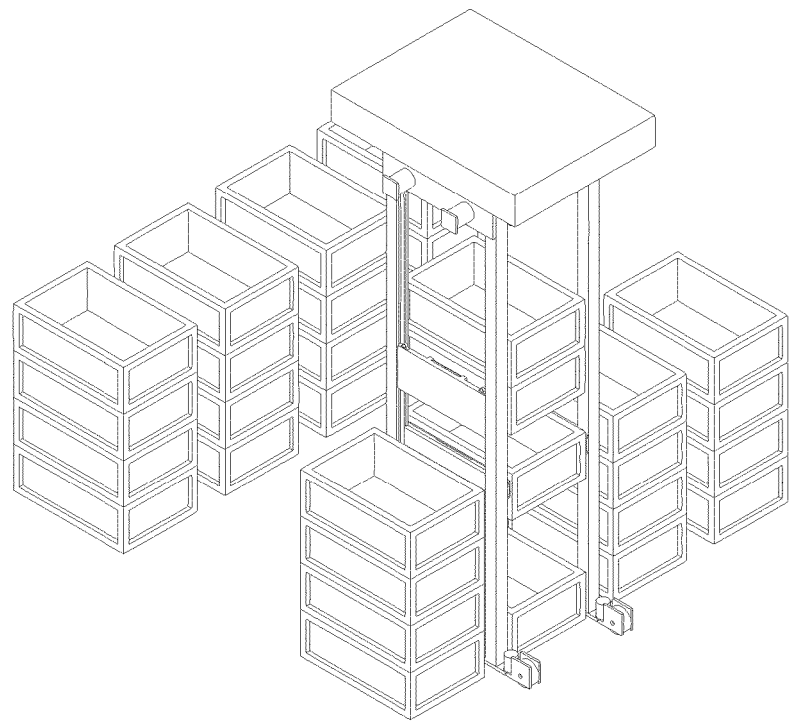
Figure 55:
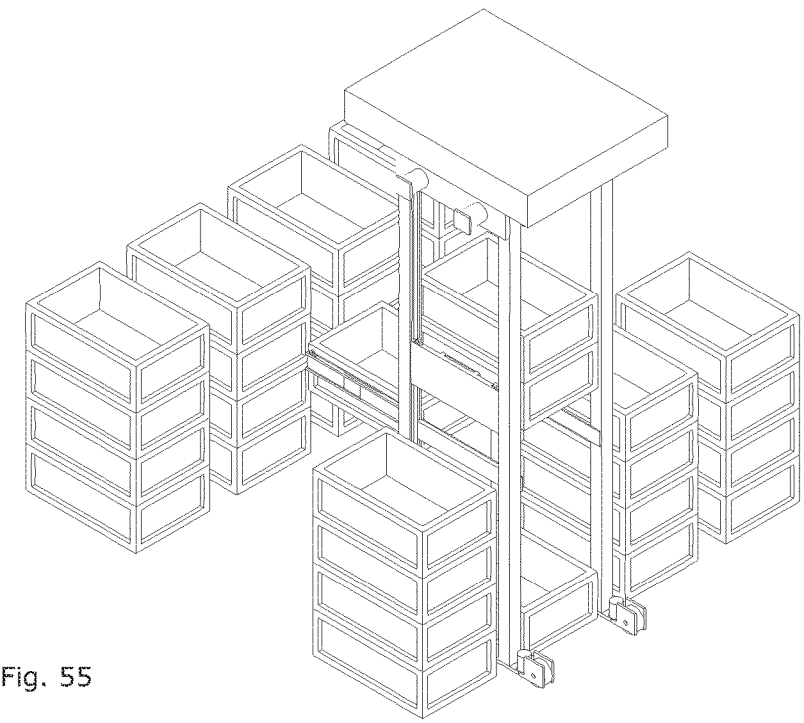
Figure 56:
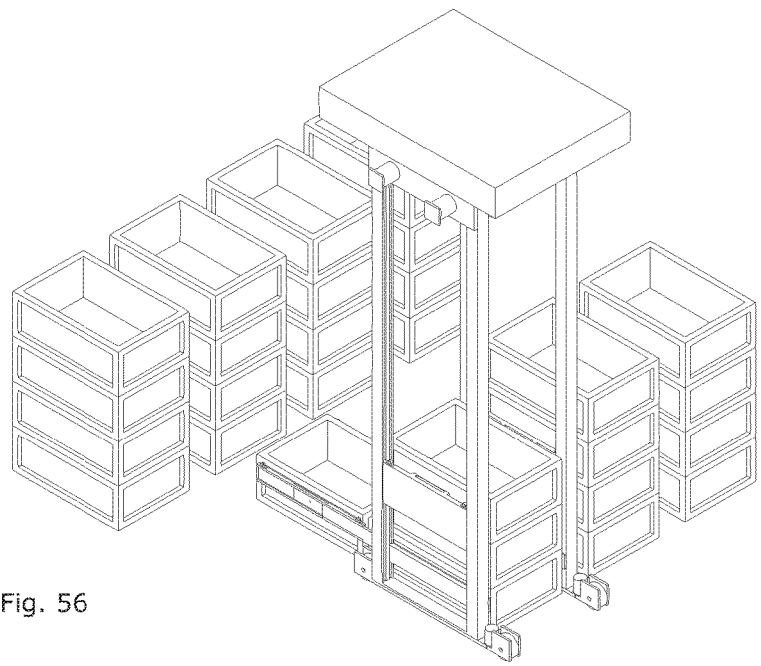
Figure 57:
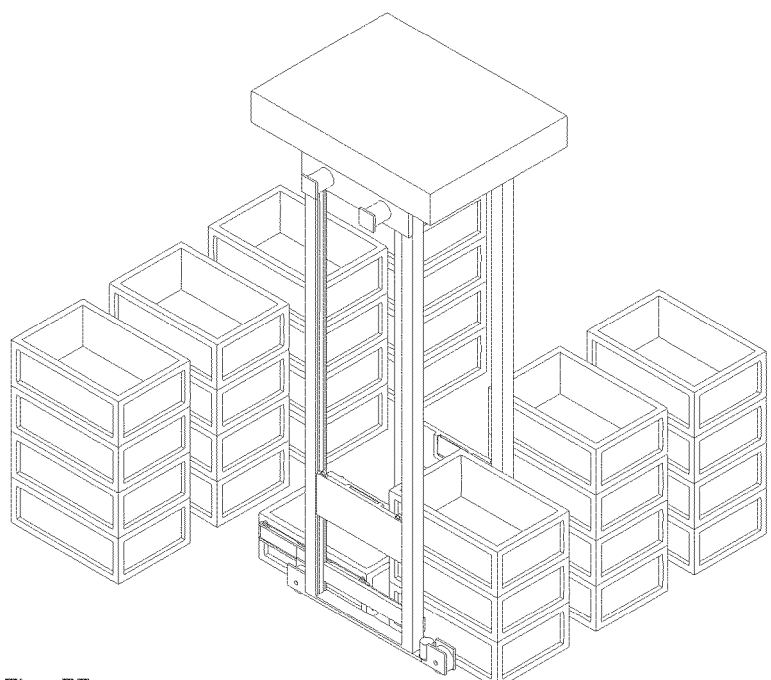
Figure 58:
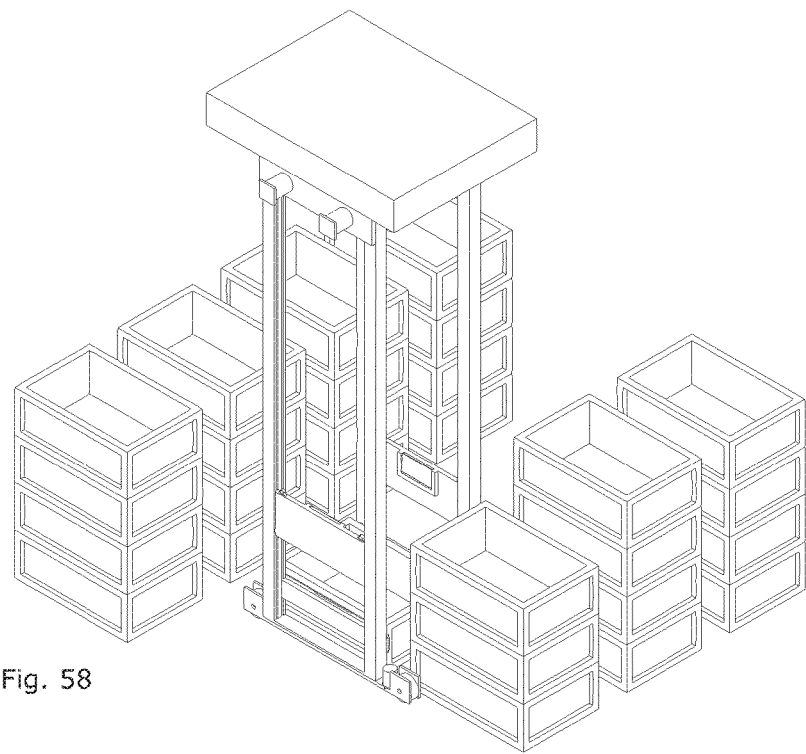
Figure 59:
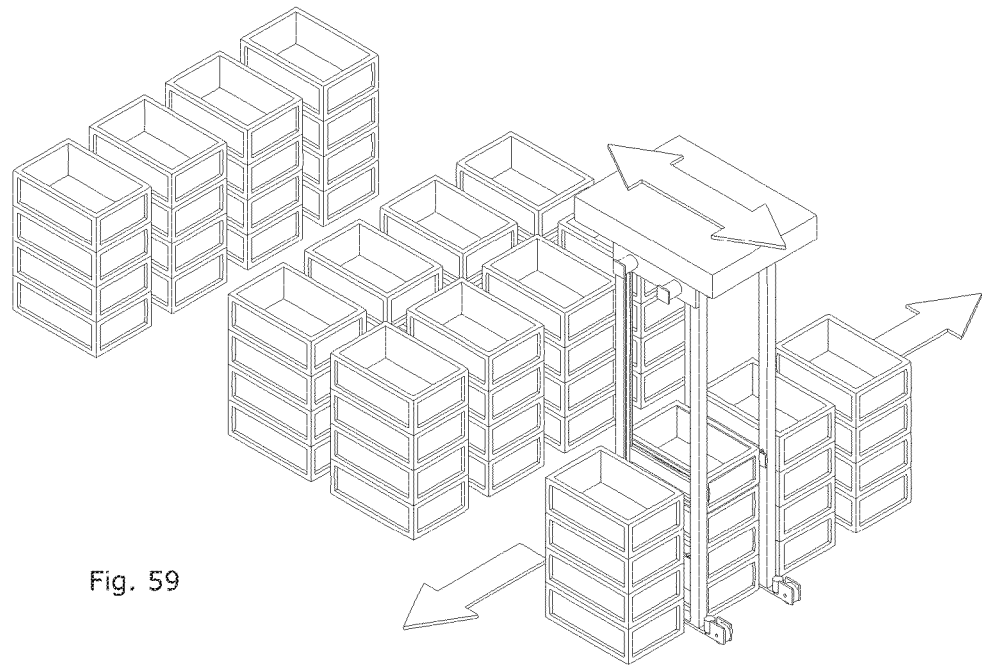

FIG. 51 depicts in perspective a section of a support part of the embodiment of the stack operating vehicle according to FIG. 43, wherein the height adjustment devices are not shown and wherein the first bearing device and the second bearing device are disposed in their lower height positions at the support structure.

FIGS. 52 to 59 show different positions of action of the stack operating vehicle according to FIG. 43 in several stacks of storage units.

The invention claimed is:

1. A stack operating vehicle (F) for storing and retrieving storage units (LE), the stack operating vehicle comprising:
   a movement device (10) for moving the stack operating vehicle (F);
   a first bearing device (60) with a first bearing base (60B) and a first holding device (69) for handling at least one storage unit, wherein the first holding device (69) is movably supported by a guiding device along the transverse direction (YF);
   a second bearing device (80) with a second bearing base (80B) and a second holding device (89) for handling a second at least one storage unit, wherein the second holding device (89) is movably supported by a guiding device along the transverse direction (YF);
   a vertical guide arrangement (5s0) at which the first bearing base and the second bearing base are each respectively guided on an adjustment path along the vertical direction (ZA), the adjustments paths formed such that the first bearing base (60B) and the second bearing base (80B) overlap one another over their entire adjustment paths in the vertical direction (ZA);
   a first height adjustment device (70) to which the first bearing base (60B) is coupled and with which the first bearing base (60B) is moveable along the vertical direction (ZA); and
   a second height adjustment device (90) to which the second bearing base (80B) is coupled and with which the second bearing base (80B) is moveable along the vertical direction (ZA);
   wherein, in case that the first bearing base (60B) is disposed in a minimum possible distance to the second bearing base (80B), a contact surface (67a, 68a) of the first holding device (69) which is oriented in the vertical direction (ZA) is disposed, when viewed in the vertical direction (ZA), in a same height or below a contact surface (87a, 88a) of the second holding device (89) of the second bearing device (80).

2. The stack operating vehicle (F) according to claim 1, wherein the first bearing base (60B) is disposed in the vertical direction (ZF) at the vertical guide arrangement (50) with regard to the vertical direction (ZF) above the second bearing base (80B),
   wherein the first guiding device (V10), by which the first holding device (69) is movably guided at the first bearing base (60B), comprises a guide track (V11) which is formed at the first bearing base (60B) and a guidance part (V12) which is movably guided at the guide track (V11) and which is connected to the first bearing base (60B).

3. The stack operating vehicle (F) according to claim 1, wherein the stack operating vehicle (F) comprises:
   a support structure (40) to which the vertical guide arrangement (50) is mounted; and
   a movement device (10) for movement of the stack operating vehicle (F) on a runway, wherein the movement device (10) is mounted at the support structure, wherein the support structure (40) extends in the vertical direction (ZA) when starting from the movement device (10).

4. The stack operating vehicle (F) according to claim 3, wherein the first height adjustment device (70) and the second height adjustment device (90) are arranged at or integrated into the support structure (40).

5. The stack operating vehicle (F) according to claim 1, wherein:
- the support structure (40) comprises a first support part (41) and a second support part (42); and
- the guide arrangement (50) comprises at least a first guide track (53) in which a first support part (55) which is mounted to the first bearing base (60B) and a second guidance part (85) which is mounted to the second bearing base (80B).

6. The stack operating vehicle (F) according to claim 5, wherein the guide arrangement (50) additionally comprises a second guide track (54) positioned at a distance from the first guide track (53) in a width direction (XA) of the guide arrangement (50),
wherein the first bearing base (60B) is formed from a first base body (63) which is guided in the first guide track (53) and a second base body (64) which is guided in the second guide track (54),
wherein the first holding device (69) formed from: an elongated first support device (67) which extends transversely to the width direction (XA) of the guide arrangement (50) and which is movably guided at the first base body (63) transversely to the width direction (XA) of the guide arrangement (50), and an elongated second support device (68) which extends transversely to the width direction (XA) of the guide arrangement (50), wherein the elongated second support device (68) is movably guided at the second base body (64) transversely to the width direction (XA) of the guide arrangement (50),
wherein the second bearing base (80B) is formed from a first base body (83) which is guided in the first guide track (53) and a second base body (84) which is guided in the second guide track (54),
wherein the second holding device (89) is formed from: an elongated first support device (87) which extends transversely to the width direction (XA) of the guide arrangement (50), wherein the first support device (87) is movably guided at the first base body (83) transversely to the width direction (XA) of the guide arrangement (50); and an elongated second support device (88) which extends transversely to the width direction (XA) of the guide arrangement (50), wherein the second support device (88) is movably guided at the second base body (84) transversely to the width direction (XA) of the guide arrangement (50).

7. A stack operating vehicle (F) for storing and retrieving storage units (LE) wherein the stack operating vehicle (F) comprises,
- a movement device (10) for moving the stack operating vehicle (F),
- a first bearing device (60) with a first bearing base (60B) and a first holding device (69) for handing at least a storage unit (LE), wherein the first holding device (69) is movably supported by a guiding device along the transverse direction (YF),
- a second bearing device (80) with a second bearing base (80B) and a second holding device (89) for handling at least a storage unit (LE), wherein the second holding device (89) is movably supported by a guiding device along the transverse direction (YF),
- a vertical guide arrangement (50) at which the first bearing base (60B) and the second bearing base (80B) are respectively guided on an adjustment path along the vertical direction (ZA), the adjustments paths formed such that the first bearing base (60B) and the second bearing base (80B) overlap each one another over their entire adjustment paths in the vertical direction (ZA),
- a first height adjustment device (70) to which the first bearing base (60B) is coupled and with which the first bearing base (60B) is moveable along the vertical direction (ZA),
- a second height adjustment device (90) to which the second bearing base (80B) is coupled and with which the second bearing base (80B) is moveable along the vertical direction (ZA),
wherein the vertical guide arrangement (50) additionally comprises a second guide track (54) which is distanced from the first guide track (53) in a width direction (XA) of the guide arrangement (50),
wherein the first bearing base (60B) of the first bearing device (60) comprises a first telescopic holder (161) which is guided in the first guide track (53) and a second telescopic holder (162) which is guided in the second guide track (54), wherein at the telescopic holders (161, 162) respectively a telescopic endpiece (167, 168) with a gripping device (G67, G68) is movably supported for capturing a storage unit (LE) along the transverse direction (YF);
wherein the second bearing base (80B) of the second bearing device (80) comprises a first telescopic holder (181) which is guided in the first guide track (53) and a second telescopic holder (182) in the second guide track (54); and
wherein at the telescopic holders (181, 182) respectively a telescopic endpiece (187, 188) with a gripping device (G87, G88) is movably supported along the transverse direction (YF),
wherein the gripping device (G67) which is disposed at the telescopic endpieces (167, 168) of the first bearing device (60) extends from the respective telescopic endpiece (167, 168) opposite to a height direction (ZA) of the vertical guide arrangement (50) such that, when the first bearing base (60B) is disposed in a minimum possible distance to the second bearing base (80B), contact surfaces of the gripping device (G67) which are oriented in the vertical direction (ZA) of the first bearing device (60) are situated when viewed in the vertical direction (ZA), in a same height or below contact surfaces of the gripping device (G67) of the second bearing device (80) which are oriented in the vertical direction (ZA).

8. The stack operating vehicle (F) according to claim 7, wherein the first holding device 69 is formed from a first support device 67 and a second support device 68, wherein the first bearing device 67 is disposed at a first base body 63 and moveable relative to the first base body along the transverse-direction between a retracted state and an extended state and the second bearing device is disposed at a second base body 64 and moveable relative to the second base body along the transverse-direction between a retracted state and an extended state.

9. The stack operating vehicle (F) according to claim 7, wherein the support structure (40) is arranged on a base plate (33) of the stack operating vehicle (F), wherein the base plate is rotatably mounted on the vehicle frame (30) of the stack operating vehicle (F), wherein the stack operating vehicle comprises a drive device (24a) by which the base plate (33) with the support structure (40) is rotatable relative to the vehicle frame (30).

10. The stack operating vehicle (400) according to claim 7,
wherein the vertical guide arrangement (50) is disposed at a support structure (40); and
wherein the wheels (11, 12, 13, 14) further comprise rotation axes (11d, 12d, 13d, 14d) in the transverse-direction for straight line driving in a neutral position, wherein the wheels are disposed by a suspension device directly or by a storage device at the support structure (40).

11. The stack operating vehicle (F) according to claim 10, wherein the support structure (40) comprises four support bars (141d, 142d, 143d, 144d) and the wheels (11, 12, 13, 14) are disposed by means of a suspension device directly or by means of a mounting device to a respective one of the four support bars.

12. A stack operating vehicle (400) for storing and retrieving storage units (LE), the stack operating vehicle (400) comprising:
a first bearing device (60) comprising a first bearing base (60B) with two base bodies (63, 64) each with a gripping device (G11), wherein the gripping device (G11) comprises an adjustment part (G15) which can be retracted and extended or folded in and out at the respective base body (63, 64);
a second bearing device (80) with a second bearing base (80B), which comprises two base bodies (83, 84) and with a second holding device (89) for capturing at least one storage unit (LE), wherein the second holding device (89) is movably supported at the second bearing base (80B) by means of a guiding device along a longitudinal direction (XF), wherein the second holding device (89) comprises two capturing devices (81, 82) each of which are disposed at a base body (83, 84) realized in a telescopic manner;
a vertical guide arrangement (50) at which the first bearing base (60B) and the second bearing base (80B) are respectively guided, providing an adjustment path along a vertical direction (ZA), wherein the first bearing base (60B) and the second bearing base (80B) overlap one another over their entire adjustment paths when viewed in the vertical direction (ZA), wherein the vertical guide arrangement (50) comprises at least one first guide track (53), at which a first base body (63, 83) each of the first and the second bearing base (60B, 80B) is guided, and a second guide track (54) which lies in a distance to the first guide track (53), wherein at the first and second first guide track (53, 54) a second base body (84) (64, 84) each of the first and the second bearing base (60B, 80B) is guided;
a first height adjustment device (70) to which the first bearing base (60B) is coupled and by which the first bearing base (60B) is moveable along the vertical direction (ZA);
a second height adjustment device (90) to which the second bearing base (80B) is coupled and by which the second bearing base (80B) is moveable along the vertical direction (ZA),
wherein the at least one storage unit (LE) can be taken up at the same vertical guide arrangement (50) by a respective movement of the first bearing device (60) and a respective movement of the second bearing device (80), wherein the storage units (LE) are moveable from one another in the vertical direction (ZA).

13. A portal vehicle (500), comprising:
a first side part (P1);
a second side part (P2) positioned at a distance from the first side part (P1) in a longitudinal direction (XFP) of the portal vehicle (500) for providing a storage unit stack clearance (505) between the first and second side parts;
a bearing device (501) which connects the first and second side parts and which delimits the storage unit stack clearance (505) in a height direction (ZF); and
a stack operating vehicle (400) moveable by a guiding device (502), wherein the guiding device is formed such that the stack operating vehicle (400) is moveable in the longitudinal direction (XFP) of the portal vehicle (500) between a first position in which the stack operating vehicle (400) is retracted in the first side part (P1) and a second position in which the stack operating vehicle (400) is retracted in the second side part (P2),
wherein the stack operating vehicle (400) comprises:
a first bearing device (60) with a gripping device for capturing a storage container;
a second bearing device (80) with a second bearing base (80B) and a second holding device (89) for handling at least one storage unit (LE), wherein the second holding device (89) is movably supported on the second bearing base (80B) by a guiding device along a longitudinal direction XF which runs along the longitudinal direction (XFP) of the portal vehicle (500);
a vertical guide arrangement (50) on which the first bearing device (60) and the second bearing device (80) are guided respectively along an adjustment path which runs along a vertical direction (ZA), wherein the first and second bearing devices are formed such that the first bearing base (60B) and the second bearing base (80B) overlap one another over their entire adjustment paths in the vertical direction (ZA);
a first height adjustment device (70) to which the first bearing device (60) is coupled and by which the first bearing device (60) is moveable along the vertical direction (ZA); and
a second height adjustment device (90) to which the second bearing base (80B) is coupled and by which the second bearing base (80B) is moveable along the vertical direction (ZA).

14. A method for executing storage orders for storage units (LE) from a stack (SL) of such storage units using a stack operating vehicle (F), the method comprising:
positioning the stack operating vehicle (F) in front of a stack of storage units such that a first holding device (69) and a second holding device (89) are facing the stack, with the first holding device coupled to a first bearing base (60B) of a first bearing device (60) for capturing at least one storage unit of the stack of storage units;
capturing the at least one storage unit from the stack with the second holding device (89), the second holding device coupled to a second bearing base (80B) of a second bearing device (80), wherein the first bearing base (60B) and the second bearing base (80B) are guided respectively by a vertical guide device (50) on an adjustment path along a vertical direction (ZA), wherein the first bearing base (60B) and the second bearing base (80B) overlap one another over their entire adjustment paths in the vertical direction; and by retracting the second holding device (89), completing removal of the at least one storage unit (LE) captured by the second holding device from a ground plot of the stack so far that with a lowering the first bearing device (60B) the at least one storage unit (LE) which is situated on the first holding device (69) can be passed by the at least one storage unit (LE) which is situated on the second holding device (89) downward in a direction opposite the vertical ZF-direction.

* * * * *